United States Patent
Jung et al.

(10) Patent No.: US 10,152,153 B2
(45) Date of Patent: Dec. 11, 2018

(54) FLEXIBLE DISPLAY APPARATUS AND OPERATING METHOD THEREOF

(71) Applicant: SAMSUNG ELECTRONICS CO., LTD., Suwon-si (KR)

(72) Inventors: Ji-hyun Jung, Seongnam-si (KR); Chang-soo Lee, Seosan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

(21) Appl. No.: 13/858,165

(22) Filed: Apr. 8, 2013

(65) Prior Publication Data

US 2013/0265257 A1 Oct. 10, 2013

(30) Foreign Application Priority Data

Apr. 8, 2012 (KR) .................. 10-2012-0036474

(51) Int. Cl.
| | |
|---|---|
| *G06F 3/041* | (2006.01) |
| *G06F 3/0488* | (2013.01) |
| *G06F 1/16* | (2006.01) |
| *G06F 3/038* | (2013.01) |

(52) U.S. Cl.
CPC .......... *G06F 3/0412* (2013.01); *G06F 1/1652* (2013.01); *G06F 3/038* (2013.01); *G06F 3/0416* (2013.01); *G06F 3/0488* (2013.01); *G06F 2203/0381* (2013.01); *G06F 2203/04102* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 5,907,375 A | 5/1999 | Nishikawa et al. | |
| 8,624,867 B2 | 1/2014 | Tamaki et al. | |
| 8,654,087 B2 | 2/2014 | Kang et al. | |
| 8,786,560 B1 * | 7/2014 | Khafizov ............. | G06F 3/0418 345/173 |

(Continued)

FOREIGN PATENT DOCUMENTS

| | | |
|---|---|---|
| CN | 101794036 A | 8/2010 |
| CN | 101923388 A | 12/2010 |

(Continued)

OTHER PUBLICATIONS

Written Opinion dated Jul. 23, 2013, by the International Searching Authority in corresponding International Application No. PCT/KR2013/002756.

(Continued)

*Primary Examiner* — Abdul-Samad A Adediran
*Assistant Examiner* — Kirk Hermann
(74) *Attorney, Agent, or Firm* — Sughrue Mion, PLLC

(57) ABSTRACT

A flexible display device is provided. The flexible touch-sensitive display device includes a display which is deformable, a sensor which senses an input comprising a touch of the display and a deformation of the display, and a controller which receives the input, determines whether to select one of only the touch and only the deformation based on a condition of the input, and selects only the touch if it is determined to select only the touch and only the deformation if it is determined to select only the deformation.

6 Claims, 61 Drawing Sheets

(56) References Cited

U.S. PATENT DOCUMENTS

| | | | |
|---|---|---|---|
| 9,013,432 B2 | 4/2015 | Kang et al. | |
| 9,013,433 B2 | 4/2015 | Kang et al. | |
| 9,671,870 B2 | 6/2017 | Kang et al. | |
| 9,946,358 B2 | 4/2018 | Kang et al. | |
| 2005/0212752 A1* | 9/2005 | Marvit | G06F 3/0346 345/156 |
| 2005/0253806 A1* | 11/2005 | Liberty | G06F 1/3215 345/156 |
| 2006/0007059 A1 | 1/2006 | Bell | |
| 2006/0238494 A1 | 10/2006 | Narayamaswami et al. | |
| 2007/0152976 A1* | 7/2007 | Townsend | G06F 3/0416 345/173 |
| 2007/0242033 A1* | 10/2007 | Cradick | G06F 3/0412 345/156 |
| 2008/0303782 A1 | 12/2008 | Grant et al. | |
| 2009/0102803 A1 | 4/2009 | Newman et al. | |
| 2009/0219247 A1* | 9/2009 | Watanabe | G06F 1/1615 345/157 |
| 2010/0053073 A1 | 3/2010 | Cohen et al. | |
| 2010/0056223 A1 | 3/2010 | Choi et al. | |
| 2010/0141605 A1* | 6/2010 | Kang | G06F 1/1626 345/174 |
| 2010/0164888 A1* | 7/2010 | Okumura | G06F 1/1626 345/173 |
| 2010/0194709 A1 | 8/2010 | Tamaki et al. | |
| 2011/0012849 A1 | 1/2011 | Cho et al. | |
| 2011/0050588 A1 | 3/2011 | Li et al. | |
| 2011/0069021 A1* | 3/2011 | Hill | G06F 3/0416 345/173 |
| 2012/0038613 A1* | 2/2012 | Choi | 345/211 |
| 2012/0319960 A1* | 12/2012 | Kildal et al. | 345/173 |
| 2013/0082916 A1* | 4/2013 | Dixit | G06F 3/011 345/156 |
| 2013/0162546 A1* | 6/2013 | Yeh | G06F 3/0221 345/173 |
| 2013/0169562 A1* | 7/2013 | Cho | G06F 3/0488 345/173 |
| 2013/0215035 A1* | 8/2013 | Guard | G06F 3/0221 345/168 |
| 2013/0342509 A1 | 12/2013 | Kang et al. | |
| 2014/0002402 A1 | 1/2014 | Kang et al. | |
| 2014/0292717 A1 | 10/2014 | Kang et al. | |
| 2014/0368436 A1* | 12/2014 | Abzarian | G06F 3/0488 345/168 |
| 2017/0255271 A1 | 9/2017 | Kang et al. | |

FOREIGN PATENT DOCUMENTS

| | | |
|---|---|---|
| EP | 2150031 A1 | 2/2010 |
| EP | 2202624 A2 | 6/2010 |
| EP | 0899650 B1 | 6/2011 |
| JP | 2011-34196 A | 2/2011 |
| KR | 10-2010-0065418 A | 6/2010 |
| WO | 2011/110260 A1 | 9/2011 |

OTHER PUBLICATIONS

International Search Report dated Jul. 23, 2013, by the International Searching Authority in corresponding International Application No. PCT/KR2013/002756.

Communication, dated Mar. 21, 2014, issued by the Australian Patent Office in counterpart Australian Patent Application No. 2013203010.

Communication dated Apr. 13, 2015 by the Australian Intellectual Property Office in related Application No. 2013203010.

Communication dated Nov. 21, 2014, issued by the Australian Intellectual Property Office in counterpart Australian Application No. 2013203010.

Communication dated May 9, 2016, issued by the European Patent Office in counterpart European Application No. 13162797.8.

Communication dated Dec. 14, 2016, issued by the Australian Patent Office in counterpart Australian Application No. 2015205902.

Communication dated Aug. 1, 2016, issued by the State Intellectual Property Office of P.R. China in counterpart Chinese application No. 201380018945.X.

Communication dated Aug. 12, 2016, issued by the Australian Patent Office in counterpart Australian Application No. 2015205902.

Communication dated Apr. 20, 2018 by the Korean Intellectual Property Office in counterpart Korean Patent Application No. 10-2012-0036474.

* cited by examiner

| PROTECTION LAYER | ~114 |
| --- | --- |
| DISPLAY PANEL | ~113 |
| DRIVER | ~112 |
| SUBSTRATE | ~111 |

FIG. 42
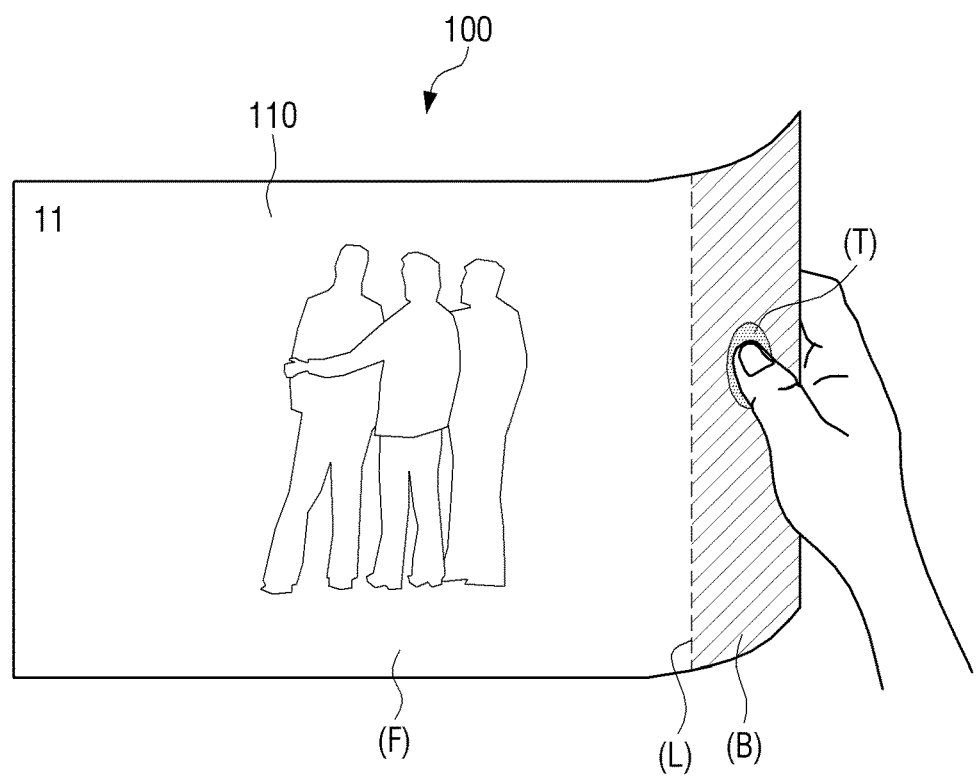
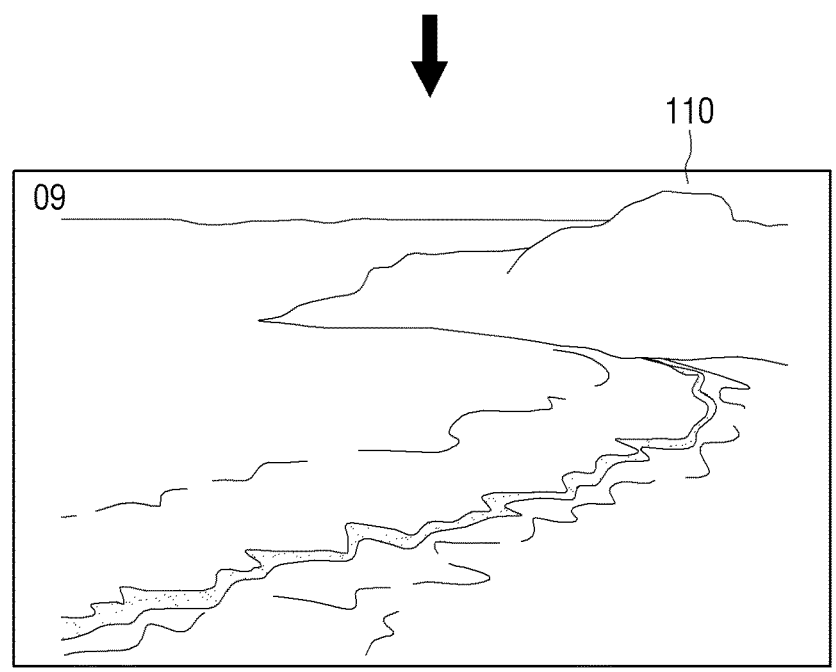

FLEXIBLE DISPLAY APPARATUS AND OPERATING METHOD THEREOF

CROSS-REFERENCE TO RELATED APPLICATION

This application claims priority from Korean Patent Application No. 10-2012-0036474, filed on Apr. 8, 2012 in the Korean Intellectual Property Office, the disclosure of which is incorporated herein by reference in its entirety.

BACKGROUND

1. Field

Apparatuses and methods consistent with exemplary embodiments relate to a flexible display apparatus and an operating method thereof, and more particularly, to a flexible display apparatus which can distinguish between intended and unintended inputs, and an operating method thereof.

2. Description of the Related Art

With the development of electronic technologies, various kinds of display apparatuses have been developed. In particular, display apparatuses such as television (TVs), personal computers (PCs), laptops, tablet PCs, mobile phones, and MP3 players are widely used to such an extent that they can be found in most households.

In order to meet consumer demands for new functions and new forms of displays, an effort to develop new forms of display apparatuses is ongoing. One of the results of this effort is a next generation display apparatus in the form of a flexible display apparatus.

The flexible display apparatus refers to a display apparatus that can be deformed or deformed into different shapes and configuration like paper or rubber.

The flexible display apparatus can be deformed by a force that is applied by a user and thus may be used for various purposes. For instance, the flexible display apparatus may be used for mobile apparatuses such as mobile phones, tablet PCs, electronic albums, personal digital assistants (PDAs), and MP3 players.

The flexible display apparatus has flexibility unlike existing display apparatuses. Considering this characteristic, various input methods using different deformation gestures in addition to an existing touch input method may be applied.

However, when applying such various input methods, there is problem that it is not always clear whether a flexible display apparatus is deformed according to a user's intention while the user is performing a deformation gesture or the deformation or other input was not intended by the user. Therefore, there is a need for a flexible display that can distinguish between intentional and unintentional inputs and perform functions accordingly, thus preventing unnecessary inputs and functions from being processed and executed.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a flexible display apparatus, which, if there is user's manipulation, can determine whether the manipulation is intended by the user or not, and can perform a corresponding operation, and an operating method thereof.

According to an aspect of an exemplary embodiment, there is provided a flexible touch-sensitive display device including: a display which is deformable, a sensor which senses an input comprising a touch of the display and a deformation of the display, and a controller which receives the input, determines whether to select one of only the touch and only the deformation based on a condition of the input, and selects i) only the touch if it is determined to select only the touch and ii) only the deformation if it is determined to select only the deformation.

The controller may also perform an operation corresponding to only the touch if it is determined to select only the touch and may also perform an operation corresponding to only the deformation if it is determined to select only the deformation.

The controller may also determine whether to select both the touch and the deformation based on the condition of the input, and the controller may further select iii) both the touch and the deformation if it is determined to select both the touch and deformation.

The condition of the input may be at least one of a property of the touch, a property of the deformation, a timing of the touch, a timing of the deformation, a usage history of the device, an input mode changing event, and a signal received from a second sensor.

The condition of the input may be at least one of a timing of the touch and a timing of the deformation. The timing of the deformation may include a predetermined period of time for accepting the deformation of the display and the timing of the touch may include a predetermined period of time for accepting the touch of the display.

The condition of the input may be a property of the touch and the property of touch may be one of a location of the touch, a pressure of the touch, a speed of the touch, a number touch points in the touch, and a frequency of the touch.

The condition of the input may be a property of the deformation and the property of the deformation may be one of a location of the deformation, a frequency of the deformation, an angle of the deformation, and a number of deformation lines in the deformation.

The condition of the input may be an input mode changing event and the input mode changing event may be activated by at least one of selecting a menu item displayed on a screen of the display, selecting a button provided on the flexible display apparatus, performing a predetermined touch gesture on the screen of the display, and deforming the display in a predetermined shape.

The condition of the input may be a usage history including pattern information corresponding to information about a history of inputs from a user of the device.

The information about a history of inputs from a user may include at least one of a pressure of the input, a location of the input, a date and time of the input, and an application being executed when the input is received.

The condition of the input may include at least one signal received from a second sensor, and the second sensor may include at least one of a non-touch gesture detector, an ambient light detector, an image sensor, an infrared sensor, an acceleration sensor, and a gyroscope.

The controller may further determines whether to reject both the touch and the deformation based on the condition of the input and reject both the touch and the deformation if it is determined to reject both the touch and the deformation.

According to an aspect of another exemplary embodiment, there is provided a method for operating a flexible touch-sensitive display device, the method including: sensing an input comprising a touch of the display and a deformation of the display, determining whether to select one of only the touch and only the deformation based on a condition of the input, selecting only the touch if it is determined to select only the touch, and selecting only the deformation if it is determined to select only the deformation.

The method may further include performing an operation corresponding to only the touch if it is determined to select only the touch and performing an operation corresponding to only the deformation if it is determined to select only the deformation.

The method may further include determining whether to select both the touch and the deformation based on the condition of the input, and selecting both the touch and the deformation if it is determined to select both the touch and deformation.

The condition of the input may be at least one of a property of the touch, a property of the deformation, a timing of the touch, a timing of the deformation, a usage history of the device, an input mode changing event, and a signal received from a second sensor.

The condition of the input may be at least one of a timing of the touch and a timing of the deformation. The timing of the deformation may include a predetermined period of time for accepting the deformation of the display and the timing of the touch may include a predetermined period of time for accepting the touch of the display.

The condition of the input may be a property of the touch and the property of touch may be one of a location of the touch, a pressure of the touch, a speed of the touch, a number touch points in the touch, and a frequency of the touch.

The condition of the input may be a property of the deformation and the property of the deformation may be one of a location of the deformation, a frequency of the deformation, an angle of the deformation, and a number of deformation lines in the deformation.

The condition of the input may be an input mode changing event and the input mode changing event may be activated by at least one of selecting a menu item displayed on a screen of the display, selecting a button provided on the flexible display apparatus, performing a predetermined touch gesture on the screen of the display, and deforming the display in a predetermined shape.

The condition of the input may be a usage history including pattern information corresponding to information about a history of inputs from a user of the device.

The information about a history of inputs from a user may include at least one of a pressure of the input, a location of the input, a date and time of the input, and an application being executed when the input is received.

The condition of the input may include at least one signal received from a second sensor, and the second sensor may include at least one of a non-touch gesture detector, an ambient light detector, an image sensor, an infrared sensor, an acceleration sensor, and a gyroscope.

The method may further include determining whether to reject both the touch and the deformation based on the condition of the input, and rejecting both the touch and the deformation if it is determined to reject both the touch and the deformation.

The method may be encoded on a non-transitory computer readable medium having recorded thereon instructions which are executed by a computer to perform the method.

BRIEF DESCRIPTION OF THE DRAWING FIGURES

The above and/or other aspects will be more apparent by describing in detail exemplary embodiments, with reference to the accompanying drawings, in which:

FIG. 2 is a view illustrating an example of a display which has flexibility;

FIG. 42 is a view illustrating an example of an operation which is performed according to the user's bend manipulation of FIG. 41;

DETAILED DESCRIPTION OF EXEMPLARY EMBODIMENTS

Figure 1:
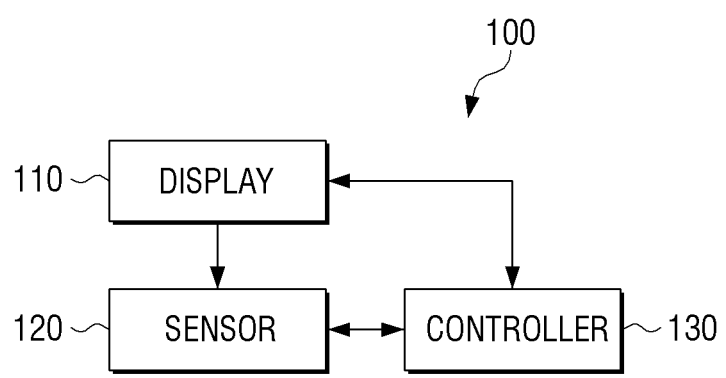
FIG. 1 is a block diagram illustrating a flexible display apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating a flexible display apparatus according to an exemplary embodiment. Referring to FIG. 1, a flexible display apparatus 100 includes a display 110, a sensor 120, and a controller 130.

The display 110 displays a screen. The flexible display apparatus 100 including the display 110 can be bent (e.g., deformed). Accordingly, the display 110 should have a bendable (e.g., deformable) structure and be made of a material so that it can be bent. The display 110 will be explained in detail below.

The sensor 120 senses a user's manipulation of the display 110. The user's manipulation can be one or more of a touch manipulation and bend (e.g., a deformation) manipulation by a user.

If the user's manipulation is sensed, the controller 130 determines whether the user's manipulation is intended by the user or not according to a state in which the user's manipulation is performed.

For example, the user may bend the flexible display apparatus 100 to control the flexible display apparatus 100 to perform a certain function. However, the user may also unintentionally bend the flexible display apparatus 100 when holding or carrying the flexible display apparatus 100. If the controller 130 determines that the user bends the flexible display apparatus 100 for the purpose of controlling the flexible display apparatus 100, the controller 130 determines which bend manipulation is being performed and intended by the user, performs the function corresponding to the bend manipulation intended by the user. The controller 130 may also determine that the other bend states are unintended bend manipulations.

Touch manipulation is determined in the same way. For example, the user may touch a menu on a screen of the flexible display apparatus 100 for the purpose of executing the menu. However, the user may also touch the flexible display apparatus when holding the flexible display apparatus 100 to bend it or holding the flexible display apparatus 100 to carry it. If the controller determines that the user touches the screen for the purpose of controlling the flexible display apparatus 100, the controller 130 determines the touch manipulation intended by the user and performs a function corresponding to the intended touch manipulation. The controller 130 may also determine that the other touch states are unintended touch manipulations.

If it is determined that touch or bend is not intended to perform a function or an unintentional input of the user, the controller 130 disregards the user's manipulation and maintains a current state. On the other hand, if it is determined that the touch or bend are manipulations intended by the user, the controller 130 performs an operation corresponding to the manipulations.

The state in which user's manipulation is performed may correspond to a touch location, a bend area, an intensity of touch, a bend speed, a number of times that bend is performed, a frequency of bending, a bend angle, an operation mode, information on whether a button is selected or not, and a type of an application or a function that is being executed when the user's manipulation is input.

The controller 130 determines whether the user's manipulation is intended by the user or not by considering various state items individually or collectively. The method for determining whether touch manipulation is intended and selecting an intended manipulation will be explained in detail below.

An operation corresponding to a user's manipulation may be implemented in various ways according to a type of the flexible display apparatus 100. For example, the flexible display apparatus 100 may provide a variety of functions according to its type. The flexible display apparatus 100 may perform a function that corresponds with a user's manipulation from among a plurality of functions that are programmed into the flexible display apparatus.

For example, if the flexible display apparatus 100 is a mobile phone, the controller 130 may perform an operation that corresponds to a user's manipulation from among a variety of operations such as calling, call-blocking, displaying a menu, transmitting and receiving messages, selecting and executing an application, and executing and ending a web browser and so on. In another example, if the flexible display apparatus 100 is a television (TV), the controller 130 may perform an operation that corresponds to a user's manipulation from among a variety of operations such as selecting a channel, adjusting a volume, adjusting brightness, adjusting color, and adjusting contrast and so on. The flexible display apparatus 100 may be used to implement various types of display apparatuses such as a personal digital assistant (PDA), an electronic album, an electronic book, an electronic note, an MP3 player, a tablet PC, a laptop computer, and a monitor, and may perform various operations according to their respective characteristics. Also, the flexible display apparatus 100 may perform a general operation such as locking, unlocking, turning on, or tuning off, regardless of its type.

An operation corresponding to a user's manipulation may be implemented in various ways according to an application which is executed in the flexible display apparatus 100. For example, a function corresponding to a user's manipulation, from among functions that are supported by an application, may be performed. In particular, if an e-book application is executed, the flexible display apparatus 100 may perform a function that corresponds to a user's manipulation from among a variety of functions such as changing content, turning over a page, enlarging, reducing, and a bookmark function.

The flexible display apparatus 100 may store information on a user's manipulation and an operation corresponding to the user's manipulation in advance. The controller 120 may identify an operation corresponding to a user's manipulation based on the stored information.

As described above, the display 110 should be manufactured in a bendable form. The sensor 120 may sense a bend in various ways.

Hereinafter, a detailed configuration of the display 110 and a method for sensing a bend of the display 110 will be explained in detail.

FIG. 2 is a view to illustrate a basic structure of the display which constitutes the flexible display apparatus according to an exemplary embodiment. Referring to FIG. 2, the display 110 includes a substrate 111, a driver 112, a display panel 113, and a protection layer 114.

The flexible display apparatus may be an apparatus that can be bent, deformed, crooked, folded or rolled like paper, while having display characteristics of a flat panel display apparatus. Accordingly, the flexible display apparatus should be manufactured on a flexible substrate. Specifically, the substrate 111 may be implemented by using a plastic substrate (for example, a polymer film) which is deformable by an external pressure.

The plastic substrate has a structure which is formed by barrier coating opposite surfaces of a base film. The base film may be implemented by using various resins such as polyimide (PI), polycarbonate (PC), polyethyleneterephtalate (PET), polyethersulfone (PES), polyethylenenaphthalate (PEN), and fiber reinforced plastic (FRP). The barrier coating is performed on the opposite surfaces of the base film. An organic membrane or an inorganic membrane may be used for the purpose of maintaining flexibility. The substrate 111 may also be formed of a flexible material such as thin glass or metal foil.

The driver 112 drivers the display panel 113. Specifically, the driver 112 applies a driving voltage to a plurality of pixels which constitute the display panel 113, and may be implemented by using a-si TFT, a low temperature poly silicon (LTPS) TFT, or an organic TFT (OTFT) and so on. The driver 112 may also be implemented in various forms according to the form of the display panel 113. For instance, the display panel 113 may consist of an organic light emitting substance which includes a plurality of pixel cells, and an electrode layer which covers opposite surfaces of the organic light emitting substance. In this case, the driver 112 may include a plurality of transistors corresponding to the plurality of pixel cells of the display panel 113. The controller 130 applies an electric signal to a gate of each transistor and controls the pixel cells connected to the transistors to emit light. Accordingly, an image is displayed.

The display panel 113 may be implemented by using an electroluminescent display (EL), an electrophoretic display (EPD), an electrochromic display (ECD), a liquid crystal display (LCD), an active matrix LCD (AMLCD), and a plasma display panel (PDP), besides an organic light emitting diode (OLED). If the display panel 113 is embodied by the LCD, it cannot emit light by itself and thus may require a separate backlight unit. If the LCD does not use backlight, it may use ambient light. In order to use the LCD display panel 113 without the backlight unit, an environment such as an outdoor environment which admits plenty of light may be used to operate the LCD.

The protection layer 114 protects the display panel 113. For example, the protection layer 114 may be made of ZrO, CeO2, or Th O2. The protection layer 114 may be manufactured as a transparent film and may cover the entire surface of the display panel 113.

The display 110 may also be implemented by using electronic paper (e-paper). The e-paper is a display that applies general ink characteristics to paper, and is different from a general flat panel display in that it uses reflected light. The electronic paper may change a picture or text using electrophoresis, which uses a twist ball or a capsule.

If the display 110 is comprised of elements which are made of a transparent material, the display 110 may be implemented as a display apparatus that is bendable and transparent. For example, if the substrate 111 is made of a polymer material such as plastic having transparency, if the driver 112 is implemented by using a transparent transistor, and if the display panel 113 is implemented by using a transparent organic light emitting layer and a transparent electrode, the display 110 may have transparency.

Figure 3:
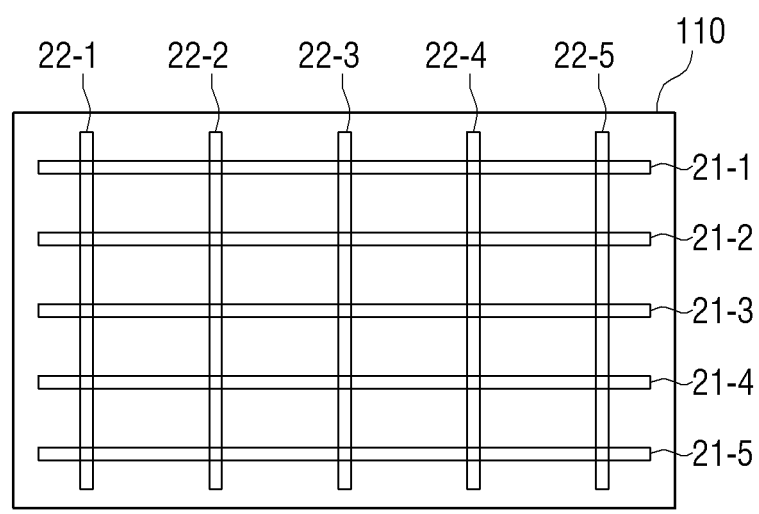
FIGS. 3 to 5 are views illustrating an example of a method for sensing bend of a flexible display apparatus according to an exemplary embodiment.
Figure 4:
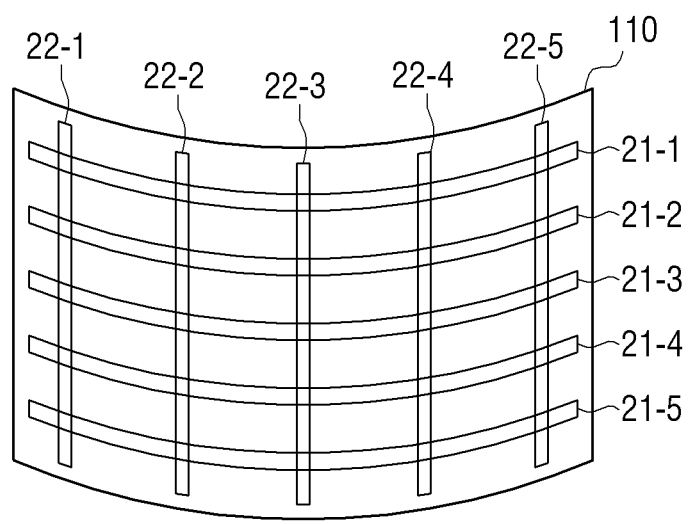
Figure 5:
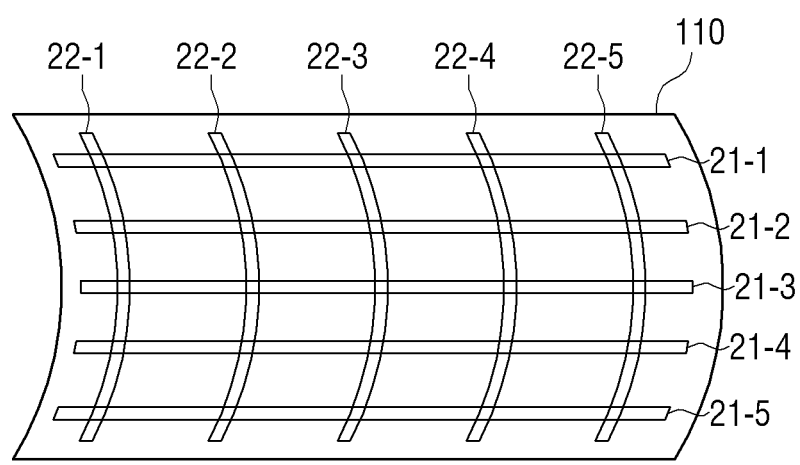

The transparent transistor refers to a transistor that is manufactured by substituting opaque silicon of an existing thin film transistor with a transparent material such as zinc oxide or titanium oxide. The transparent electrode may be made of advanced materials such as indium tin oxide (ITO) or graphene. Graphene refers to a material that has a planar structure of a honeycomb shape in which carbon atoms are connected to one another, and has transparency. The transparent organic light emitting layer may be implemented by using various materials. FIGS. 3 to 5 are views to illustrate an example of a method for sensing shape deformation in the flexible display apparatus, that is, bend, according to an exemplary embodiment.

The flexible display apparatus 100 can be bent by an external pressure and its shape can be deformed. The term "bend" may include "normal bend", "folding," "rolling" and any deformation that may be programmed according to the degree of the bend angle, curvature of the bend, and the area of the bend. The normal bend means a state in which the flexible display apparatus 100 is bent.

The folding refers to a state in which the flexible display apparatus 100 is folded. The folding and the normal bend may be distinguished from each other by a degree of bend (e.g., deformation). For example, if a bend is performed by more than a predetermined bend angle, the bend corresponds to a folding deformation, and, if a bend is performed by less than the predetermined bend angle, the bend corresponds to a normal bend.

The rolling refers to a state in which the flexible display apparatus is rolled. The rolling is also determined based on a bend angle. For example, if a bend of more than a predetermined bend angle is sensed over a predetermined area, the bend corresponds to a rolling deformation. On the other hand, if a bend of less than the predetermined bend angle is sensed in an area relatively smaller than that of rolling, the bend corresponds to a folding deformation. The normal bend, folding and rolling described above may be determined based on a radius of curvature besides the bend angle.

Also, a state in which the rolled flexible display apparatus 100 has a substantially circular or oval cross section may be set to correspond to rolling, regardless of a radius of curvature.

The definitions of the various shape deformation examples described above are merely an example and shape deformation may be set differently according to the type, size, weight, and characteristic of the flexible display apparatus. For example, if the flexible display apparatus 100 can be bent to such an extent that the surfaces are in contact with each other, the state in which the surfaces of the flexible display apparatus 100 are in contact with each other by bend may correspond to folding the display. On the other hand, a state in which a front surface and a rear surface of the flexible display apparatus are in contact with each other by bend may correspond to rolling the display.

For the convenience of explanation, various bend shapes described above and other bend shapes may be referred to as a "bend" or a "deformation". The flexible display apparatus 100 may sense a bend in various ways.

For example, the sensor 120 may include a bend sensor which is disposed on one surface such as a front surface or a rear surface of the display 110, or a bend sensor which is disposed on opposite surfaces of the display 110. The controller 130 may sense bend using a value which is sensed by the bend sensor of the sensor 120.

The bend sensor (e.g., a deformation sensor) refers to a sensor that can be bent and has a resistance value which varies according to a degree of bend. The bending sensor may be implemented by using devices such as an optical fiber bending sensor, a pressure sensor, and a strain gauge.

The sensor 120 may sense a resistance value of the bend sensor using a level of a voltage applied to the bend sensor or an intensity of a current flowing in the bend sensor, and may sense bend in a location of the bend sensor according to the sensed resistance value.

In FIG. 3, the bend sensor is embedded in the front surface of the display 110. However, this is merely an example and the bend sensor may be embedded in the rear surface of the display 110 or may be embedded in opposite surfaces. Also, the shape, number, and location of bend sensors may be changed variously. For example, the display 110 may include a single bend sensor or a plurality of bend sensors which are connected to one another. The single bend sensor may sense one bend data, but may include a plurality of sensing channels to sense a plurality of bend data.

FIG. 3 illustrates an example of a plurality of bar-shaped bend sensors which are arranged in a vertical direction and a horizontal direction in a grid pattern.

Referring to FIG. 3, the bend sensor includes bend sensors 21-1 to 21-5 which are arranged in a first direction, and bend sensors 22-1 to 22-5 which are arranged in a second direction which is perpendicular to the first direction. The bend sensors are disposed away from one another by a predetermined distance.

In FIG. 3, five bend sensors (21-1 to 21-5, 22-1 or 22-5) are arranged in each of the horizontal direction and the vertical direction in a grid formation. However, this is merely an example and the number of bend sensors may be changed according to a size of the flexible display apparatus 100. The bend sensors are arranged in the horizontal direction and the vertical direction to sense bending from the entire area of the flexible display apparatus. Therefore, if only a part of the flexible display apparatus is flexible or if the flexible display apparatus needs to sense bend from only a part of the apparatus, the bend sensor may be arranged in only a corresponding portion of the apparatus.

Each of the bend sensors 21-1 to 21-5, 22-1 to 22-5 may be implemented by using an electric resistance sensor which uses an electric resistance, or a micro optical fiber sensor which uses a strain of an optical fiber. Hereinafter, the bend sensor will be explained with the assumption that the bend sensor is the electric resistance sensor for the convenience of explanation.

Specifically as shown in FIG. 4, if the flexible display apparatus 100 is bent so that its center area with reference to left and right edges is oriented downwardly, tension caused by bend is exerted to the bend sensors 21-1 to 21-5 which are arranged in the horizontal direction. Therefore, the resistance value of each of the bend sensors 21-1 to 21-5 arranged in the horizontal direction is changed. The sensor 120 senses the change in the output value output from each of the bend sensor 21-1 to 21-5 and thus determines that bend is performed in the horizontal direction with reference to the center of a display surface. In FIG. 4, the center area is bent in a downward direction (hereinafter, referred to as a Z− direction) which is perpendicular to the display surface. However, even if the center area is bent in an upward direction (hereinafter, referred to as a Z+ direction) with reference to the display surface, the bend may be sensed based on the change in the output values of the bend sensors 21-1 to 21-5 arranged in the horizontal direction.

If the flexible display apparatus 100 is bent so that the center area with reference to upper and lower edges is oriented upwardly as shown in FIG. 5, tension is exerted to the bend sensors 22-1 to 22-5 which are arranged in the vertical direction. The sensor 120 may sense shape deformation of the vertical direction based on the output values of the bend sensors 22-1 to 22-5 arranged in the vertical direction. Although the bend in the Z+ direction is illustrated in FIG. 5, bend in the Z− direction may also be sensed using the bend sensors 22-1 to 22-5 which are arranged in the vertical direction.

If shape deformation occurs in a diagonal direction, tension is exerted to all of the bend sensors which are arranged in the horizontal direction and the vertical direction. Therefore, the shape deformation of the diagonal direction may be sensed based on the output values of the bend sensors which are arranged in the horizontal and vertical directions.

Hereinafter, a method for sensing each shape deformation such as normal bend, folding, and rolling using a bend sensor will be explained in detail.

Figure 6:
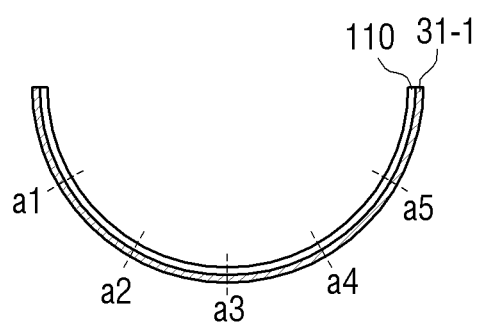
FIGS. 6 to 8 are views to illustrate an example of a method for sensing bend using a bend sensor in a flexible display apparatus.
Figure 7:
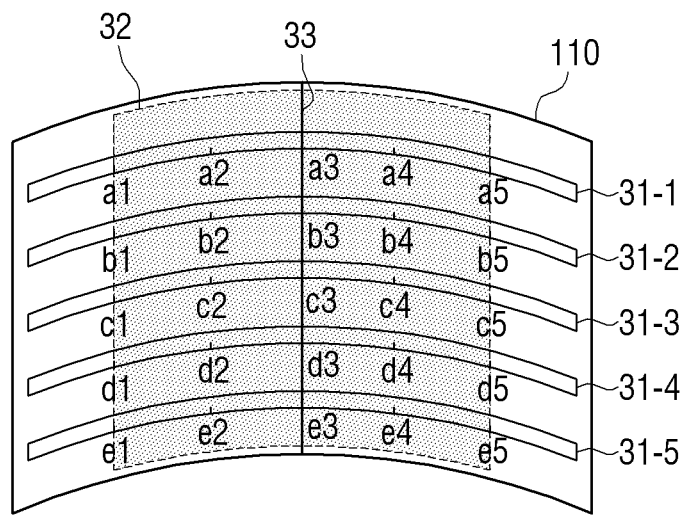
Figure 8:
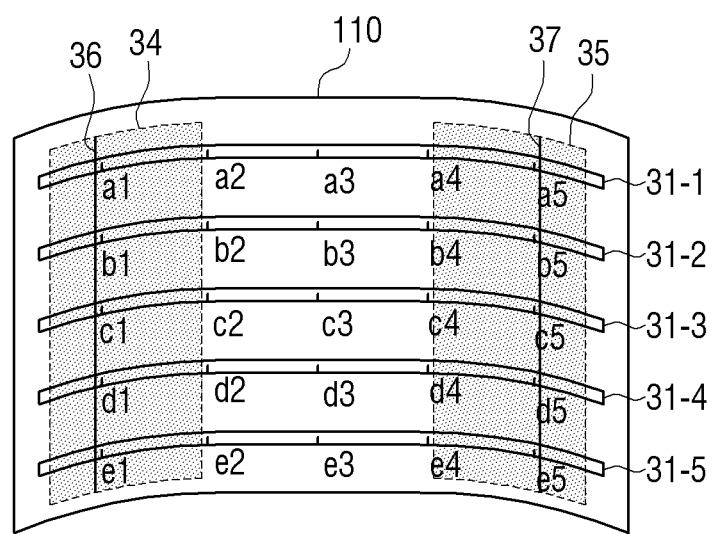

FIGS. 6 to 8 are views to illustrate a method for sensing a bend in the display apparatus using the bend sensors according to an exemplary embodiment.

First, FIG. 6 is a cross section view of the flexible display apparatus 100 when the flexible display apparatus is bent.

If the flexible display apparatus 100 is bent, the bend sensors, which are arranged on one surface or opposite surfaces of the flexible display apparatus 100, are also bent and have resistance values corresponding to a magnitude of exerted tension, and output values corresponding to the resistance values.

For instance, if the flexible display apparatus 100 is bent as shown in FIG. 6, a bend sensor 31-1 which is disposed on a rear surface of the flexible display apparatus 100 is also bent and outputs a resistance value according to a magnitude of exerted tension.

In this case, the magnitude of the tension increases in proportion to a degree of bend. If the bend occurs as shown in FIG. 6, the maximum bend occurs in the center area. Accordingly, the maximum tension is exerted to the bend sensor 31-1, which is disposed at a point a3 which is the center area, and accordingly, the bend sensor 31-1 has the maximum resistance value. On the other hand, the degree of bend gradually decreases toward the outside. Accordingly, the bend sensor 31-1 has smaller resistance values as it goes away from the point a3 to points a2 and a1 or points a4 and a5.

If the resistance value output from the bend sensor has the maximum value at a specific point and gradually decreases in outward directions, the sensor 120 may determine that the area from which the maximum resistance value is sensed is most significantly bent. Also, if an area has no change in the resistance value, the sensor 120 determines that the area is a flat area in which bend is not performed, and, if an area has the resistance value changed more than a predetermined value, determines that the area is a bent area in which a degree of bend occurs.

FIGS. 7 and 8 are views to illustrate a method for defining a bend area according to an exemplary embodiment. FIGS. 7 and 8 are views to illustrate the case in which the flexible display apparatus 100 is bent in the horizontal direction with reference to the front surface, and thus do not illustrate the bend sensors which are arranged in the vertical direction for the convenience of explanation. Although different reference numerals are used for the bend sensors in each drawing, the bend sensors illustrated in FIG. 3 may be used as they are.

A bend area is an area in which the flexible display apparatus is bent. Since the bend sensor also can be bent by bending the flexible display apparatus 100, all points at which the bend sensors output different resistance values from originals values may delineate a bend area.

The sensor 120 may sense a length of a bend line, a direction of the bend line, a location of the bend line, a number of bend lines, a number of times that bend is performed, a bend speed of a shape deformation, a range of a bend area, a location of the bend area, and a number of bend areas, based on a relationship between the points at which a change in the resistance value is sensed.

Specifically, if a distance between the points at which the change in the resistance value is sensed lies within a predetermined distance, the points are sensed as one bend area. On the other hand, if the distance between the points at which the change in the resistance value is sensed lies beyond the predetermined distance, different bend areas are delineated with reference to these points. This will be explained in detail below with reference to FIGS. 7 and 8.

FIG. 7 is a view to illustrate a method for sensing one bend area. If the flexible display apparatus 100 is bent as shown in FIG. 7, the resistance values from points a1 to a5 of a bend sensor 31-1, from points b1 to b5 of a bend sensor 31-2, from c1 to c5 of a bend sensor 31-3, from points d1 to d5 of a bend sensor 31-4, and from points e1 to e5 of a bend sensor 31-5 are different from the resistance values from the aforementioned points in their default or original state.

In this case, the points at which the change in the resistance value is sensed in each bend sensor 31-1 to 31-5 are located within a predetermined distance and are continuously arranged.

Accordingly, the sensor 120 senses an area 32 which includes all of the points, from points a1 to a5 of the bend sensor 31-1, from points b1 to b5 of the bend sensor 31-2, from points c1 to c5 of the bend sensor 31-3, from points d1 to d5 of the bend sensor 31-4, and from points e1 to e5 of the bend sensor 31-5, as one bend area.

FIG. 8 is a view to illustrate a method for sensing a plurality of bend areas.

In FIG. 8, according to a bend of the flexible display apparatus, the resistance values from points a1 to a2 and from points a4 to a5 of the bend sensors 31-1, from points b1 to b2 and from points b4 to b5 of the bend sensor 31-2, from the points c1 to c2 and from points c4 to c5 of the bend sensor 31-3, from the points d1 to d2 and from the points d4 to d5 of the bend sensors 31-4, and from the points e1 to e2 and from the points e4 to e5 of the bend sensor 31-5 are different from the resistance values of points in their default or original state.

The points from a1 to a2 and the points from a4 to a5 in the bend sensor 31-1 are continuous with reference to each point. However, since a point a3 exists between the points a2 and a4, the points from a2 to a4 are not continuous. Accordingly, if the points a2 and a4 are regarded as being disposed away from each other by a predetermined distance, the bend area is divided into a different bend area from the points a1 to a2 and a bend area from the points a4 to a5. Also, the points in the other bend sensors 31-2 to 31-5 may be divided in this way.

Accordingly, the flexible display apparatus 100 delineates an area 34 including all of the points from a1 to a2 of the bend sensor 31-1, from b1 to b2 of the bend sensor 31-2, from c1 to c2 of the bend sensor 31-3, from d1 to d2 of the bend sensor 31-4, and from e1 to e2 of the bend sensor 31-5, as one bend area, and delineates an area 35 including all of the points from a4 to a5 of the bend sensor 31-1, from b4 to b5 of the bend sensor 31-2, from c4 to c5 of the bend sensor 31-3, from d4 to d5 of the bend sensor 31-4, and from e4 to e5 of the bend sensor 31-5, as another bend area.

The bend area may include a bend line. The bend line refers a line which connects the points at which the maximum resistance value is sensed in each bend area.

For instance, in the case of FIG. 7, a line 33 in the bend area 32, which connects the point a3 at which the maximum resistance value is output in the bend sensor 31-1, the point b3 at which the maximum resistance value is output in the bend sensor 31-2, the point c3 at which the maximum resistance value is output in the bend sensor 31-3, the point d3 at which the maximum resistance value is output in the bend sensor 31-4, and the point e3 at which the maximum resistance value is output in the bend sensor 31-5, corresponds to a bend line. FIG. 7 illustrates the bend line which is formed in the center area of the display surface in the vertical direction.

In the case of FIG. 8, a line 36 in the bend area 34, which connects the point a1 at which the maximum resistance value is output in the bend sensor 31-1, the point b1 at which the maximum resistance value is output in the bend sensor 31-2, the point c1 at which the maximum resistance value is output in the bend sensor 31-3, the point d1 at which the maximum resistance value is output in the bend sensor 31-4, and the point e1 at which the maximum resistance value is output in the bend sensor 31-5, delineates one bend line. Also, a line 37 in the bend area 35, which connects the point a5 at which the maximum resistance value is output in the bend sensor 31-1, the point b5 at which the maximum resistance value is output in the bend sensor 31-2, the point c5 at which the maximum resistance value is output in the bend sensor 31-3, the point d5 at which the maximum resistance value is output in the bend sensor 31-4, and the point e5 at which the maximum resistance value is output in the bend sensor 31-5, delineates another bend line. That is, in FIG. 8, the two vertical bend lines are formed near the left and right edges of the display surface.

Figure 9:
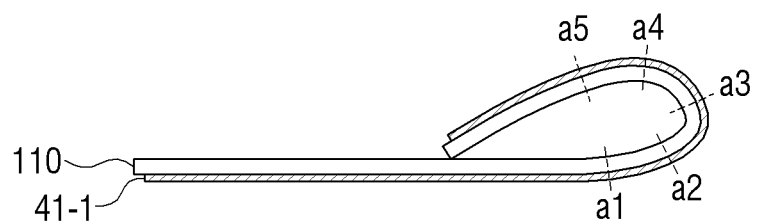
FIGS. 9 and 10 are views to illustrate an example of a method for sensing folding using a bend sensor in a flexible display apparatus.
Figure 10:
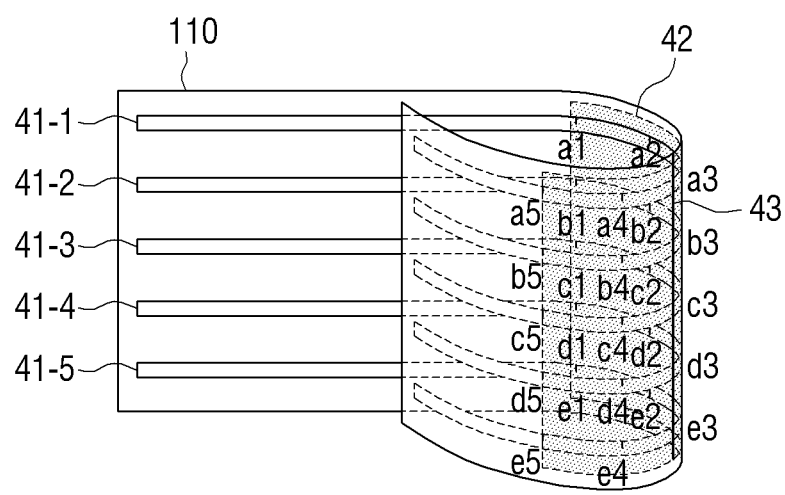

FIGS. 9 and 10 are views to illustrate an example of a method for sensing a fold of the flexible display apparatus.

FIG. 9 is a cross section view of the flexible display apparatus 100 when the flexible display apparatus 100 is folded.

If the flexible display apparatus 100 is folded, a bend sensor which is disposed on one surface or opposite surfaces of the flexible display apparatus 100 is also bent and has a resistance value corresponding to a magnitude of exerted tension.

For example, if the right edge of the flexible display apparatus 100 is folded in a direction toward the center as shown in FIG. 9, a bend sensor 41-1, which is disposed on the rear surface of the flexible display apparatus 100, is also bent and outputs a resistance value according to a magnitude of exerted tension.

That is, like in the case of bend, the bend sensor 41-1 has the maximum resistance value at a point a3 at which the magnitude of the exerted tension is maximum, and has smaller resistance values as it goes away from the point a3 in outward directions. That is, the bend sensor 41-1 has smaller resistance values as it goes away from the point a3 to points a2 and a1 or points a4 and a5.

If the flexible display apparatus 100 is folded, that is, is bent greater than a predetermined bend angle, a resistance value greater than a predetermined value is sensed at a point corresponding to a bend line. Accordingly, the controller 130 may determine whether a bend is a folding deformation or a normal bend according to a level of the resistance value.

If the flexible display apparatus 100 is bendable to such an extent that their surfaces meet with each other, the controller 130 may determine whether the bend is folding or not, considering touch as well. That is, if the right edge of the flexible display apparatus 100 is bent in the Z+ direction and is folded toward the front surface as shown in FIG. 9, areas distanced away from each other are brought into contact with each other on the front surface of the flexible display apparatus. In this case, touch is sensed in one area of the display surface and a change in the resistance value is greater than that in normal bend. Accordingly, the controller 130 calculates a distance from the edge where bend occurs to the bend line, and, if touch is sensed at a point which is distanced away from the bend line in the opposite direction as much as the calculated distance, determines that folding is performed.

FIG. 10 is a view to illustrate a method for determining a folding area according to an exemplary embodiment. Since FIG. 10 is to illustrate a case in which the flexible display apparatus is folded in the horizontal direction with reference to the front surface, bend sensors which are arranged in the vertical direction are not illustrated for the convenience of explanation.

A folding area is a bent area which is formed when the flexible display apparatus is folded, and may be one or two or more areas including all points of the bend sensors which output different resistance values from those of the original state when the bend sensors are bent like in a normal bend. The method for defining and dividing the folding area is the same as for the bend area and thus a redundant explanation is omitted.

Referring to FIG. 10, an area 42, which includes points at which output resistance values are different from those of the original state, that is, from points a1 to a5 of a bend sensor 41-1, from points b1 to b5 of a bend sensor 41-2, from points c1 to c5 of a bend sensor 41-3, from points d1 to d5 of a bend sensor 41-4, and from points e1 to e5 of a bend sensor 41-5, delineates one folding area.

The folding area is divided into two areas with reference to a folding line. The folding line refers to a line which connects points at which the maximum resistance value is output in each folding area. The meaning of the folding line may be the same as that of the bend line.

In FIG. 10, a line 43 in the folding area 42, which connects the point a3 at which the bend sensor 41-1 outputs the maximum resistance value, the point b3 at which the bend sensor 41-2 outputs the maximum resistance value, the point c3 at which the bend sensor 41-3 outputs the maximum resistance value, the point d3 at which the bend sensor 41-4 outputs the maximum resistance value, and the point e3 at which the bend sensor 41-5 outputs the maximum resistance value, delineates the folding line.

If folding is sensed, the controller 130 may perform a different operation from that of normal bend. For example, the controller 130 may display a different content screen on each folding area.

As described above, the flexible display apparatus 100 may be rolled like paper or rubber, etc. The controller 130 may determine whether rolling is performed or not using a result sensing by the sensor 120.

Figure 11:
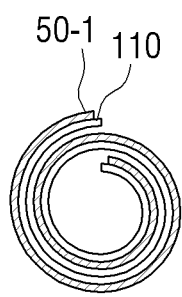
FIGS. 11 to 13 are views to illustrate a method for sensing rolling using a bend sensor in a flexible display apparatus.
Figure 12:
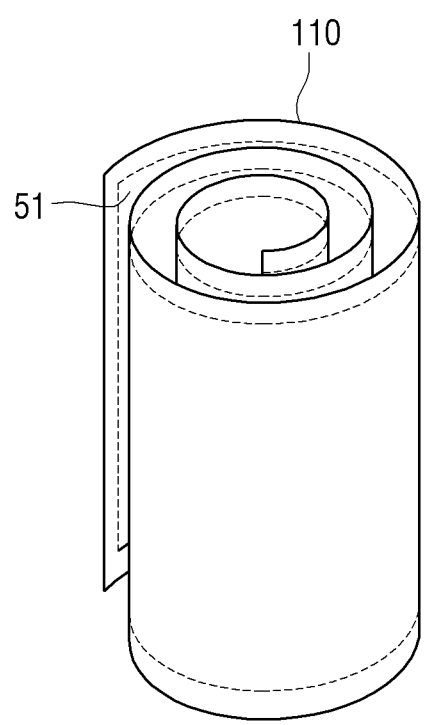
Figure 13:
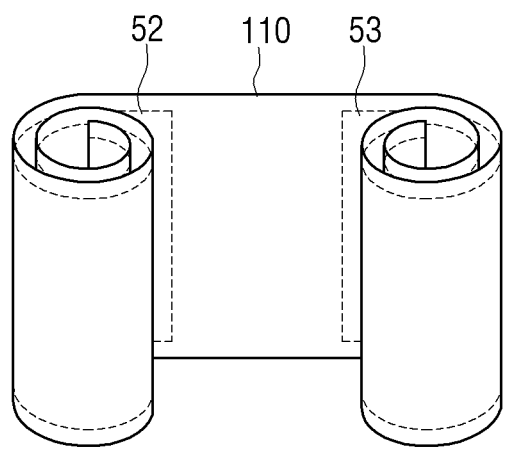

FIGS. 11 to 13 are views to illustrate a method for sensing a rolling of the flexible display apparatus.

First, FIG. 11 illustrates a cross section view when the flexible display apparatus 100 is rolled.

As described above, if the flexible display apparatus 100 is rolled, tension is exerted to bend sensors which are arranged on one surface or opposite surfaces of the flexible display apparatus.

In this case, since magnitudes of tension exerted to the bend sensors are deemed to be similar within a predetermined range, resistance values output from the bend sensors are also similar within a predetermined range.

In order to perform the rolling, bend should be performed to have a curvature greater than a predetermined curvature. If the rolling is performed, a bend area greater than that of normal bend or folding is formed. Accordingly, if a bend of an angle greater than a predetermined bend angle is performed continuously on an area greater than a predetermined size, the controller 130 determines that rolling is performed. Also, in the rolling state, the front surface and the rear surface of the flexible display apparatus are brought into contact with each other. For example, as shown in FIG. 11, if one edge of the flexible display apparatus 100 is bent in the Z+ direction and is rolled inward the display surface, the display surfaces, that is, the front surface, and the rear surface on which a bend sensor 50-1 is disposed are brought into contact with each other.

Accordingly, in another example, the controller 130 may determine whether the flexible display apparatus 100 is rolled or not according to whether the front surface and the rear surface of the flexible display apparatus 100 are brought into contact with each other or not. In this case, the sensor may include a touch sensor. If the resistance values output from the bend sensors are similar within a predetermined range and touch is sensed by the touch sensors disposed on the front surface and the rear surface of the flexible display apparatus, the controller 140 determines that the flexible display apparatus is rolled. Also, the controller 130 may determine whether the flexible display apparatus 100 is bent and some areas of the flexible display apparatus 100 are brought into contact with each other or are close to each other using a magnetic sensor, an optical sensor, or a proximity sensor instead of the touch sensor.

FIGS. 12 and 13 are views to illustrate a method for delineating a rolling area according to an exemplary embodiment.

The rolling area refers to an entire area of the flexible display apparatus which is bent and rolled. Like in a normal bend or folding, the rolling area refers to one or two or more areas which include all points of bend sensors at which different resistance values from those of the original state are output. The method for defining and dividing the rolling area is the same as that of the bend or folding area, and thus a redundant explanation is omitted.

If the flexible display apparatus 100 is wholly rolled as shown in FIG. 12, an entire area 51 of the flexible display apparatus 100 is defined as the rolling area. If the flexible display apparatus 100 is rolled in part and points at which different resistance values from those of the original state are output and are distanced from each other by a predetermined distance as shown in FIG. 13, then partial areas 52 and 53 of the flexible display apparatus 100 are delineated as different rolling areas.

As described above, the flexible display apparatus 100 is bent in various shapes and the controller 130 senses each bend shape based on a result of sensing by the sensor 120. Also, the controller 130 may sense a degree of bend, that is, a bend angle, based on a result of sensing by the sensor 120.

Figure 14:
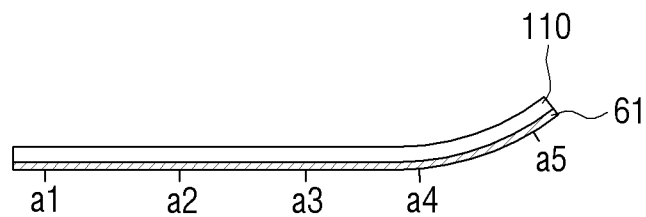
FIGS. 14 and 15 are views to illustrate a method for determining a degree of shape deformation in a flexible display apparatus.
Figure 15:
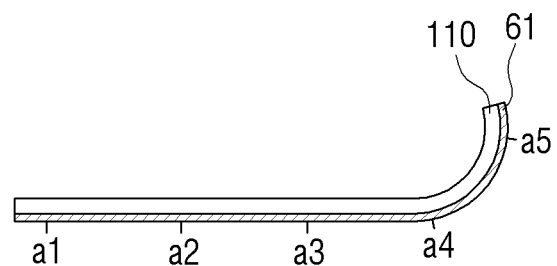

FIGS. 14 and 15 are views to illustrate a method for determining a degree of bend.

Referring to FIGS. 14 and 15, the flexible display apparatus 100 determines a degree of bend of the flexible display apparatus 100 using a change in the resistance value output from the bend sensor at a predetermined interval.

Specifically, the controller 130 calculates a difference between a resistance value of a point where the maximum resistance value of a bend sensor is output and a resistance value output at a point which is disposed away from the point of the maximum resistance value by a predetermined distance.

The controller 130 determines a degree of bend using the calculated difference in the resistance value. Specifically, the flexible display apparatus 100 divides the degree of bend into a plurality of levels, matches each level with a resistance value of a predetermined range, and stores the matched values.

Accordingly, the flexible display apparatus 100 determines the degree of bend according to which level of the plurality of levels corresponds to the calculated resistance value difference.

For instance, as shown in FIGS. 14 and 15, the degree of bend is determined based on a difference between a resistance value output at a point a5 where a bend sensor 61 disposed on the rear surface of the flexible display apparatus 100 outputs the maximum resistance value, and a resistance value output at a point a4 which is disposed away from the point a5 by a predetermined distance.

Specifically, a level corresponding to the resistance value difference, which is calculated in the exemplary embodiment of FIGS. 14 and 15, is identified from among the plurality of pre-stored levels, and a degree of bend is determined based on the identified level. The degree of bend may be represented by a bend angle or an intensity of bend.

Since the degree of bend illustrated in FIG. 15 is greater than that of FIG. 14, the difference between the resistance value output at the point a5 and the resistance value output at the point a4 in the exemplary embodiment of FIG. 15 is greater than the difference between the resistance value output at the point a5 and the resistance value output the point a4 in the exemplary embodiment of FIG. 14. Accordingly, if the flexible display apparatus 100 is bent as shown in FIG. 15, the controller 130 may determine that the degree of bend is increased.

The controller 130 may perform an appropriate operation according to a degree of bend. For example, if the degree of bend is increased while a channel zapping operation (e.g., a channel changing or channel surfing operation, etc.) is performed, the controller 130 may increase a channel zapping speed or may extend a channel zapping range. On the other hand, if the degree of bend is decreased, the channel zapping is performed more slowly or within a smaller number of channels. Volume control or content conversion may be performed differently according to the degree of bend.

As described above, the flexible display apparatus 100 may be bent in different directions, a Z+ direction or a Z− direction.

The bend direction may be sensed in various ways. For instance, two bend sensors may be disposed one on the other and the bend direction is determined based on a difference of change in the resistance value of each bend sensor. A method for sensing a bend direction using overlapping bend sensors will be explained with reference to FIGS. 16 to 18.

Figure 16:
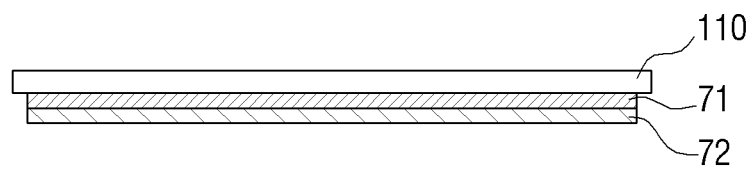
FIGS. 16 to 18 are views illustrating an example of a method for sensing a bend direction in a flexible display apparatus.
Figure 17:
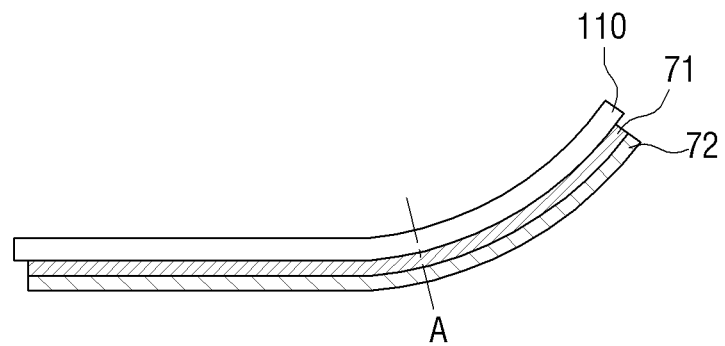
Figure 18:
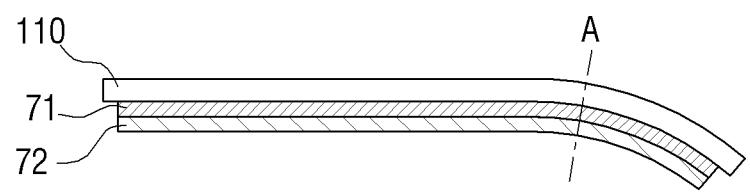

For the convenience of explanation, in FIGS. 16 to 18, the method is explained on the assumption that a normal bend is performed. However, the same method may be applied to folding or rolling.

Referring to FIG. 16, two bend sensors 71 and 72 may be disposed overlapping each other on one side of the display 110. In this case, if a bend is performed in one direction, different resistance values are output from the upper bend sensor 71 and the lower bend sensor 72 at a point where the bend is performed. Accordingly, a bend direction may be determined by comparing the resistance values of the two bend sensors 71 and 72 at the same point.

Specifically, if the flexible display apparatus 100 is bent in the Z+ direction as shown in FIG. 17, tension exerted to the lower bend sensor 72 is greater than that of the upper bend sensor 71 at a point 'A' corresponding to a bend line.

On the other hand, if the flexible display apparatus 100 is bent toward the rear surface as shown in FIG. 18, tension exerted to the upper bend sensor 71 is greater than that of the lower bend sensor 72.

Accordingly, the controller 130 senses the bend direction by comparing the resistance values of the two bend sensors 71 and 72 at the point A.

Although the two bend sensors are disposed overlapping each other on one side of the display 110 in FIGS. 16 to 18, the bend sensors may be disposed on opposite surfaces of the display 110.

Figure 19:
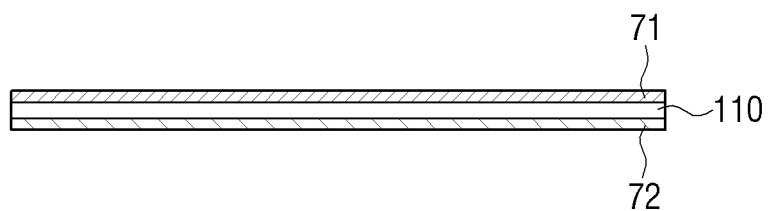
FIGS. 19 to 21 are views illustrating various examples of a structure to sense a bend of a flexible display apparatus.

FIG. 19 illustrates the two bend sensors 71 and 72 which are disposed on the opposite surfaces of the display 110.

Accordingly, if the flexible display apparatus 100 is bent in a first direction perpendicular to the screen, that is, the Z+ direction, the bend sensor which is disposed on a first surface of the opposite surfaces of the display 110 is subject to a compressive force, whereas the bend sensor which is disposed on a second surface is subject to tension. On the other hand, if the flexible display apparatus 100 is bent in a second direction opposite to the first direction, that is, the Z− direction, the bend sensor disposed on the second surface is subject to a compressive force, whereas the bend sensor disposed on the first surface is subject to tension. As described above, the different values are detected from the two bend sensors according to the bend direction and the controller 130 determines the bend direction according to a detection characteristic of the value.

Although the bend direction is sensed using the two bend sensors in FIGS. 16 to 19, the bend direction may be sensed by means of only a strain gage disposed on one surface of the display 110. That is, a compressive force or tension is exerted to the strain gage disposed on one surface according to a bend direction, and thus a bend direction can be determined by identifying a characteristic of the output value.

Figure 20:
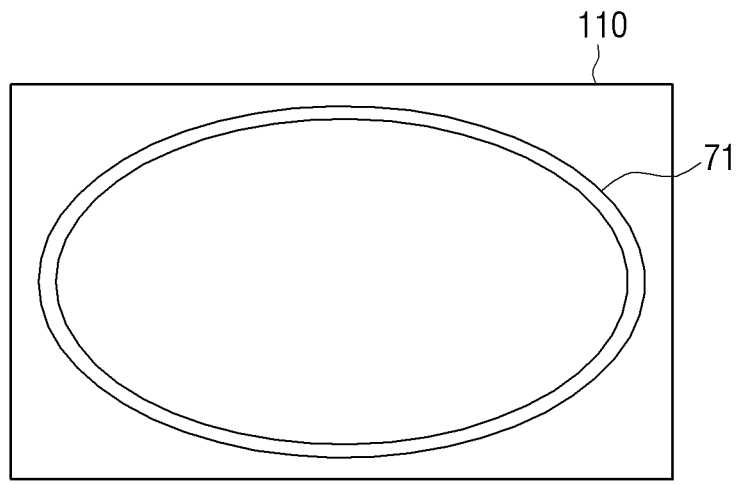

FIG. 20 is a view illustrating an example of a single bend sensor which is disposed on one surface of the display 110 to sense a bend. Referring to FIG. 20, a bend sensor 71 may be implemented in a form of a looped curve forming a circle, a quadrangle, or other polygons, and may be disposed along an edge of the display 110. The controller 130 may determine a point at which a change in an output value of the looped curve is sensed to be a bend area. The bend sensor may be connected to the display 110 in a form of an open curve such as an S shape, a Z shape, or a zigzag shape.

Figure 21:
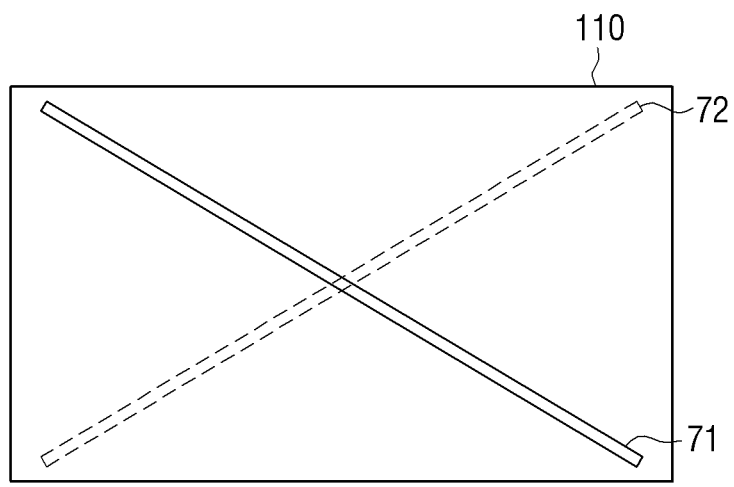

FIG. 21 is a view illustrating two bend sensors which intersect. Referring to FIG. 21, a first bend sensor 71 is disposed on a first surface of the display 110 and a second bend sensor 72 is disposed on a second surface of the display 110. The first bend sensor 71 is disposed on the first surface of the display 110 in a first diagonal direction, and the second bend sensor 72 is disposed on the second surface in a second diagonal direction. Accordingly, output values and output points of the first and second bend sensors 71 and 72 are changed according to various bend conditions such as a case in which each corner is bent, a case in which each edge is bent, a case in which a center is bent, and a case in which folding or rolling is performed. Accordingly, the controller 130 may determine which type of bend is performed according to a characteristic of the output value.

Although line type bend sensors are used in the above-described various exemplary embodiments, bend may be sensed using a plurality of separate strain gages.

Figure 22:
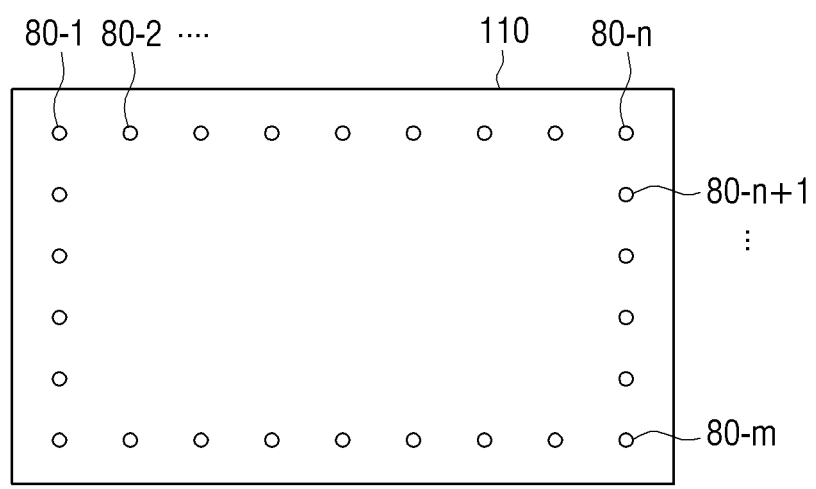
FIG. 22 is a view illustrating another example of a structure to sense a bend of a flexible display apparatus.
Figure 23:
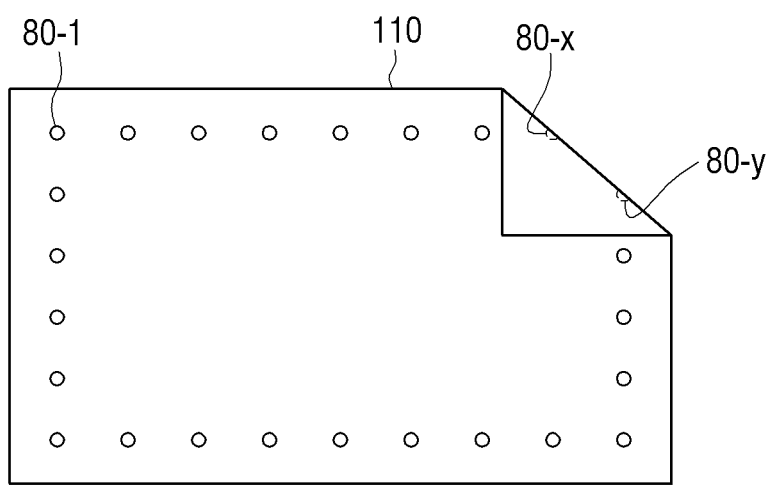
FIG. 23 is a view to illustrate a method for sensing bend using the structure of FIG. 22.

FIGS. 22 and 23 are views to illustrate a method for sensing bend using a plurality of strain gages. The strain gage uses metal or a semiconductor in which a resistance is greatly changed according to an applied force, and senses deformation of a surface of an object to be measured according to a change in the resistance value. It is common that a material such as metal increases a resistance value if its length is stretched by an external force, and decreases the resistance value if the length is contracted. Accordingly, it is determined whether bend is performed or not by sensing a change in the resistance value.

Referring to FIG. 22, a plurality of strain gages are arranged along an edge of the display 110. The number of strain gages may be changed according to a size and a shape of the display 110, or a predetermined bend sensing resolution, etc.

In the state in which the strain gages are arranged as shown in FIG. 22, a user may bend a certain point in an arbitrary direction. Specifically, if a certain corner is bent as shown in FIG. 23, a force is exerted to a strain gage 80-$x$ overlapped with a bend line from among strain gages 80-1 to 80-$n$ which are arranged in a horizontal direction. Accordingly, an output value of the corresponding strain gage 80-$x$ increases in comparison with output values of the other strain gages. Also, a force is exerted to a strain gage 80-$y$ overlapped with the bend line from among strain gages 80-$n$, 80-$n$+1 to 80-$m$ which are arranged in a vertical direction, and thus an output value is changed. The controller 130 determines that a line is connecting the two strain gages 80-$x$ and 80-$y$ in which the output values are changed is a bend line.

Also, in addition to the exemplary embodiments of FIGS. 17 to 23, the flexible display apparatus 100 may sense a bend direction using various sensors such as a gyro sensor, a geomagnetic sensor, and an acceleration sensor, etc.

Figure 24:
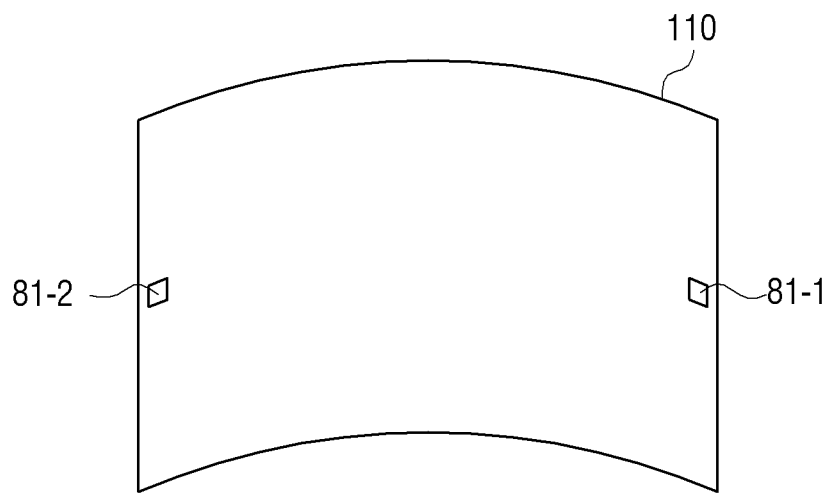
FIGS. 24 and 25 are views illustrating another example of a method for sensing a bend direction in a flexible display apparatus.
Figure 25:
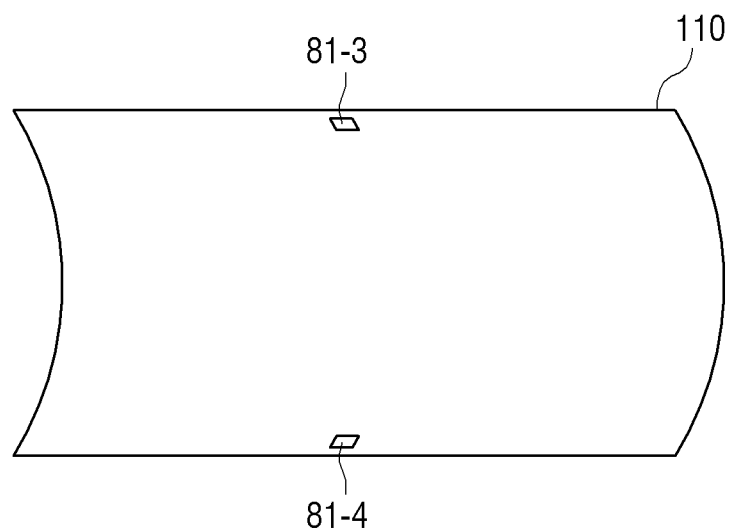

FIGS. 24 and 25 are views to illustrate a method for sensing a bend direction using an acceleration sensor for example. Referring to FIGS. 24 and 25, the flexible display apparatus 100 includes a plurality of acceleration sensors 81-1 and 81-2.

The acceleration sensors 81-1 and 81-2 can measure acceleration of a motion and a direction of the acceleration. Specifically, the acceleration sensors 81-1 and 81-2 output a sensing value corresponding to acceleration of gravity which changes according to a slope of an apparatus where those sensors are attached. Accordingly, if the acceleration sensors 81-1 and 81-2 are disposed on opposite edges of the flexible display apparatus, output values sensed by the acceleration sensors 81-1 and 81-2 are changed when the flexible display apparatus 100 is bent. The controller 130 calculates a pitch angle and a roll angle using the output values sensed by the acceleration sensors 81-1 and 81-2. Accordingly, the controller 130 may determine a bend direction based on changes in the pitch angle and the roll angle sensed by the acceleration sensors 81-1 and 81-2.

In FIG. 24, the acceleration sensors 81-1 and 81-2 are disposed on opposite edges in the horizontal direction with reference to the front surface of the flexible display apparatus 100. However, the acceleration sensors may be disposed in the vertical direction as shown in FIG. 25. In this case, if the flexible display apparatus 100 is bent in the vertical direction as shown in FIG. 25, a bend direction is sensed according to measurement values sensed by the acceleration sensors 81-3 and 81-4 in the vertical direction.

In FIGS. 24 and 25, the acceleration sensors are disposed on the left and right edges or the upper and lower edges of the flexible display apparatus 100. However, the acceleration sensors may be disposed all of the left, right, upper and right edges and/or may be disposed on corners.

As described above, a bend direction may be sensed using a gyro sensor or a geomagnetic sensor besides the acceleration sensor. The gyro sensor refers to a sensor which, if a rotational motion occurs, detects an angular velocity by measuring Coriolis' force exerted in a velocity direction of the motion. Based on a measurement value of the gyro sensor, a direction of the rotational motion can be sensed and thus a bend direction can also be sensed. The geomagnetic sensor refers to a sensor which senses azimuth using a 2-axis or 3-axis fluxgate. If such a geomagnetic sensor is applied, the geomagnetic sensor disposed on each edge of the flexible display apparatus 100 suffers from location movement when the edge is bent, and outputs an electric signal corresponding to a change in geomagnetism caused by the location movement. The controller 130 may calculate a yaw angle using the value output from the geomagnetic sensor. According to a change in the calculated yaw angle, various bend characteristics such as a bend area and a bend direction can be determined.

As described above, the flexible display apparatus 100 may sense bend using various kinds of sensors. The above-described methods for arranging the sensors and methods for sensing may be applied to the flexible display apparatus 100 individually or may be applied in combination.

The sensor 120 may sense a user's touch manipulation on a screen of the display 110 in addition to sensing the bend.

For instance, the sensor 120 may include a transparent conductive oxide film such as an indium-tin oxide (ITO) deposited on the substrate 111 of the display 110, and a film formed on an upper portion of the transparent conductive oxide film. Accordingly, if the user touches the screen, upper and lower plates at the touched point are brought into contact with each other and an electric signal is transmitted to the controller 130. The controller 130 recognizes the touched point using coordinates of an electrode to which the electric signal is transmitted. If touch or bend is sensed, the controller 130 determines whether a user's manipulation such as the touch or bend is intended by the user or not. Hereinafter, a method for selecting an intended manipulation of the user according to various exemplary embodiments will be explained.

Figure 26:
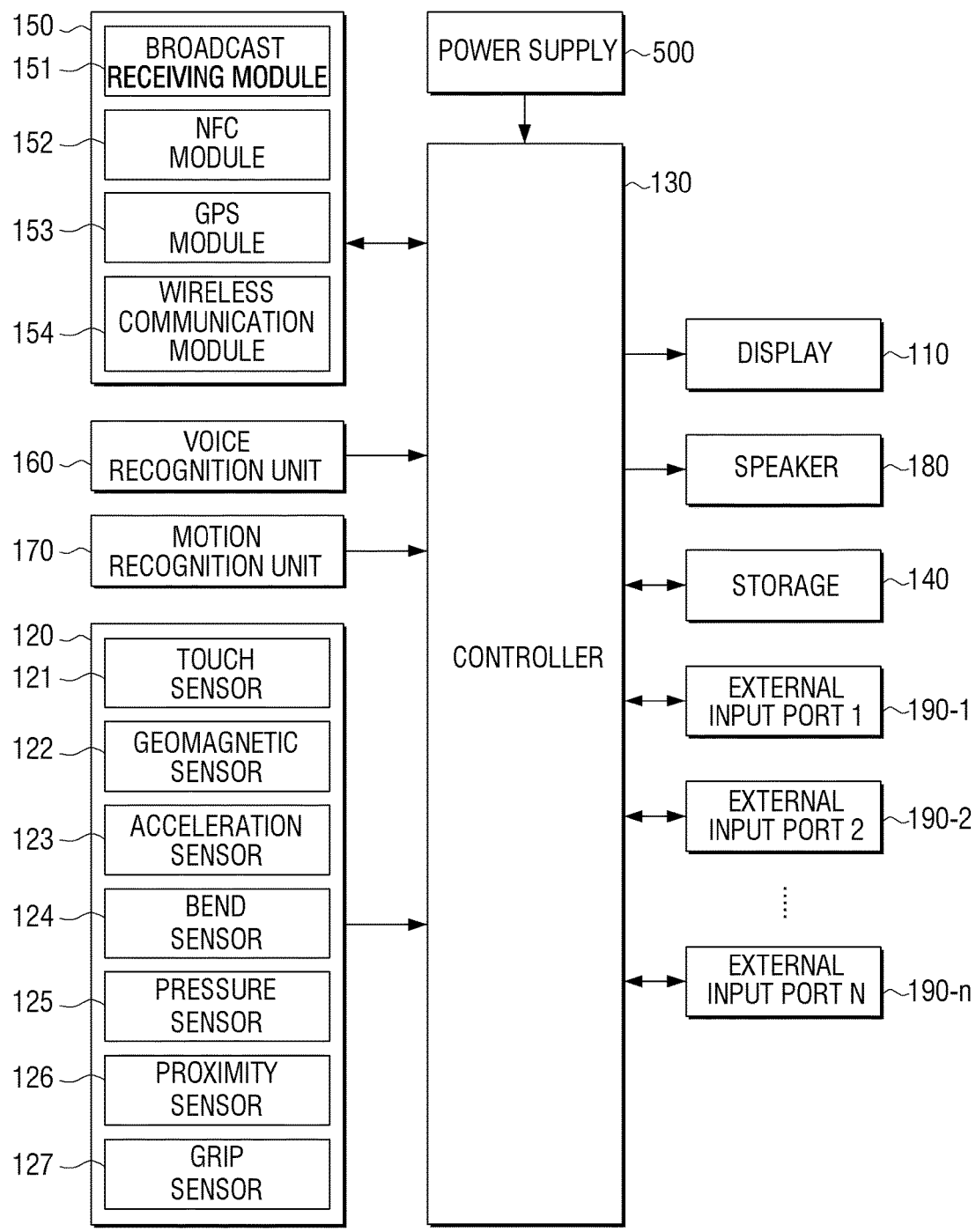
FIG. 26 is a block diagram illustrating a flexible display apparatus according an exemplary embodiment.

FIG. 26 is a block diagram to illustrate an example of a detailed configuration of a flexible display apparatus to explain an operation according to various exemplary embodiments.

Referring to FIG. 26, a flexible display apparatus 100 includes a display 110, a sensor 120, a controller 130, a storage 140, a communication unit 150, a voice recognition unit 160, a motion recognition unit 170, a speaker 180, external input ports 190-1-190-n, and a power supply 500.

The display 110 may be flexible. The detailed configuration and operation of the display 110 has been described above and thus a redundant explanation is omitted.

The storage 140 may store various programs or data associated with the operation of the flexible display apparatus 100, setting information set by the user, system operating software, various application programs, and information on operations corresponding to a user's manipulation.

The sensor 120 detects a whole bend state and touch state of the flexible display apparatus 100 including the display 110. Referring to FIG. 26, the sensor 120 may include various kinds of sensors such as touch sensor 121, a geomagnetic sensor 122, an acceleration sensor 123, a bend sensor 124, a pressure sensor 125, a proximity sensor 126, and a grip sensor 127, etc.

The touch sensor 121 may be implemented by using a capacitive type or a resistive type of sensor. The capacitive type calculates touch coordinates by sensing minute electricity excited in a user's body when a part of the user's body touches the surface of the display 110, using a dielectric substance coated on the surface of the display 110. The resistive type includes two electrode plates, and, if a user touches a screen, calculates touch coordinates by sensing an electric current flowing due to contact between upper and lower plates at the touched point. As described above, the touch sensor 121 may be embodied in various forms.

The geomagnetic sensor 122 senses a rotation state and a moving direction of the flexible display apparatus 100. The acceleration sensor 123 senses a degree of tilt of the flexible display apparatus 100. The geomagnetic sensor 122 and the acceleration sensor 123 may be used to sense bend characteristics such as a bend direction or a bend area of the flexible display apparatus 100 as described above. However, the geomagnetic sensor 122 and the acceleration sensor 123 may be used to sense a rotation state or a tilt state of the flexible display apparatus 100.

The bend sensor 124 may be embodied in various shapes and numbers as described above, and may sense a bend state of the flexible display apparatus 100. The configuration and operation of the bend sensor 125 has been described above and thus a redundant explanation is omitted.

The pressure sensor 125 senses a magnitude of pressure exerted to the flexible display apparatus 100 when the user performs touch or bend manipulation, and provides the magnitude of pressure to the controller 130. The pressure sensor 125 may include a piezo film which is embedded in the display 110 and outputs an electric signal corresponding to the magnitude of pressure. Although the pressure sensor 125 is a separate element from the touch sensor 121 in FIG. 26, if the touch sensor 121 is implemented by using a resistive touch sensor, the resistive touch sensor may also perform the function of the pressure sensor 125.

The proximity sensor 126 senses a motion which approaches without directly contacting the display surface. The proximity sensor 126 may be implemented by using various types of sensors such as a high-frequency oscillation type proximity sensor which forms a high frequency magnetic field and detects an electric current induced by a magnetic characteristic which is changed when an object approaches, a magnetic type proximity sensor which uses a magnet, and a capacitive type proximity sensor which detects capacitance that changes when an object approaches, etc.

The grip sensor 127 is disposed on a border or a handle of the flexible display apparatus 100 separately from the pressure sensor 125, and senses a user's grip. The grip sensor 127 may be implemented by using a pressure sensor or a touch sensor.

The controller 130 analyzes various sensing signals sensed by the sensor 120, determines a user's intention, and performs an operation corresponding to the intention. For example, the controller 130 may process data which is obtained by communicating with an external apparatus, or data which is stored in the storage 140, and may output the processed data through the display 110 and the speaker 180. In this case, the controller 130 may communicate with the external apparatus using the communication unit 150.

The communication unit 150 may communicate with various types of external apparatuses according to various communication methods. The communication unit 150 may include various communication modules such as a broadcast receiving module 151, a near field communication (NFC) module 152, a GPS module 153, and a wireless communication module 154. The broadcast receiving module 151 may include a terrestrial broadcast receiving module (not shown) including an antenna to receive a terrestrial broadcast signal, a demodulator, and an equalizer, and a digital multimedia broadcasting (DMB) module to receive and process a DMB broadcast signal. The NFC module 152 is a module that communicates with an external apparatus located nearby according to an NFC method such as NFC, Bluetooth, or Zigbee, etc. The GPS module 153 is a module that receives a GPS signal from a GPS satellite and detects a current location of the flexible display apparatus 100. The wireless communication module 154 is a module that is connected to an external network according to a wireless communication protocol such as Wi-Fi or IEEE etc. and communicates with the external network. The communication unit 150 may further include a mobile communication module that accesses a mobile communication network and performs communication according to various mobile communication standards such as $3^{rd}$ generation (3G), $3^{rd}$ generation partnership project (3GPP), and long term evolution (LTE).

The controller 130 selectively activates an element that is necessary for performing an operation according to a user's intention or intended input and/or most probable input determined based upon a number of conditions from among the above-described elements of the communication unit 150, and performs the operation.

The controller 130 may recognize voice input or motion input besides the bend or touch manipulation, and may perform an operation corresponding to the input. In this case, the controller 130 may activate the voice recognition unit 160 or the motion recognition unit 170.

The voice recognition unit 160 collects a user's voice or an external sound using a voice obtaining means such as a microphone (not shown), and transmits the user's voice or the external sound to the controller 130. If the user's voice is consistent with a pre-set voice command in a voice control mode, the controller 130 may perform a task corresponding to the user's voice. The task, which is controllable using a voice, may include various tasks such as adjusting a volume, selecting a channel, zapping (e.g., changing) a channel, adjusting a display property, reproducing, pausing, rewinding, fast forwarding, executing an application, selecting a menu, turning on an apparatus, and turning off an apparatus.

The motion recognition unit 170 obtains a user's image using an image picking up means (not shown) such as a camera, and provides the user's image to the controller 130. If the controller 130 analyzes the user's image provided by the motion recognition unit 170 and determines that the user makes a motion gesture corresponding to a pre-set motion command in a motion control mode, the controller 130 performs an operation corresponding to the motion gesture. For example, various tasks such as zapping a channel, turning on an apparatus, turning off, pausing, reproducing, stopping, rewinding, fast forwarding, mute, etc. may be controlled according to a motion. The above-described tasks that are controllable according to a voice and the tasks that are controllable according to a motion are merely examples and are not limited.

The external input ports 1, 2, . . . , n 190-1-190-*n* may be connected to various types of external apparatuses and may receive various data or programs or control commands. Specifically, the external input ports may include USB ports, headset ports, mouse ports, and LAN ports, etc. The power supply 500 (e.g., a battery) supplies power to the elements of the flexible display apparatus 100. The power supply 500 may be implemented by including an anode collector, an anode electrode, an electrolyte, a cathode electrode, a cathode collector, and a sheath enclosing the aforementioned members. The power supply 500 may be implemented by using a secondary cell which is chargeable and dischargeable. The power supply 500 may be implemented in a flexible form so that it can be bent along with the flexible display apparatus 100. In this case, the collector, the electrode, the electrolyte, and the sheath may be made of a flexible material. Detailed configuration and material of the power supply 500 will be explained separately below.

Although FIG. 26 illustrates various elements which may be included in the flexible display apparatus 100, the flexible display apparatus 100 may not necessarily include all of the elements and may not include only the above elements. Therefore, some of the elements may be omitted or added according to a product type of the flexible display apparatus 100, or may be replaced with other elements.

The controller 130 may control the elements according to a user's manipulation which is recognized through the sensor 120, the voice recognition unit 160, and the motion recognition unit 170 described above, and may perform various operations.

Figure 27:
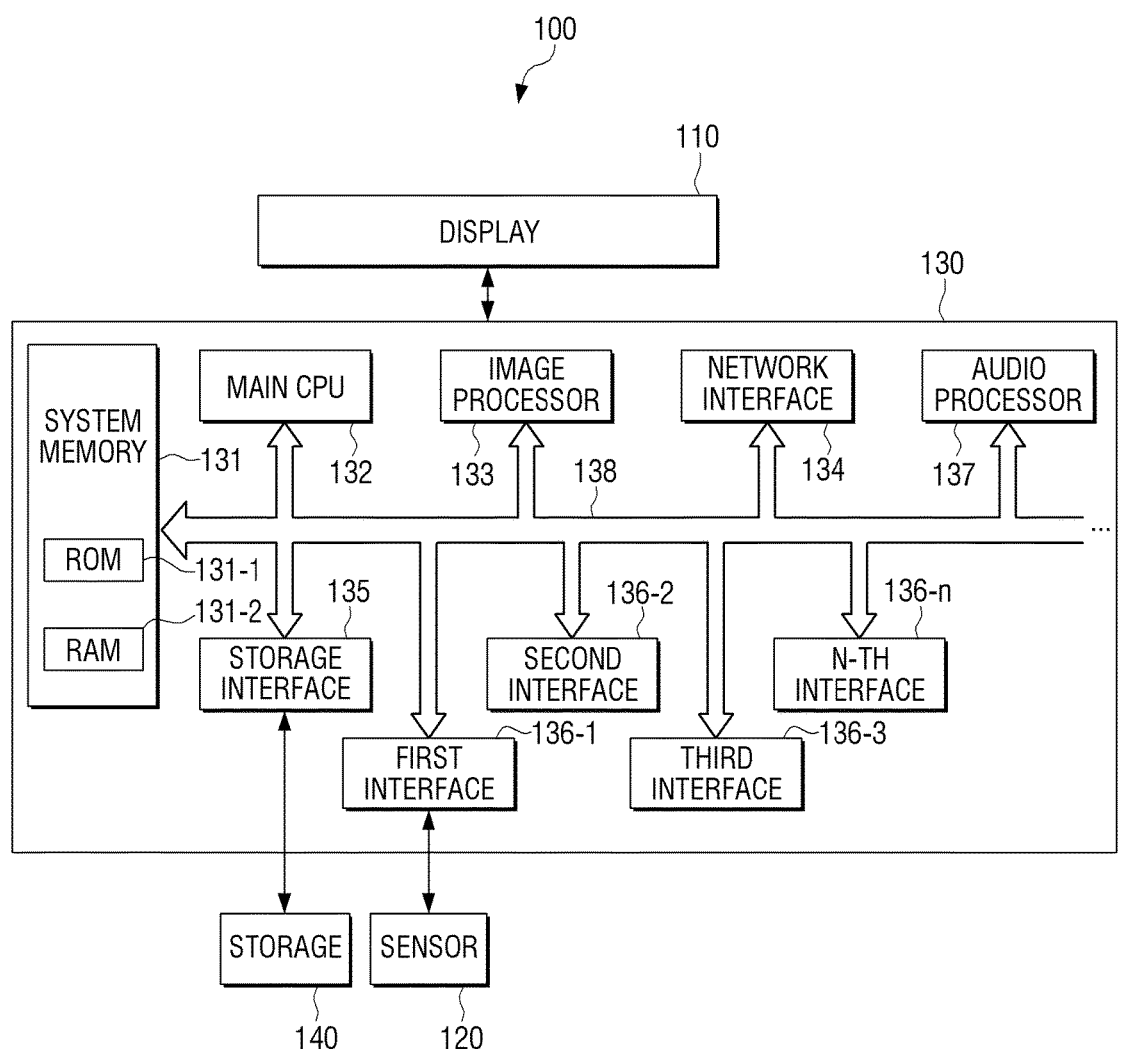
FIG. 27 is a block diagram illustrating a controller in detail.

FIG. 27 is a view to explain the controller 130 in detail.

Referring to FIG. 27, the controller 130 may include a system memory 131, a main CPU 132, an image processor 133, a network interface 134, a storage interface 135, first to n-th interfaces 136-1 to 136-*n*, an audio processor 137, and a system bus 138.

The system memory 131, the main CPU 132, the image processor 133, the network interface 134, the storage interface 135, the first to n-th interfaces 136-1 to 136-*n*, and the audio processor 137 may be connected to one another through the system bus 138, and may exchange various data or signals with one another.

The first to n-th interfaces 136-1 to 136-*n* support interfacing between the elements including the sensor 120 and the elements of the controller 130. In FIG. 27, the sensor 120 is connected to only the first interface 136-1. However, if the sensor 120 includes various types of sensors as shown in FIG. 26, each of the sensors may be connected through each interface. Also, at least one of the first to n-th interfaces 136-1 to 136-*n* may be implemented by using a button which is provided on a body of the flexible display apparatus 100, or an input interface which receives various signals from an external apparatus which is connected through the external input ports 1 to n.

The system memory 131 includes a read only memory (ROM) 131-1 and a random access memory (RAM) 131-2. The ROM 131-1 stores a set of commands for system booting. If a turn on command is input and power is supplied, the main CPU 132 copies an OS which is stored in the storage 140 into the RAM 131-2 according to a command stored in the ROM 131-1, executes the OS, and boots the system. If booting is completed, the main CPU 132 copies various applications stored in the storage 140 into the RAM 131-2, executes the applications copied into the RAM 131-2, and performs various operations.

As described above, the main CPU 132 may perform various operations according to the application stored in the storage 140.

The storage interface 135 is connected to the storage 140 and exchanges various programs, content, and data etc. with the storage 140.

For example, if the user performs a touch manipulation or a bend manipulation corresponding to a reproducing command to reproduce and display a content stored in the storage 140, the main CPU 132 accesses the storage 140 through the storage interface 135, generates a list of stored contents, and displays the list on the display 110. In this state, if the user performs a touch manipulation or a bend manipulation to select one content, the main CPU 132 executes a content reproducing program which is stored in the storage 140. The main CPU 132 controls the image processor 133 to form a content reproducing screen according to a command included in the content reproducing program.

The image processor 133 may include a decoder, a renderer, and a scaler, etc. Accordingly, the image processor 133 decodes a stored content, renders the decoded content data and forms a frame, and scales a size of the frame according to a screen size of the display 110. The image processor 133 provides the processed frame to the display 110 and displays the same.

The audio processor 137 refers to an element that processes audio data and provides the audio data to a sound outputting means such as a speaker 180. The audio processor 137 performs audio signal processing by decoding audio data which is stored in the storage 140 or audio data which is received through the communication unit 150, filtering noise, and amplifying the audio data to an appropriate decibel. In the above example, if the content to be reproduced is a moving image content, the audio processor 137 may process the audio data which is de-multiplexed from the moving image content, and may provide the audio data to the speaker 180 so that the audio data is synchronized with the image processor 133 and is output.

The network interface 134 is connected to external apparatuses through a network. For example, if a web browser program is executed, the main CPU 132 accesses a web server through the network interface 134. If web page data is received from the web server, the main CPU 132 controls the image processor 133 to form a web page screen, and displays the web page screen on the display 110.

As described above, if a bend, touch or other user's manipulation is sensed from the flexible display apparatus 100, the controller 130 determines whether the user's manipulation is intended by the user or not. If it is determined that the user's manipulation is intended, the controller 130 reads out information on an operation corresponding to the user's manipulation from the storage 140, and performs the operation corresponding to the information. The above-described operation of the controller 130 may be implemented by executing various programs stored in the storage 140.

Figure 28:
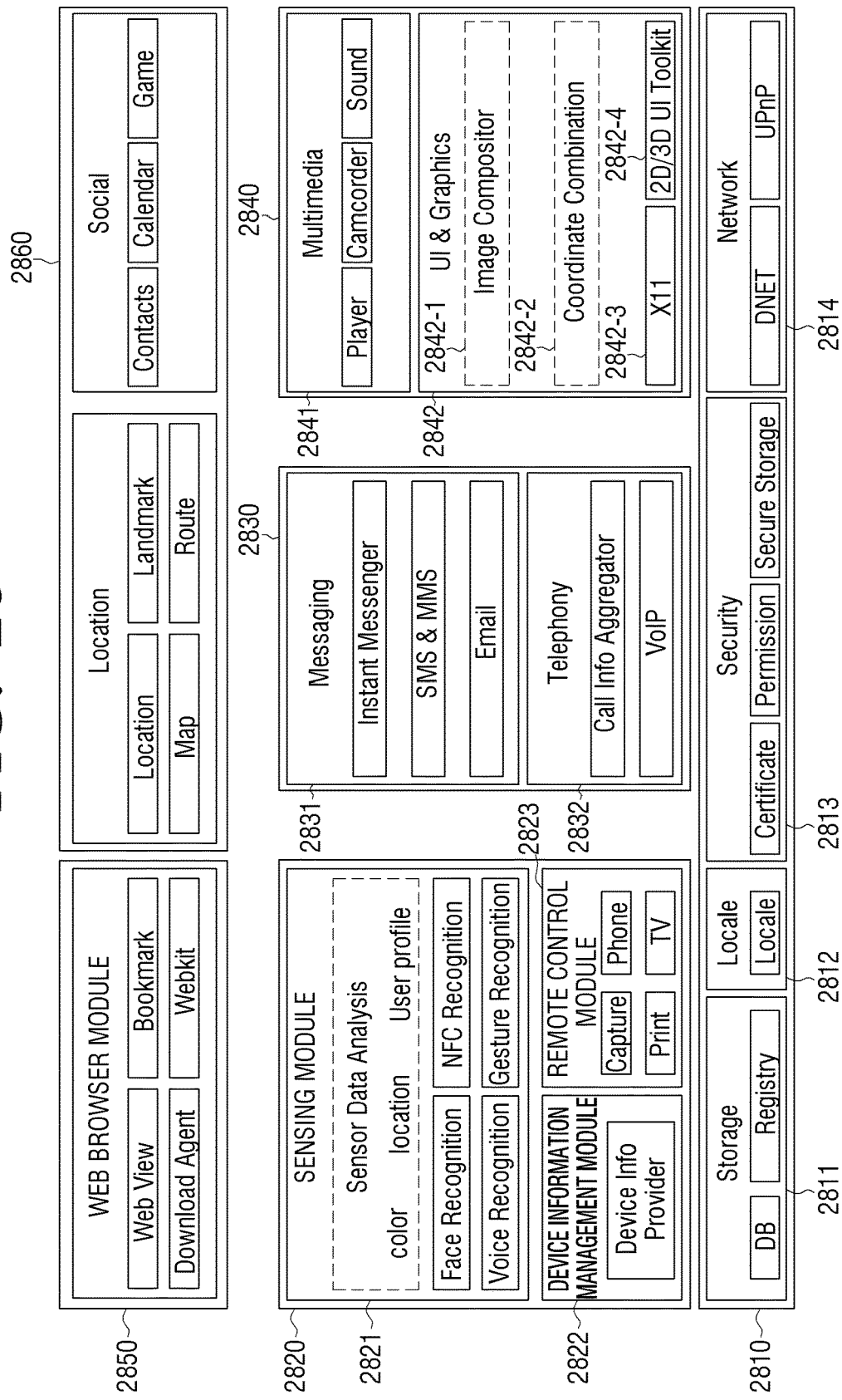
FIG. 28 is a view illustrating an example of a software structure stored in a storage.

FIG. 28 is a view illustrating a software structure of the storage 140 to support the operations of the controller 130 according to the above-described exemplary embodiments. Referring to FIG. 28, the storage 140 includes a base module 2810, a device management module 2820, a communication module 2830, a presentation module 2840, a web browser module 2850, and a service module 2860.

The base module 2810 is a module that processes signals transmitted from each hardware element that is included in the flexible display apparatus 100, and transmits the signals to an upper layer module.

The base module 2810 includes a storage module 2811, a location-based module 2812, a security module 2813, and a network module 2814.

The storage module 2811 is a program module that manages a database (DB) or a registry. The location-based module 2812 is a program module that is interlocked with hardware such as a GPS chip and supports a location-based service. The security module 2813 is a program module that supports certification for hardware, permission of a request, and a secure storage, and the network module 2814 includes a Distributed.net (DNET) module and a Universal Plug and Play (UPnP) module as a module for supporting network connection.

The device management module 2820 is a module that manages external input and information on an external device, and uses the same. The device management module 2820 may include a sensing module 2821, a device information management module 2822, and a remote control module 2823, etc.

The sensing module 2821 is a module that analyzes sensor data provided from various sensors of the sensor 120. Specifically, the sensing module 2821 is a program module that detects a location of a user or an object, color, shape, size, and other profiles, etc. The sensing module 2821 may include a face recognition module, a voice recognition module, a motion recognition module, and an NFC recognition module. The device information management module 2822 is a module that provides information on various types of devices, and the remote control module 2823 is a program module that remotely controls a peripheral device such as a telephone, a television (TV), a printer, a camera, and an air conditioner, etc.

The communication module 2830 is a module to communicate with an external apparatus. The communication module 2830 includes a messaging module 2831 such as a messenger program, a short message service (SMS) and multimedia message service (MMS) program, and an email program, etc., and a telephony module 2832 which includes a call information aggregator program module and a voice over internet protocol (VoIP) module.

The presentation module 2840 is a module that generates a display screen. The presentation module 2840 includes a multimedia module 2841 to reproduce multimedia content and output the multimedia content, and a user interface (UI) and graphic module 2842 to process a UI and graphics. The multimedia module 2841 may include a player module, a camcorder module, and a sound processing module. Accordingly, the multimedia module 2841 generates a screen and a sound by reproducing various multimedia contents, and reproduces the same. The UI and graphic module 2842 may include an image compositor module 2842-1 to combine images, a coordinate combination module 2842-2 to combine coordinates on a screen to display an image and generate coordinates, an X11 module 2842-3 to receive various events from hardware, and a 2D/3D UI toolkit 2842-4 to provide a tool for configuring a UI of a 2D or 3D format.

The web browser module 2850 is a module that performs web-browsing and accesses a web server. The web browser module 2850 may include a web view module to render and view a web page, a download agent module to download, a bookmark module, and a web-kit module, etc.

The service module 2860 is an application module that provides various services. Specifically, the service module 2860 may include various modules such as a navigation service module to provide a map, a current location, a landmark, and route information, a game module, and an advertisement application module.

The main CPU 132 of the controller 130 accesses the storage 140 through the storage interface 135, copies various modules stored in the storage 140 into the RAM 131-2, and performs operations according to operations of the copied modules.

Specifically, the main CPU 132 analyzes output values of the sensors of the sensor 120 using the sensing module 2821, checks a bend area, a bend line, a bend direction, a number of times that bend is performed, a bend angle, a bend speed, a touch area, a number of times that touch is performed, an intensity of touch, a magnitude of pressure, a degree of proximity, and an intensity of user grip, and, based on a result of the checking, determines whether the user's manipulation is intended by the user or not. If it is determined that the user's manipulation is intended, the main CPU 132 detects information on an operation corresponding to the user's manipulation from the database of the storage module 2810. The main CPU 132 drives a module corresponding to the detected information and performs an operation.

For example, if the operation is displaying a graphic user interface (GUI), the main CPU 132 configures a GUI screen using the image compositor module 2842-1 of the presentation module 2840. Also, the main CPU 132 determines a display location of the GUI screen using the coordinate combination module 2842-2 and controls the display 110 to display the GUI screen on the location.

If user's manipulation corresponding to a message receiving operation is performed, the main CPU 132 executes the messaging module 2841, accesses a massage management server, and receives a message stored in a user account. Also, the main CPU 132 configures a screen corresponding to the received message using the presentation module 2840 and displays the screen on the display 140.

If a telephone call is performed, the main CPU 132 may drive the telephony module 2832.

As described above, programs of various structures may be stored in the storage 140 and the controller 130 may perform various operations using various programs stored in the storage 140.

Figure 29:
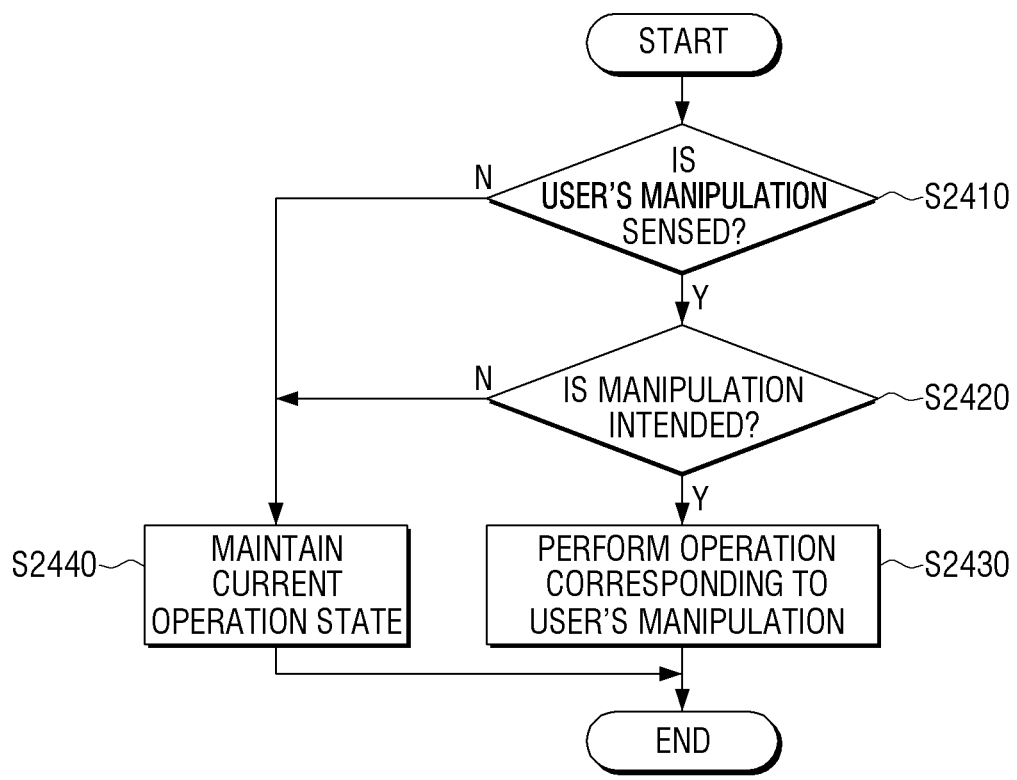
FIG. 29 is a flowchart to explain an operating method of a flexible display apparatus.

FIG. 29 is a flowchart to explain a method for operating a flexible display apparatus according to an exemplary embodiment.

Referring to FIG. 29, if user's manipulation is sensed (S2410), the flexible display apparatus determines whether the user's manipulation is intended by the user or not (S2420). If the manipulation is intended, the flexible display apparatus performs an operation corresponding to the manipulation (S2430). On the other hand, if user's manipulation is not sensed or if user's manipulation is sensed but is not intended, the flexible display apparatus maintains a current operation (S2440).

A user intention may be determined in various ways. For example, the controller can determine whether the user intended a sensed manipulation or the intended input corresponding to the sensed manipulation based properties of the input, a context of the input, a user input history, and/or a probability model based on the context, property and history of the input and or manipulation to determine whether the intention of the user and select the appropriate input. Hereinafter, a method for determining whether user's manipulation is intended by the user or not according to various exemplary embodiments will be explained in detail.

Figure 30:
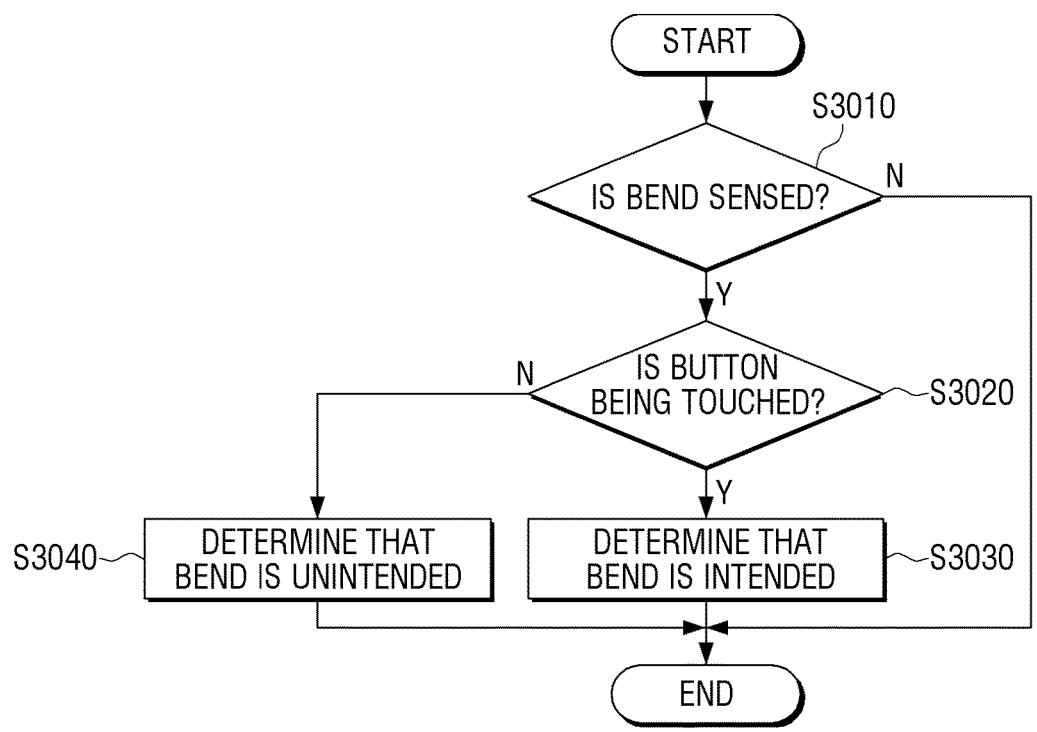
FIG. 30 is a flowchart to explain an example of a method for selecting an intended input in a flexible display apparatus.

FIG. 30 is a flowchart to explain a method for selecting an intended input according to an exemplary embodiment.

Referring to FIG. 30, if a bend is sensed in the flexible display apparatus 100 (S3010), it is determined whether a button provided on the flexible display apparatus 100 is being touched or not (S3020). If the button is being touched as a result of the determining, it is determined that the bend is a user's bend manipulation intended by the user (S3030). In this case, the controller 130 of the flexible display apparatus 100 determines on an operation which corresponds with the user's bend manipulation, and performs the operation. On the other hand, if the button is not touched, it is determined that the user's bend manipulation is unintended by the user (S3040). The controller 130 disregards the user's bend manipulation and does not perform an operation corresponding to the bend manipulation.

The button may be a real button that is provided on a body of the flexible display apparatus 100 or may be a button menu that is displayed on the screen of the flexible display apparatus 100.

Figure 31:
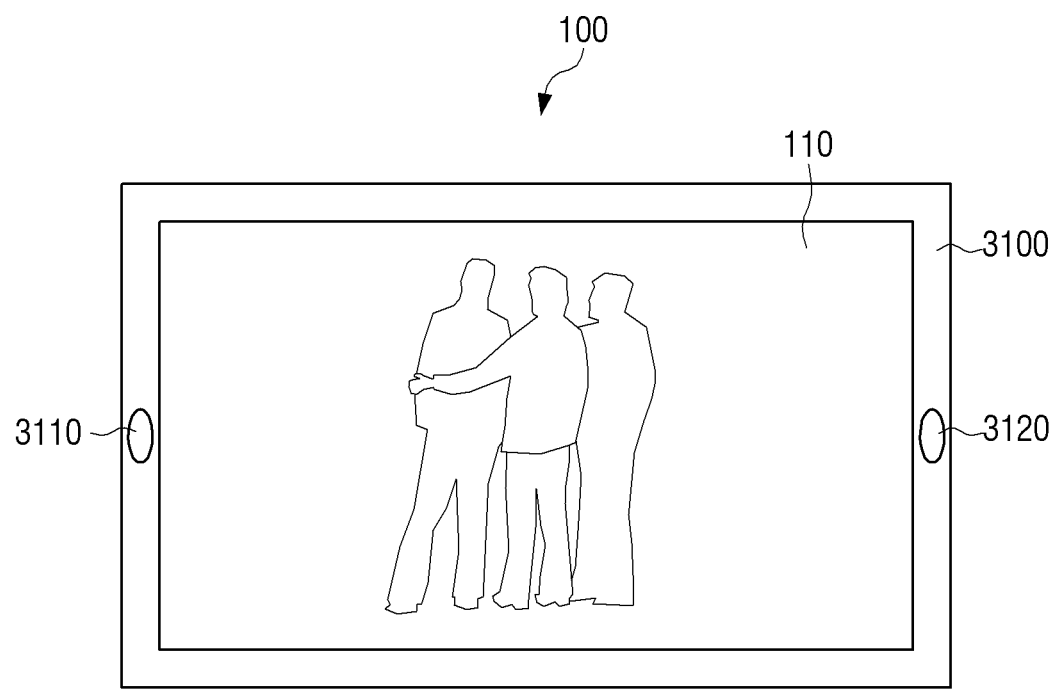
FIGS. 31 and 32 are views to illustrate a method for selecting an intended input using a button.

FIG. 31 is a view illustrating the flexible display apparatus which includes a button provided on a body thereof.

Referring to FIG. 31, the flexible display apparatus 100 includes a bezel 3100 which is formed along an edge of the display 110.

The bezel 3100 may also be made of a flexible material so that it can be bent along with the display 110. Buttons 3110 and 3120 are provided on the bezel 3100. If a bend is sensed when one of the buttons 3110 and 3120 is being touched, the controller 130 determines that the bend is a user's bend manipulation that is intended by the user.

According to an exemplary embodiment, in order to control the operation of the flexible display apparatus 100 using bend, the user may hold and bend the flexible display apparatus 100, while touching at least one of the buttons 3110 and 3120. If a bend is performed when both the buttons 3110 and 3120 are being touched, the controller 130 determines that the user holds the flexible display apparatus 100 with the user's both hands and bends it. If a bend is performed when one of the buttons is being touched, the controller 130 determines that the user holds the flexible display apparatus 100 with one hand and bends it. If such bend is recognized, the controller 130 determines that the bend is a user's bend manipulation intended by the user.

According to an exemplary embodiment, it may be determined that bend is intended only if the bend is performed when both the buttons 3110 and 3120 are being touched. Also, if a bend is performed when only one of the two buttons is being touched, it may be determined that the bend is intended.

The controller 130 disregards bend manipulation that is sensed when neither of the buttons 3110 and 3120 is touched. On the other hand, if a bend is sensed when at least one of the buttons 3110 and 3120 is being touched, the controller 130 performs a operation corresponding to a bend area, a bend angle, a bend shape, a bend direction, and a number of times that bend is performed. To achieve this, the storage 140 may store information on an operation which corresponds to each of various bend characteristics such as a bend area, a bend angle, a bend shape, a bend direction, and a number of times that bend is performed, a bend frequency, or a combination thereof.

In the case of the bend direction, the controller 130 may perform a different operation according to whether the flexible display apparatus is bent in the Z+ direction or Z− direction if the surface of the display 110 is set to zero. For example, if a bend in the Z+ direction is sensed when the display 110 is displaying a reproducing screen on a specific content, the controller 130 may perform a fast forwarding operation, and, if a bend in the Z− direction is sensed, the controller 130 may perform a rewinding operation.

In the case of the bend area, the controller 130 may perform a different operation according to whether an area of a bend line is a center area, a border area, or a corner area. For example, if the center area is bent when a content is being reproduced, the controller 130 may finish the content reproducing operation. If the border area is bent, the controller 130 may reproduce a previous content or a next content instead of the current content.

In the case of the bend angle, the controller 130 may perform a different operation according to the bend angle.

For example, the controller 130 may change a channel zapping speed or a zapping range according to the bend angle as described above.

In the case of the bend shape, the controller 130 may perform a different operation according to whether bend is performed in a rolling shape, folding shape, or other bend shape. For example, if the sensed bend is a rolling shape, the controller 130 may execute an application corresponding to the rolling shape, and, if the bend is a folding shape, the controller 130 may turn off the flexible display apparatus 100 or terminate execution of an application.

In the case of the number of times that bend is performed, the controller 130 may perform a different operation according to the number of times that bend is performed. For example, if a bend is performed once, the controller 130 may turn over a page. If a bend is continuously performed two times, the controller may change content. If a bend is continuously performed three times, the controller 130 may change an application.

The above-described operations are merely examples. Besides these, information on various operations which are matched with or correspond to the user's bend manipulation may be stored in the storage 140.

Although the two buttons 3110 and 3120 are illustrated in FIG. 31, the number of buttons may be changed according to an exemplary embodiment and locations of the buttons may also be changed to various different locations. The buttons 3110 and 3120 may also be implemented by using a touch button or other types of buttons besides the mechanical button.

Although FIG. 31 illustrates buttons 3110 and 3120 provided on the bezel 3100, the button may be implemented in a dome key form or may be implemented by using a part of a touch screen panel or a part of a touch pad. Additionally, if a user's grip on a specific location is sensed using a grip sensor or a proximity sensor which is disposed on a specific location of the flexible display apparatus 100, it may be determined that a button is selected.

Although FIG. 31 illustrates the bezel 3100, the bezel 3100 may be omitted according to a type of the flexible display apparatus 100. In this case, a button may be provided on a side of the flexible display apparatus 100.

Figure 32:
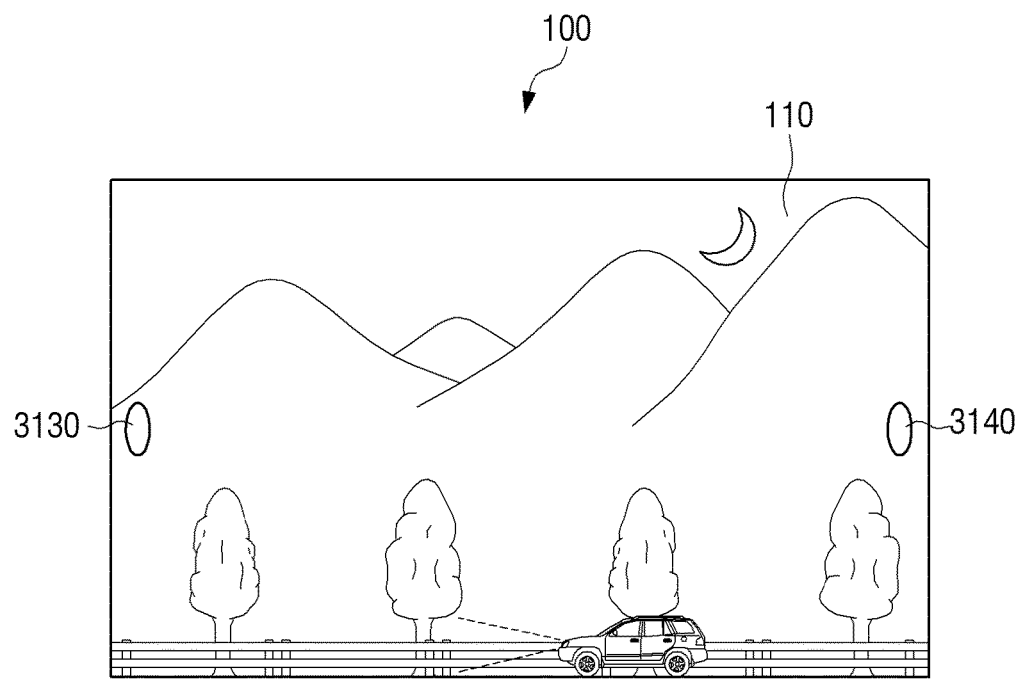

A virtual button may be displayed on the screen of the display 110. FIG. 32 is a view illustrating the flexible display apparatus 100 which does not include the bezel 3100.

Referring to FIG. 32, an entire front surface of the flexible display apparatus 100 may serve as the display. In this case, since there is no bezel 3100, there is no space for the buttons 3110 and 3120. Accordingly, in this case, buttons 3130 and 3140 may be displayed on certain areas on the screen. If a bend is performed when at least one of the buttons 3130 and 3140 is selected, the controller 130 determines that the bend is a user's bend manipulation that is intended by the user. The buttons 3130 and 3140 shown in FIG. 32 may be displayed in various shapes such as a circle, a quadrangle, and a star shape, or may be represented by characters (e.g., BEB or B) or figures. In addition, a brightness of the buttons may be increased, different surface textures may be given to the buttons, or local vibration may be generated, without marking a location of the button, so that the user can recognize the location. Further, the buttons 3130 and 3140 may not be displayed and may be substituted with a virtual area which has been already set in the apparatus based on a statistical grip pattern.

Each of the buttons illustrated in FIGS. 31 and 32 enables bend manipulation and thus may be called a bend enable button (BEB).

In the case of FIGS. 31 and 32, a bend is performed while the buttons 3110, 3120, 3130, and 3140 are being touched. However, if a bend is performed for a predetermined time after the buttons 3110, 3120, 3130, and 3140 have been selected, it may be determined that the bend is a user's bend manipulation intended by the user. For example, the buttons may be selected to enable the recognition/acceptance and/or processing of a user's bend manipulation for predetermined period of time (e.g., a timeout period). After the timeout period, recognition/acceptance and processing of a user's bend manipulation will not be performed by the controller because the controller will determine that manipulation is not intended since the user has not re-selected one of the buttons after the timeout period.

Figure 33:
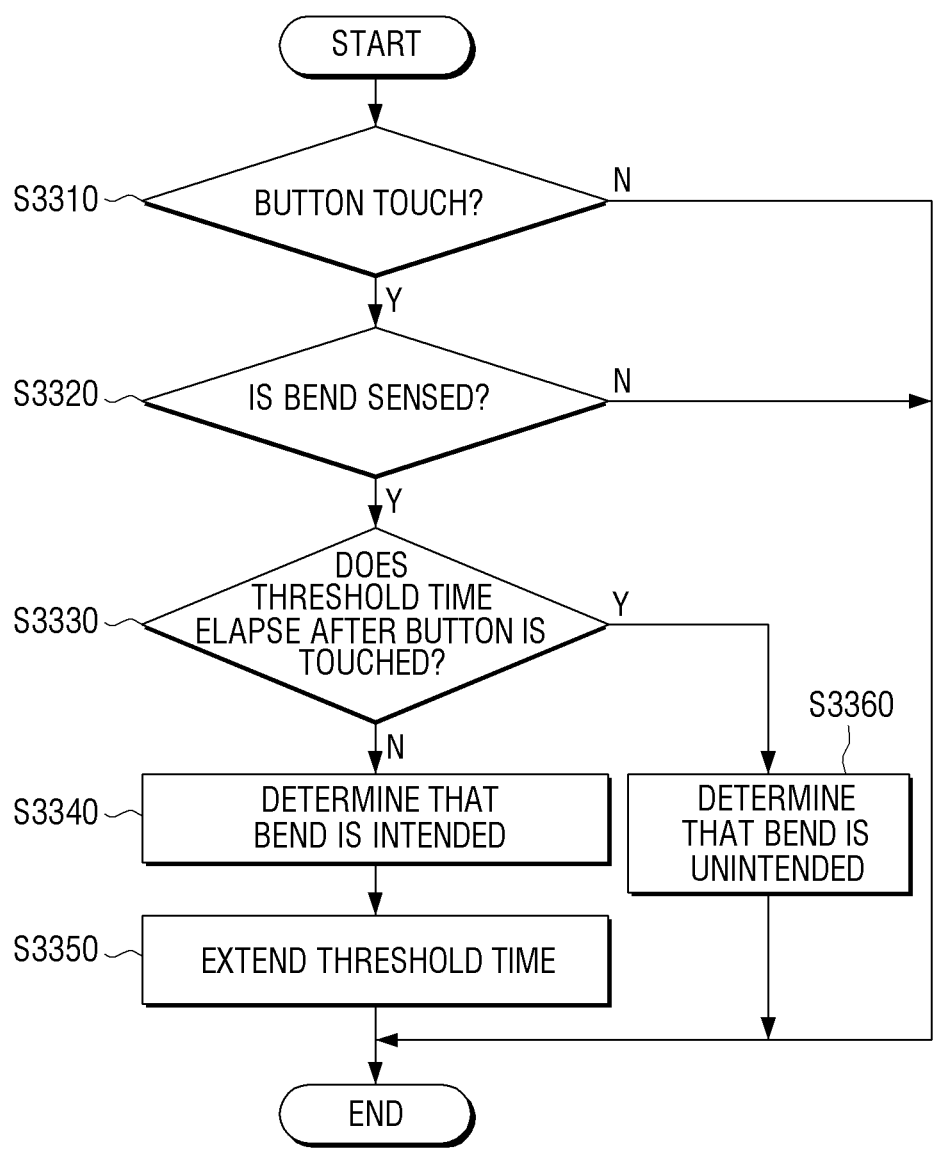
FIG. 33 is a flowchart to explain another example of a method for selecting an intended input in a flexible display apparatus.

FIG. 33 is a flowchart to explain a method for selecting an intended input according to an exemplary embodiment.

Referring to FIG. 33, if a touch of a button of the flexible display apparatus 100 is sensed (S3310) and a bend is sensed (S3320), it is determined whether a threshold time has elapsed after the button has been touched (S3330). If the threshold time (e.g., a timeout period) has not elapsed as a result of the determining, it is determined that the bend is a user's bend manipulation intended by the user (S3340). If it is determined that the bend is a user's bend manipulation intended by the user, the flexible display apparatus 100 performs an operation corresponding to the user's bend manipulation. Also, the threshold time is extended (S3350). For example, the threshold time may be reset from the time that the bend is performed. Accordingly, the user may continuously control the flexible display apparatus by continuing to bend after having touched the flexible display apparatus once. On the other hand, if the threshold time elapses, it is determined that the bend is an untended user's bend manipulation (S3360). In this case, even though the bend is performed, no operation may be performed, and an error message may be displayed, a notice sound may be output, or a vibration may occur to alert the user according to an exemplary embodiment.

The above-described threshold time may be set differently according to an exemplary embodiment. For example, if the threshold time is set to 10 seconds, the flexible display apparatus 100 determines that bend performed for 10 seconds after the button has been touched is a user's bend manipulation consistent with a user intention, and determines that bend performed after 10 seconds is an untended bend.

In FIG. 33, a predetermined time after the button has been touched is set to a bend effective time. However, according to an exemplary embodiment, if a button is touched after bend has been performed, it is recognized that the bend is an effective bend manipulation and an operation corresponding to the bend may be performed. For example, if the user touches the flexible display apparatus 100 after having deformed it into a desired shape, an operation corresponding to the shape deformation may be directly performed.

As described above, since it can be determined whether bend is intended or not, performing unintended operations which may be caused by unintended input can be prevented and power consumption can be reduced. Also, by providing a reaction according to a user's intention or selecting an intended input, the flexible display apparatus 100 can be manipulated more easily and precisely.

Although it is determined whether a bend is intended or not according to whether a button is selected or not in FIGS. 31 to 33, it may also be determined whether a touch is intended or not according to whether a button is selected or not.

For example, if the screen of the display 140 is touched while a button is being touched, if the screen is touched within a threshold time after the button has been touched, or if the button is touched within a predetermined time after the screen has been touched, it may be recognized that the screen touch is a user's touch manipulation intended by the user. That is, if the user touches various menus displayed on the screen of the display 110 with his/her left hand, while touching a right button 3140 with his/her right hand, the controller 130 may perform an operation corresponding to the menu displayed on the touched point. Also, if the user touches the screen within a predetermined time (for example, 5 seconds) after having touched at least one button, the controller 130 may perform an operation corresponding to the menu displayed on the touched point. In this case, a touch recognizing time may be extended every time that the user touches the screen. Since this method is similar to the above-described method for determining a user's bend manipulation, redundant explanation and illustration are omitted.

According to an exemplary embodiment, the flexible display apparatus 100 may be operated in a touch manipulation mode in which the flexible display apparatus 100 is controlled only by a user's touch manipulation while buttons 3130 and 3140 are not touched. On the other hand, the flexible display apparatus 100 may be operated in a bend manipulation mode in which the flexible display apparatus 100 is controlled only by user's bend manipulation while the buttons 3130 and 3140 are being touched.

In the above exemplary embodiments, the user's intention is determined using a button separately provided or a button displayed on the screen. However, the user's intention may be determined by analyzing a physical effect on the flexible display apparatus 100 at a point where a user's manipulation is performed. For example, the user's intention may be determined based on an intensity of pressure exerted when touch or bend is performed. Hereinafter, methods for determining a user's intention or intended input considering various physical effects such as an intensity of pressure and a touch area will be explained in detail.

Figure 34:
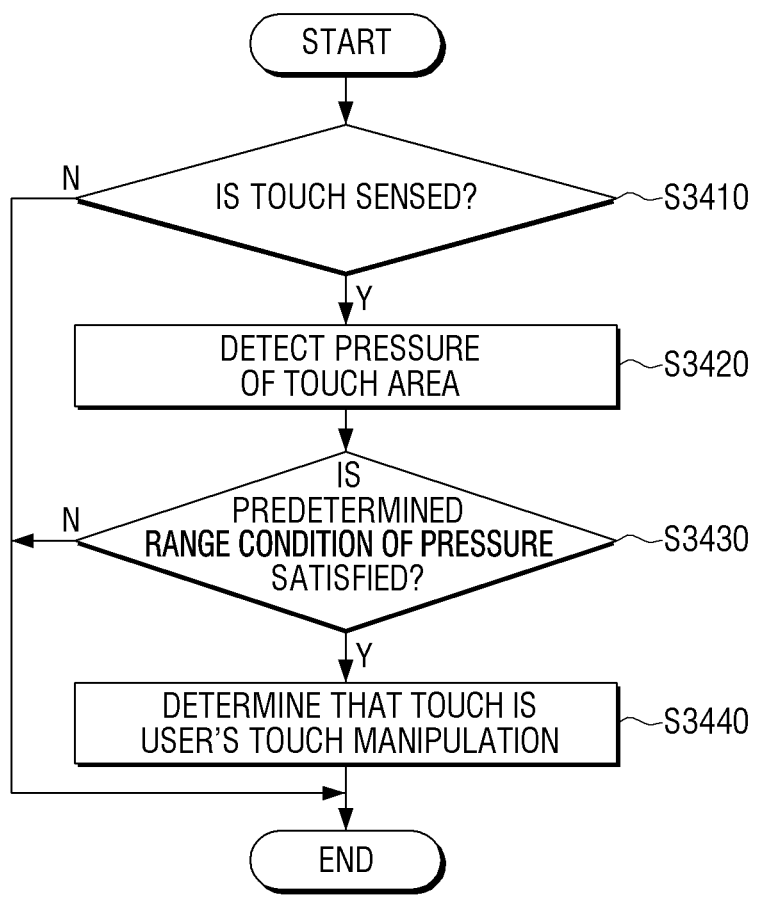
FIGS. 34 to 37 are flowcharts to explain various examples of a method for selecting an intended input in a flexible display apparatus.

FIG. 34 is a flowchart to explain an example of a method for determining a user touch intention based on pressure.

Referring to FIG. 34, if a touch on the display 110 of the flexible display apparatus 100 is sensed (S3410), an intensity of pressure exerted to a touch area is detected (S3420). As described above, the intensity of pressure may be detected using a pressure sensor which is provided on the display 110.

If the detected intensity of pressure satisfies a predetermined range condition of pressure (e.g., a condition comprising a range of pressure) (S3430), the flexible display apparatus 100 determines that the touch is a user's touch manipulation intended by the user to control the operation of the flexible display apparatus 100 (S3440). On the other hand, if the range condition of pressure is not satisfied, the flexible display apparatus 100 disregards the user's touch.

An intensity of pressure that is sensed when the user touches the screen to select a menu on the screen is different from an intensity of pressure that is sensed when the user touches to hold the flexible display apparatus 100. Accordingly, from among pressure ranges for each type of touch, a pressure range that is detected when the user touches the screen to control the flexible display apparatus may be determined as a condition for determining a user's intention or the intended input. The determined range condition of pressure is stored in the storage 140. If a pressure satisfying the stored range condition of pressure is detected, the controller 130 determines that the touch is a user's touch manipulation intended by the user.

The range condition of pressure may be determined according to various criteria such as a size, weight, and type of the flexible display apparatus 100. For example, if the flexible display apparatus 100 is a compact apparatus having a small display, an intensity of pressure that is sensed when touch manipulation is performed on the screen may be greater than an intensity of pressure that is sensed when the user holds the flexible display apparatus. On the other hand, if the flexible display apparatus 100 is implemented by using a TV or a laptop computer which is heavy, greater force may be exerted when the flexible display apparatus is held. Accordingly, an intensity of pressure that is sensed when touch manipulation is performed may be less than an intensity of pressure that is sensed when the flexible display apparatus is held. Therefore, a manufacturer of the flexible display apparatus 100 may repeatedly conduct an experiment on the flexible display apparatus 100 with a plurality of users and may determine a range condition of pressure based on a result of the experiment.

Figure 35:
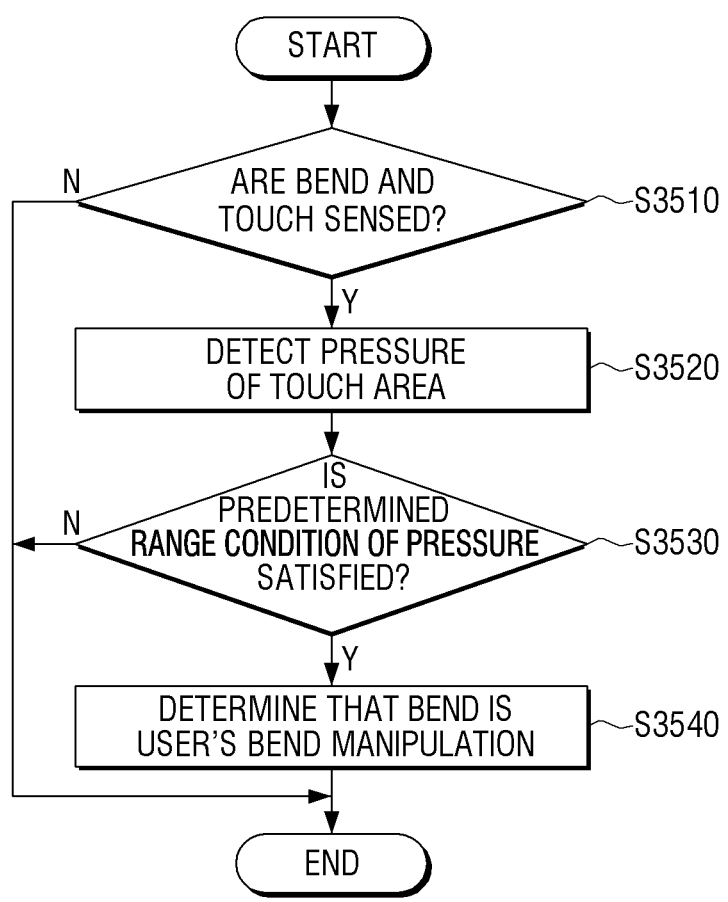

FIG. 35 is a flowchart to explain an example of a method for determining a user bend intention (e.g., an intended input) based on pressure.

Referring to FIG. 35, if a bend and a touch are sensed (S3510), pressure on a touch area where the touch is sensed is detected (S3520).

Since the user should hold the flexible display apparatus 100 to bend it, a touch may necessarily accompany a bend. Accordingly, pressure is detected from the touch area and it is determined whether an intensity of the detected pressure satisfies a predetermined range condition of pressure (S3530). The range condition of pressure of FIG. 35 may be different from that of FIG. 34. That is, in FIG. 34, a range condition of pressure that is set based on a statistical value of pressure which is sensed when the screen is touched (hereinafter, referred to as a first range condition of pressure) may be used, however, in FIG. 35, a range condition of pressure that is set based on a statistical value of pressure which is sensed in a touch area accompanied by bend (hereinafter, referred to as a second range condition of pressure) may be used.

As described above, the second range condition of pressure may be determined by repeatedly conducting experiments similar to those used to determine the first range condition of pressure.

If the intensity of pressure satisfies the second range condition of pressure, the flexible display apparatus 100 determines that the bend is intended user bend (S3540).

Figure 36:
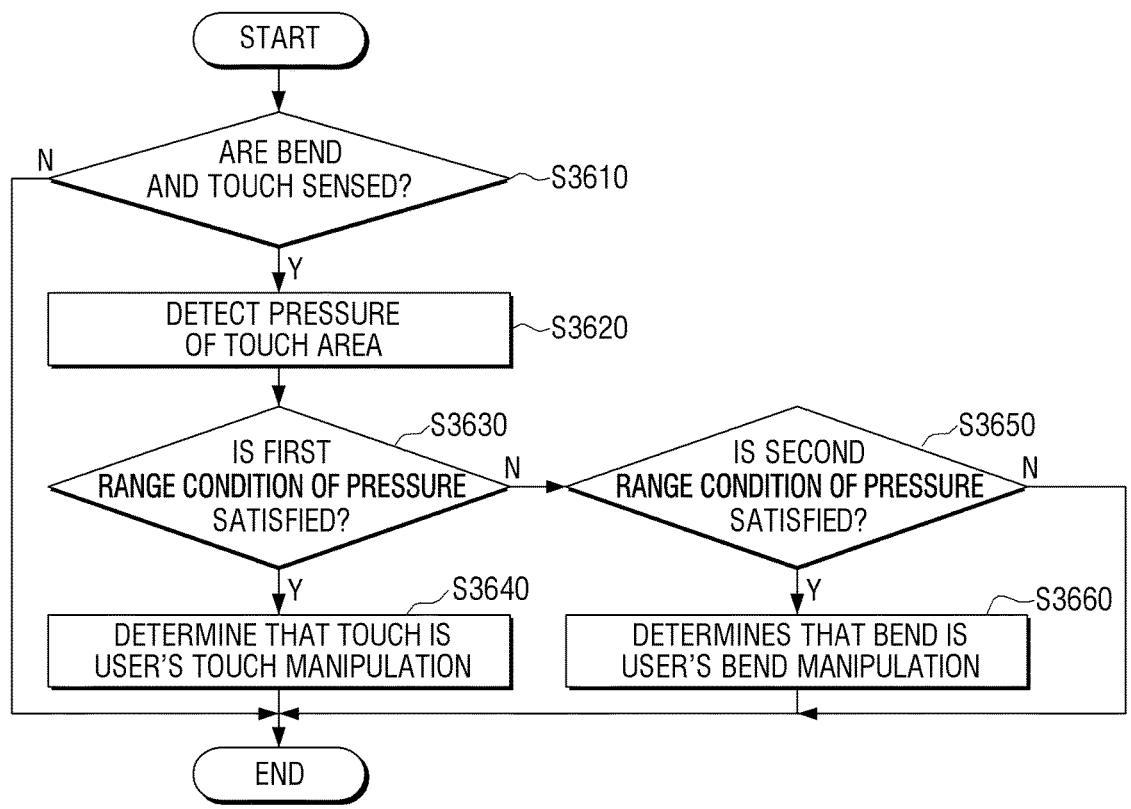

FIG. 36 is a flowchart to explain a method for determining an intended input in the flexible display apparatus which stores both the first range condition of pressure and the second range condition of pressure.

Referring to FIG. 36, if at least one of a bend and a touch is sensed (S3610), pressure of a touch area is detected (S3620). If an intensity of the detected pressure satisfies the first range condition of pressure (S3630), the flexible display apparatus 100 determines that touch is a user's touch manipulation intended by the user (S3640) and disregards the bend. On the other hand, if the intensity of the detected pressure satisfies the second range condition of pressure (S3650), the flexible display apparatus 100 determines that user's bend manipulation is intended (S3660) and disregards touch.

On the other hand, if neither of the first range condition of pressure and the second range condition of pressure is satisfied, it is determined that both the bend and the touch are not intended by the user and the bend and the touch are disregarded.

In the above exemplary embodiment, the method for determining the user's intention using the pressure has been described. However, according to an exemplary embodiment, a mode may be selected first prior to a bend or a touch being performed by the user, and an intended input or manipulation may be determined.

Figure 37:
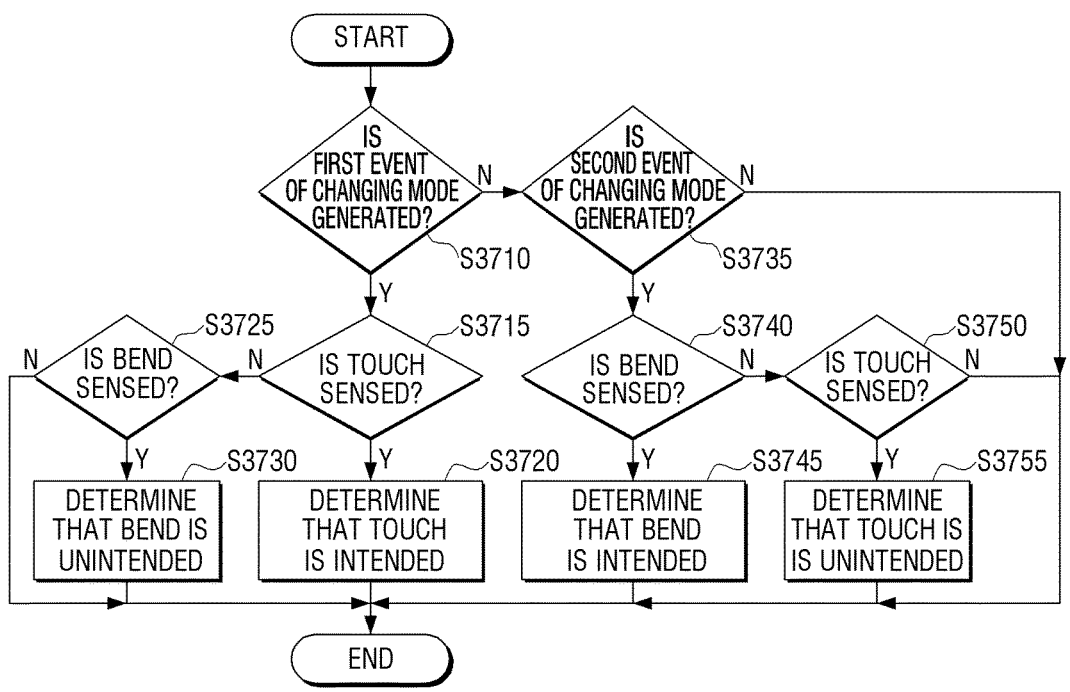
Figure 38:
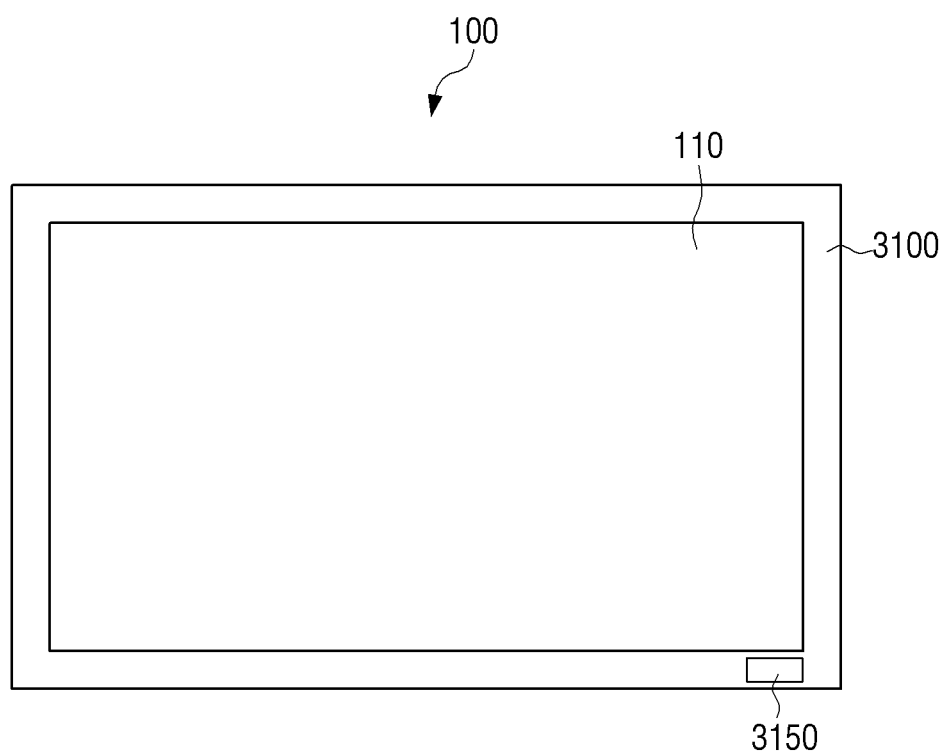
FIG. 38 is a view illustrating an example of a flexible display apparatus to perform the method of FIG. 37.

FIGS. 37 and 38 are views illustrating an example of a method for determining whether user's manipulation is intended by the user or not according to a mode state. Referring to FIG. 37, the flexible display apparatus 100 may be operated in a plurality of operation modes. The operation mode may include a touch manipulation mode and a bend manipulation mode.

As described above, the touch manipulation mode is a mode in which only a user's touch manipulation is recognized and the flexible display apparatus is operated according to the touch manipulation. The bend manipulation mode is a mode in which only user's bend manipulation is recognized and the flexible display apparatus is operated according to the bend manipulation. According to an exemplary embodiment, the operation mode may further support a motion control mode for controlling the flexible display apparatus 100 using a motion, a voice control mode for controlling the flexible display apparatus 100 using a voice, an external input manipulation mode for connecting an external inputting means to the flexible display apparatus 100 to control the flexible display apparatus 100, and a button manipulation mode for controlling the flexible display apparatus 100 using various buttons provided on a body rather than the display 110 of the flexible display apparatus 100. The flexible display apparatus 100 changes the operation mode according to an event of changing mode, and determines that a user's manipulation consistent with the changed operation mode is a user's manipulation intended by the user or is the intended input.

Referring to FIG. 37, if it is determined that a first event of changing mode (e.g., a changing mode event) is generated (S3710) and then a touch is sensed (S3715), it is determined that the touch is a user's touch manipulation intended by the user (S3720). On the other hand, if a bend is sensed after the first event of changing mode has been generated (S3725), it is determined that the bend is unintended bend (S3730). Accordingly, the sensed bend is disregarded. Also, a user motion, a user input signal, or button manipulation that is sensed after the first event of changing mode has been generated is determined to be an untended manipulation, and is disregarded.

On the other hand, if it is determined that a second event of changing mode is generated (S3735), a bend manipulation that is sensed after the second event of changing mode is generated is determined to be a user's bend manipulation that is intended by the user (S3745). On the other hand, touch manipulation that is sensed after the second event of changing mode has been generated (S3750) is determined to be an unintended touch input (S3755). A user motion, a user input signal, or button manipulation that is sensed after the second event of changing mode has been generated may also be determined to be unintended manipulation, and be disregarded.

The first event of changing mode and the second event of changing mode may be generated if a button which produces a changing mode event is touched, for example.

FIG. 38 illustrates the flexible display apparatus 100 which is provided with a changing mode button. Referring to FIG. 38, the flexible display apparatus 100 includes a bezel 3100 which is formed along an edge of the display 110, and a changing mode button 3150 is provided on the bezel 3100.

The changing mode button 3150 is a button for changing an operation mode of the flexible display apparatus 100 to another operation mode. If the operation modes includes only the touch manipulation mode and the bend manipulation mode, the flexible display apparatus 100 toggles between the touch manipulation mode and the bend manipulation mode and changes the mode every time that the user selects the changing mode button 3150. That is, if the changing mode button 3150 is selected while the flexible display apparatus 100 is being operated in the bend manipulation mode, the controller 130 may determine that the first event of changing mode is generated. On the other hand, if the changing mode button 3150 is selected while the flexible display apparatus 100 is being operated in the touch manipulation mode, the controller 130 may determine that the second event of changing mode is generated.

If the operation mode includes various operation modes described above, the mode may be changed to each mode in sequence every time that the changing mode button 3150 is selected. In this case, it is determined that the first event of changing mode is generated if the changing mode button 3150 is selected to change the mode to the touch manipulation mode, and it is determined that the second event of changing mode is generated if the changing mode button 3150 is selected to change the mode to the bend manipulation mode.

If the mode is changed to the touch manipulation mode, a message informing that the mode is changed to the touch manipulation mode may be displayed, and, if the mode is changed to the bend manipulation mode, a message informing that the mode is changed to the bend manipulation mode may be displayed. If the mode is changed to the other modes, a message informing of the change to other modes may be displayed.

If the mode is changed to a certain operation mode by the changing mode button 3150, the controller 130 maintains the changed mode until the changing mode button 3150 is selected again.

According to an exemplary embodiment, if a predetermined threshold time elapses without input through the changing mode button 3150 or other input while the flexible display apparatus 100 is being operated in a certain operation mode, the controller 130 may automatically change the operation mode to a default operation mode. The default operation mode may be one of the above-described operation modes. For example, if the default operation mode is the touch manipulation mode, and if a threshold time elapses in the other operation mode, the mode is automatically changed to the touch manipulation mode.

Also, if a threshold time elapses without any input to the flexible display apparatus 100, the flexible display apparatus 100 may be automatically changed to a locking state. An example of a locking state is a state which the apparatus does not accept input until a user enters code, pushes a button, or performs a gesture to unlock the apparatus. In this case, the controller 130 may be automatically changed to the default operation mode when the flexible display apparatus 100 is released from the locking state.

As described above, the controller 130 selects an operation mode, determines that manipulation corresponding to the operation mode is a user's manipulation intended by the user and determines that the other types of manipulation are user's manipulation that are unintended by the user, so that the user's intention can be determined.

In FIG. 38, the first event of changing mode (e.g., first mode changing event) or the second event of changing mode (e.g., second mode changing event) is generated using one changing mode button 3150. However, the changing mode button 3150 may be implemented by using a plurality of buttons. In this case, if a first changing mode button corresponding to the touch manipulation mode is selected, the controller 130 determines that the first event of changing mode is generated, and, if a second changing mode button corresponding to the bend manipulation mode is selected, the controller 130 determines that the second event of changing mode is generated.

According to an exemplary embodiment, the event of changing mode may be generated without the changing mode button. For example, if a touch of a predetermined pattern is performed or a predetermined first password is input, the controller 130 may determine that the first event of changing mode is generated. The touch of the predetermined pattern refers to touching the screen in a pre-defined pattern such as an X mark or an O mark. Also, the first password refers to a password that initiates a process to enter into touch manipulation mode. That is, if user's manipulation is sensed in the locking state, a locking screen may be displayed. An area to input a password or an unlocking pattern may be displayed on the locking screen. If the user inputs the first password or a specific unlocking pattern on the locking screen, it is determined that the first event of changing mode is generated.

Also, if a predetermined bend gesture is performed or if a predetermined second password is input, the controller 130 may determine that the second event of changing mode is generated. The predetermined bend gesture refers to a bend operation corresponding to bend information that is set to operate in the bend manipulation mode. The bend gesture may be a bend that is difficult to perform unintentionally. For example, if the center of the flexible display apparatus 100 is bent or the flexible display apparatus 100 is bent to bring opposite corners into contact with each other, it is determined that the second event of changing mode is generated. The second password refers to a password that is set to initiate the flexible display apparatus to operate in the bend manipulation mode in contrast to the first password. The second password may be input in a similar way to that of the first password and thus a redundant explanation is omitted.

As described above, the first and second event of changing modes may be set in various ways.

If a touch is performed when the user holds the flexible display apparatus 100 to bend it, the touch area has a relationship with the bend area. Accordingly, it may be determined whether manipulation corresponds to a user's intention or not considering the relationship between the touch area and the bend area.

Figure 39:
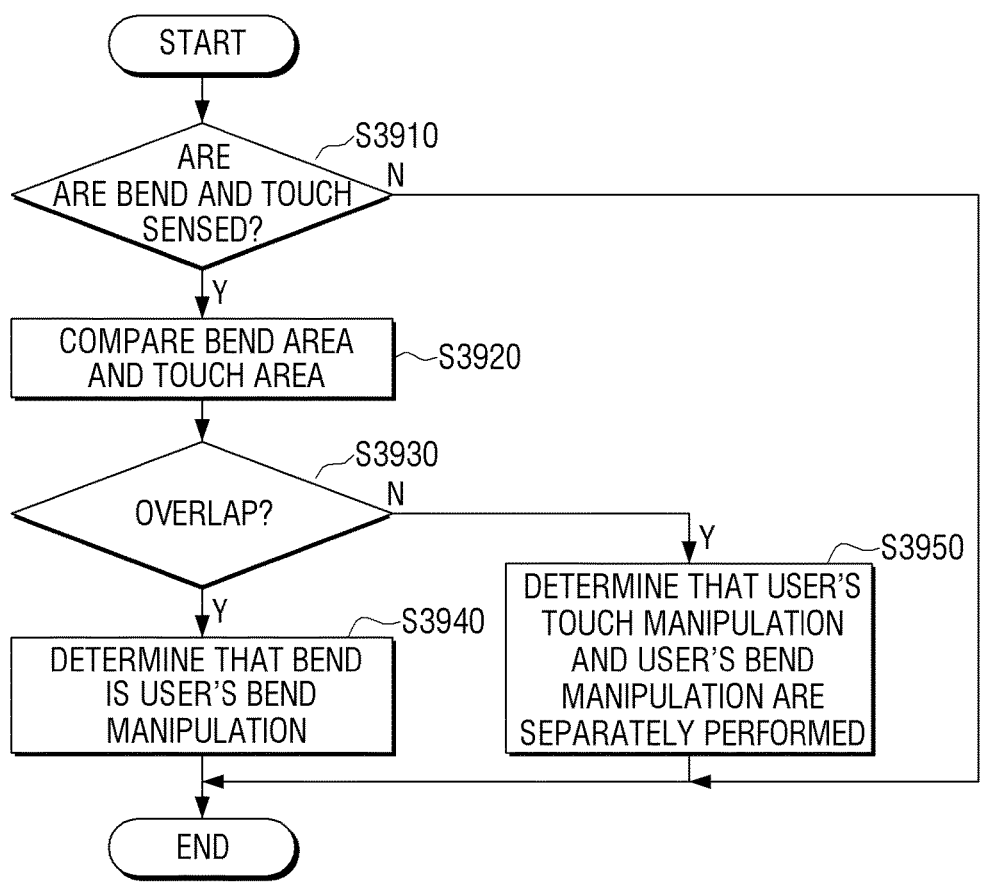
FIG. 39 is a flowchart to explain an example of a method for selecting an intended input using a relationship between a touch area and a bend area.

FIG. 39 is a flowchart illustrating a method for determining an intended input considering a relationship between a bend area and a touch area.

Referring to FIG. 39, if both bend and touch are sensed (S3910), a location of a bend area and a location of a touch area are identified and are compared with each other (S3920). The method for sensing the bend area and the touch area has been described above and thus a redundant explanation is omitted.

If the touch area is included in the bend area and they overlap with each other as a result of the comparing (S3930), it is determined that the touch is a touch manipulation that is accompanied by bend and the touch is disregarded, and it is determined that the bend is a user's bend manipulation intended by the user (S3940). Accordingly, the flexible display apparatus 100 performs an operation corresponding to the user's bend manipulation.

On the other hand, if the touch area and the bend area do not overlap with each other (S3930) as a result of the comparing, it is determined that the user's touch manipulation and the user's bend manipulation are both intended (S3950). Accordingly, the flexible display apparatus performs an operation corresponding to the user's touch manipulation and an operation corresponding to the user's bend manipulation separately.

Examples of these operations will be explained in detail below.

Figure 40:
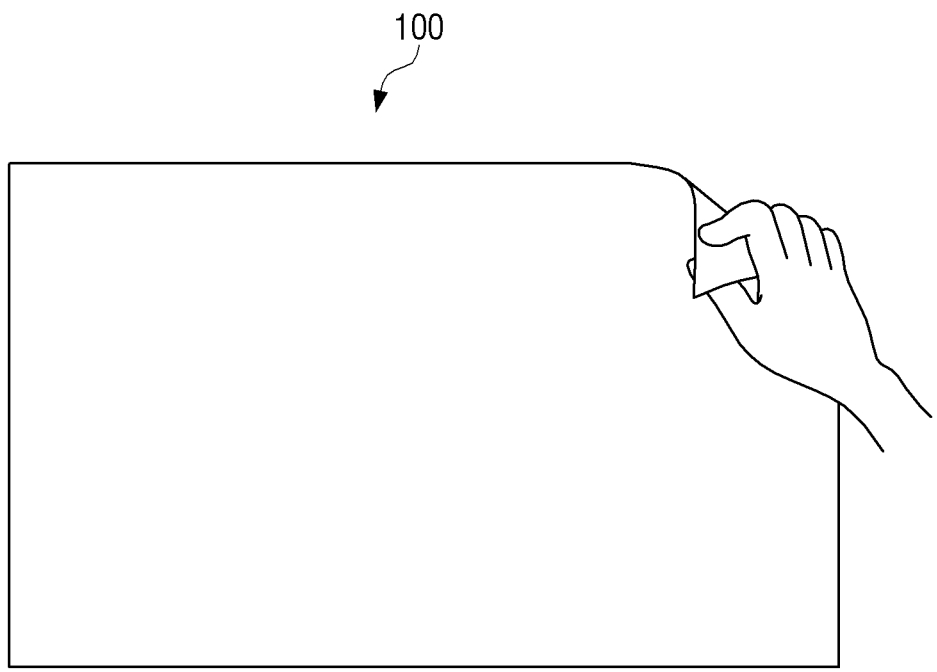
FIG. 40 is a view illustrating an example of a user's bend manipulation which is determined in the method of FIG. 39.

FIG. 40 illustrates a case in which it is determined that bend is intended bend manipulation. Specifically, in FIG. 40, a user bends a corner of the flexible display apparatus 100. Referring to FIG. 40, in order to bend the corner, the user may touch a front surface with his/her thumb and touch a rear surface with other fingers, and bends the corner in a front surface direction. In this case, a point that the user touches with his/her thumb is included in the bend area.

Figure 41:
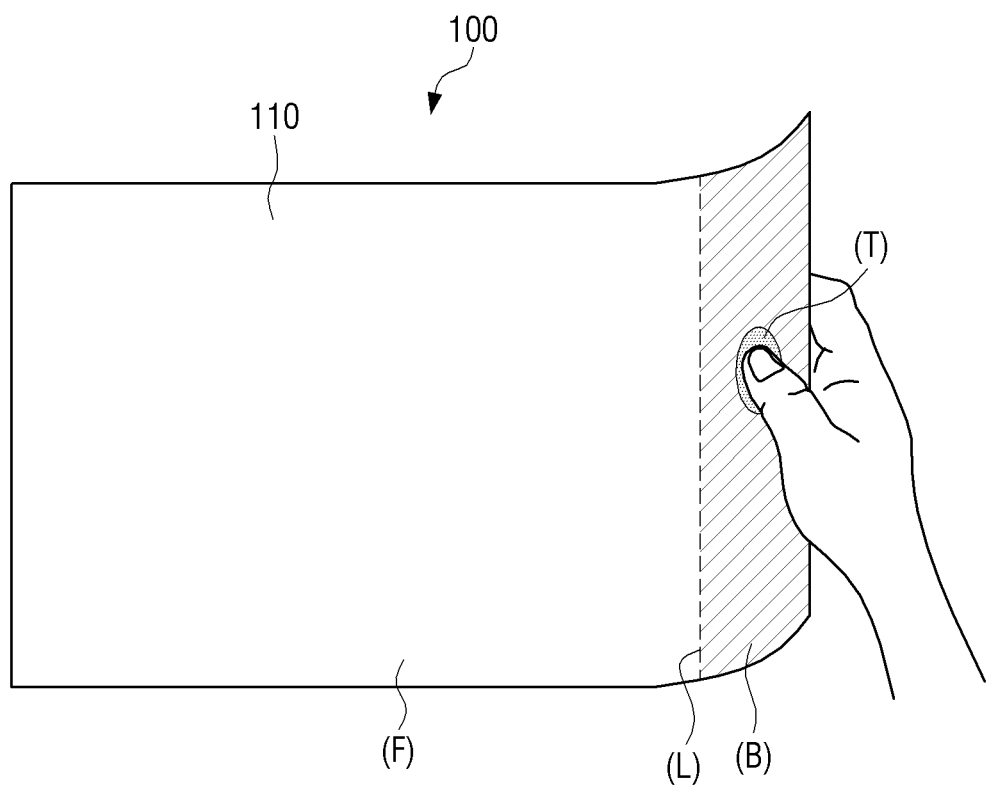
FIG. 41 is a view illustrating another example of a user's bend manipulation.

FIG. 41 illustrates a case in which the user bends an edge of the flexible display apparatus 100. As shown in FIG. 41, if the user holds the right edge of the flexible display apparatus 100 and bends it in the Z+ direction, a touch area (T) is located in a bend area (B). In FIG. 41, an entire area of the display 110 is divided into the bend area (B) in which bend is sensed, a flat area (F) in which bend is not sensed, and a boundary line (L) between the areas (B) and (F).

If a user's bend manipulation is performed as shown in FIGS. 40 and 41, the bend area (B) and the touch area (T) overlap with each other. Accordingly, the flexible display apparatus 100 compares the bend area (B) and the touch area (T), and, if the bend area (B) and the touch area (T) overlap with each other as shown in FIG. 31, determines that the user's bend manipulation is intended and performs an operation corresponding to the bend manipulation.

The operation may be different according to a type of an application which is being executed in the flexible display apparatus 100.

FIG. 42 illustrates an example of an operation which is performed according to a user's bend manipulation.

FIG. 42 illustrates a case in which the user's bend manipulation shown in FIG. 41 is performed when the flexible display apparatus 100 executes a digital media broadcast (DMB) application. In this case, a broadcast screen may be displayed only on the flat area (F) other than the bend area (B).

In the state in which a broadcast screen received through broadcast channel 11 is displayed as shown in FIG. 42, if a user's bend manipulation including bending one edge in the Z+ direction and then unbending it is performed as shown in FIG. 41, the flexible display apparatus 100 may perform a channel zapping operation. Specifically, broadcast channel 11 is changed to a previous broadcast channel, that is, broadcast channel 9. On the other hand, if user's bend manipulation is performed in the Z− direction in the same way, broadcast channel 11 is changed to a next broadcast channel, that is, broadcast channel 13.

In FIG. 42, if a bend angle increases, a channel zapping speed may increase or a channel zapping range may increase. That is, channel zapping, which has been performed by one channel, is performed by 5 or 10 channels.

In FIG. 42, the channel zapping operation is performed by the user's bend manipulation. However, this is merely an example. Besides this, various operations may be matched with the user's bend manipulation and may be performed.

In FIGS. 39 to 42, if the touch area and the bend area overlap with each other, it is determined that bend is a user's bend manipulation intended by the user, considering a bend characteristic appearing when the user bends using the whole hand. However, if the flexible display apparatus 100 is small and thin, the user may hold and bend the flexible display apparatus 100 using only a finger without using the whole hand. In this case, a situation in which a touch area does not overlap with a bend area may be rather interpreted as user's bend manipulation intended by the user. Accordingly, a different determining criterion may be set according to a type, size, shape, weight, and thickness, etc. of the flexible display apparatus 100.

Figure 43:
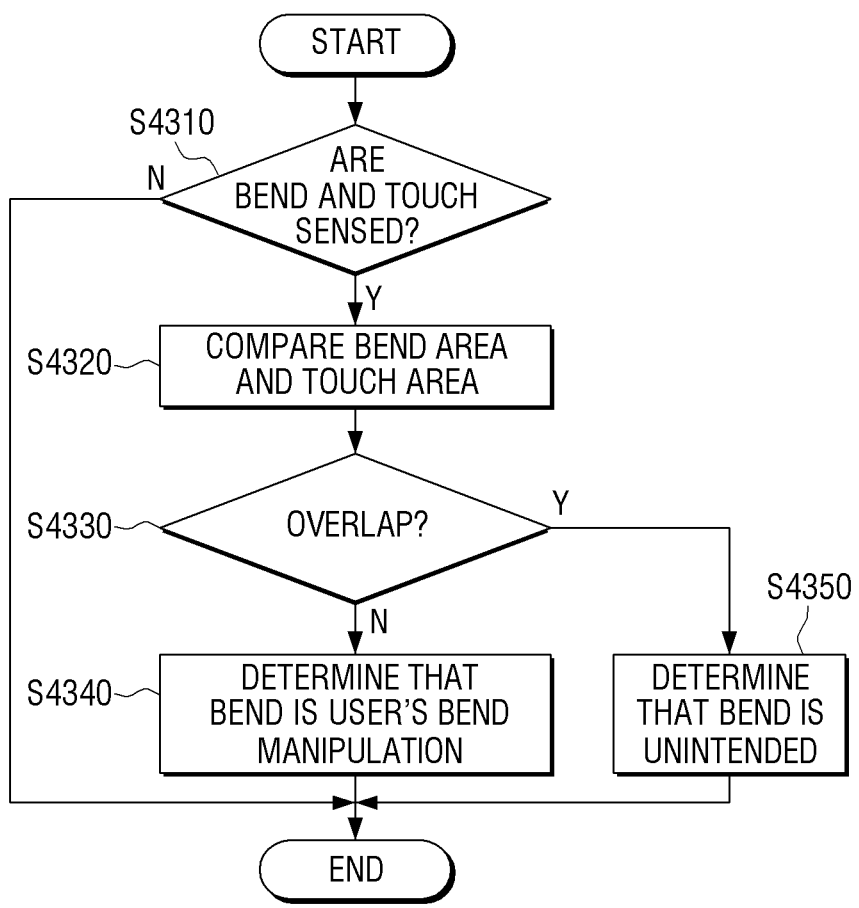
FIG. 43 is a flowchart to explain another example of a method for selecting an intended input using a relationship between a touch area and a bend area.

FIG. 43 is a flowchart to explain another example of a method for selecting an intended input considering a relationship between a bend area and a touch area.

Referring to FIG. 43, if a bend and a touch manipulation of the user are sensed (S4310), the flexible display apparatus 100 compares a bend area and a touch area (S4320). If the bend area and the touch area overlap with each other as a result of the comparing, it is determined that the manipulation is unintended bend manipulation (S4350), and, if the bend area and the touch area do not overlap with each other, it is determined that the bend manipulation is intended by the user (S4330)

That is, even though the result of comparing the bend area and the touch area is the same as in FIG. 39, a different judgment is made. The criterion for determining whether a manipulation is intended by the user or not may be appropriately determined considering a type, size, shape, weight, and thickness, etc. of the flexible display apparatus 100.

Figure 44:
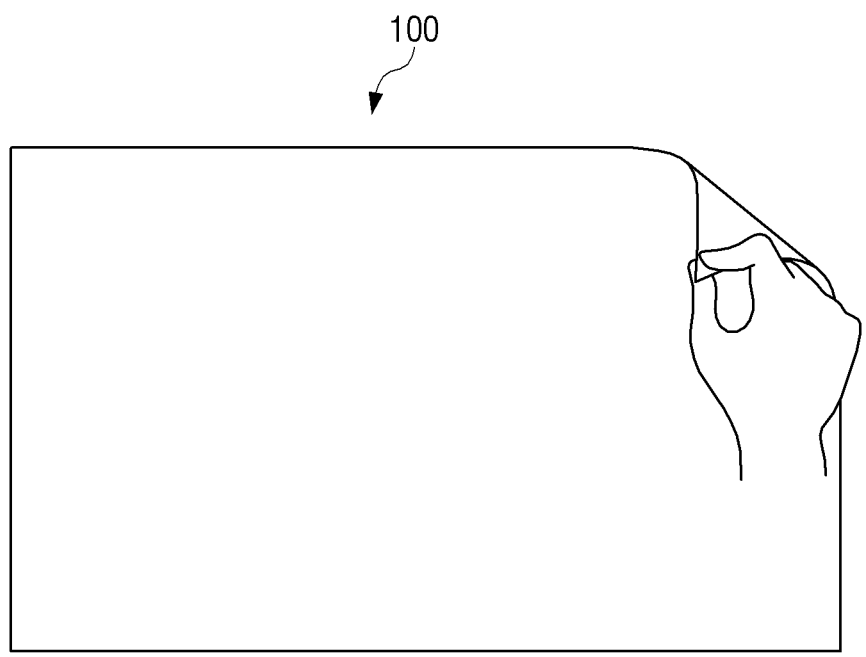
FIG. 44 is a view illustrating an example of a user's bend manipulation which is determined in the method of FIG. 43.

FIG. 44 illustrates a case in which the user holds a corner of the display apparatus 100 with only the user's thumb and index finger and bends it. In this case, a bend is not sensed in a touch area and bend is sensed at a point which is located away from the touch area by a predetermined distance. If a bend is sensed as shown in FIG. 44, the flexible display apparatus 100 according to the exemplary embodiment of FIG. 43 determines that the bend is a user's bend manipulation intended by the user and performs a corresponding operation.

Figure 45:
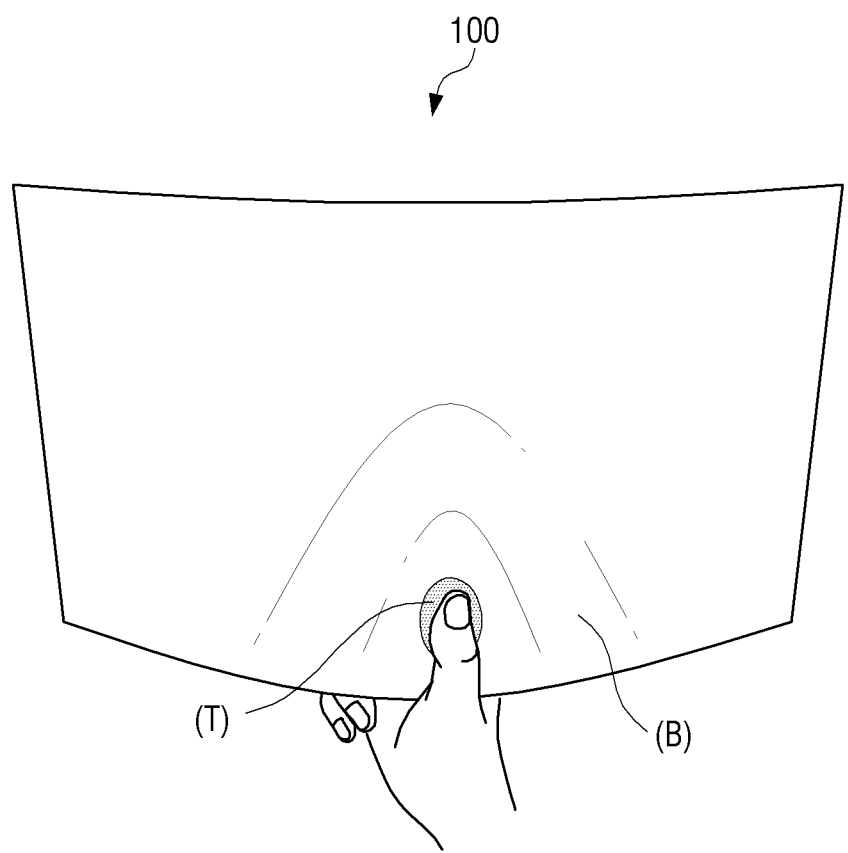
FIG. 45 is a view illustrating an example of unintended bend.

On the other hand, FIG. 45 illustrates a case in which the flexible display apparatus 100 according to the exemplary embodiment of FIG. 43 determines that bend is unintended. If the flexible display apparatus 100 is thin and light like paper, the user may hold the flexible display apparatus 100 in the way shown in FIG. 45 to hold and view it. In this case, a touch area (T) is included in a bend area (B) and a bend line is not clearly formed. If the touch area (T) and the bend area (B) overlap with each other in the way shown in FIG. 45, the flexible display apparatus 100 determines that a bend is an unintended bend and may maintain an operation that has been performed before.

According to an exemplary embodiment, a user's manipulation pattern may be stored in advance. In this case, a user's intention may be determined according to whether a bend performed afterward is consistent with the manipulation pattern or not.

Figure 46:
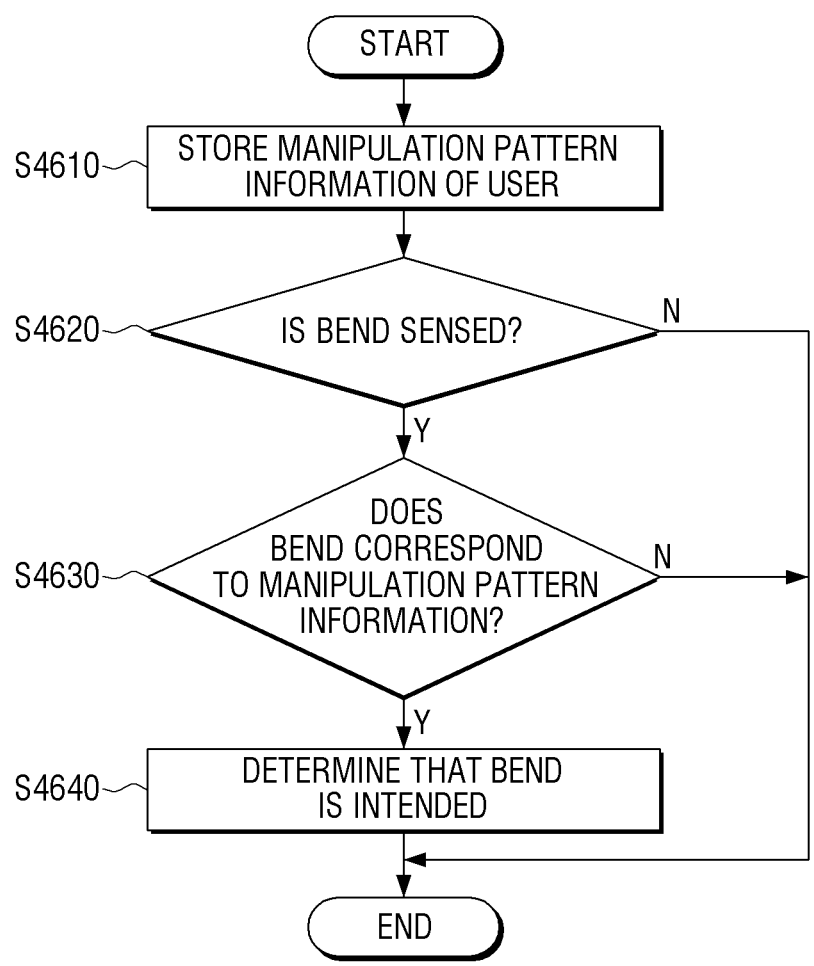
FIG. 46 is a flowchart to explain an example of a method for selecting an intended input using manipulation pattern information of a user.

FIG. 46 is a flowchart to explain an example of a method for determining an intended manipulation based on a manipulation pattern.

Referring to FIG. 46, the flexible display apparatus 100 stores information on a pattern in which the user performs bend manipulations (S4610). In this case, the manipulation pattern information refers to information on a bend manipulation that is frequently used from among the user's bend manipulations set to be matched with functions provided by the flexible display apparatus 100. The manipulation pattern information may be defined according to various criteria such as time, user, day, and application, etc., and may be stored.

In this state, if a bend is sensed (S4620), the flexible display apparatus 100 determines whether the bend corresponds to pre-stored manipulation pattern information or not (S4630). If the bend is consistent with the pre-stored manipulation pattern information, it is determined that the bend is a user's bend manipulation is intended by the user (S4640). On the other hand, if the bend is not consistent with the pre-stored manipulation pattern information, the bend is disregarded or the user's intention may be checked again by displaying a message asking the user about whether the bend is intended or not.

For example, in the exemplary embodiment of FIG. 46, it is assumed that a user A frequently bends a corner when driving a content reproducing application on Wednesday during a morning time. In this case, Wednesday, morning time, user A, content reproducing application, bend of a corner are associated with one another and are stored as manipulation pattern information. In this case, if a bend of a corner is sensed in a state in which day, time, user, and application conditions are all satisfied, it is determined that the bend is a bend manipulation performed according to a user's intention and directly performs a corresponding operation. For example, a volume of a reproduced content may be adjusted. On the other hand, if at least one of the above-described conditions is not satisfied or if other types of bends such as folding or rolling are sensed, it is determined that the bend is an unintended bend. In this case, the flexible display apparatus 100 does not perform any operation until the same bend is input again or displays a message for checking a user's intention and performs a corresponding operation after checking the user's intention.

Such manipulation pattern information includes bend characteristic information besides environment information such as a time at which a manipulation is performed, day, user, and application. The bend characteristic information refers to information that defines a bend characteristic matched with an operation. For example, the bend characteristic information may be information that defines various characteristics such as a number of bend lines, a location of a bend line, a number of bend areas, a location of a bend area, a bend angle, a bend speed, a number of times that bend is performed, and a bend direction.

The bend characteristic information may be set according to a use record of the user. The bend manipulation pattern information may be generated according to manipulation of the user that is recognized when the flexible display apparatus 100 is initially used or manipulation of the user that is recognized when a resetting process is initiated, and may be stored. After that, the manipulation pattern information including the bend characteristic information may be updated according to the use record of the user. Specifically, if manipulation pattern information is stored in advance by the user, but a bend that is slightly different from the stored information is repeatedly performed, the manipulation pattern information may be reset according to the bend state. That is, if a bend of a corner by 45° is set to adjust a volume, but the user bends the corner by about 40° multiple times, bend characteristic information matched with a volume adjusting operation may be calibrated as bend by 40° and may be stored.

The manipulation pattern information may be arbitrarily set and updated by the user. In this case, a menu for the user to set or change the manipulation pattern information may be provided. Also, if manipulation pattern information is consistent with previously set manipulation pattern information, the previous manipulation pattern information may be modified or manipulation pattern information to be set may be modified and set.

As described above, if a user's bend manipulation that is frequently used is input, the flexible display apparatus 100 determines that the bend manipulation is intended, and, if not, determines that the bend manipulation is unintended and checks the user's intention again so that the proper operation may be performed and an unwanted operation may not be performed As described above, a bend includes special types of bend such as folding and rolling in addition to a normal bend. A different operation may be matched according to a bend type. Also, in order to improve user's satisfaction, various types of bend may be sensed and a different operation may be matched with each bend type. For example, if a special bend such as shaking or swinging can be sensed, a specific operation is matched with each bend so that the user can use the bend. The shaking refers to holding the flexible display apparatus 100 with one hand and moving it repeatedly forward and backward. The swinging refers to holding the flexible display apparatus 100 with both hands and moving it repeatedly up and down. Therefore, there may be a need for a method for precisely determining a variety of manipulations.

Figure 47:
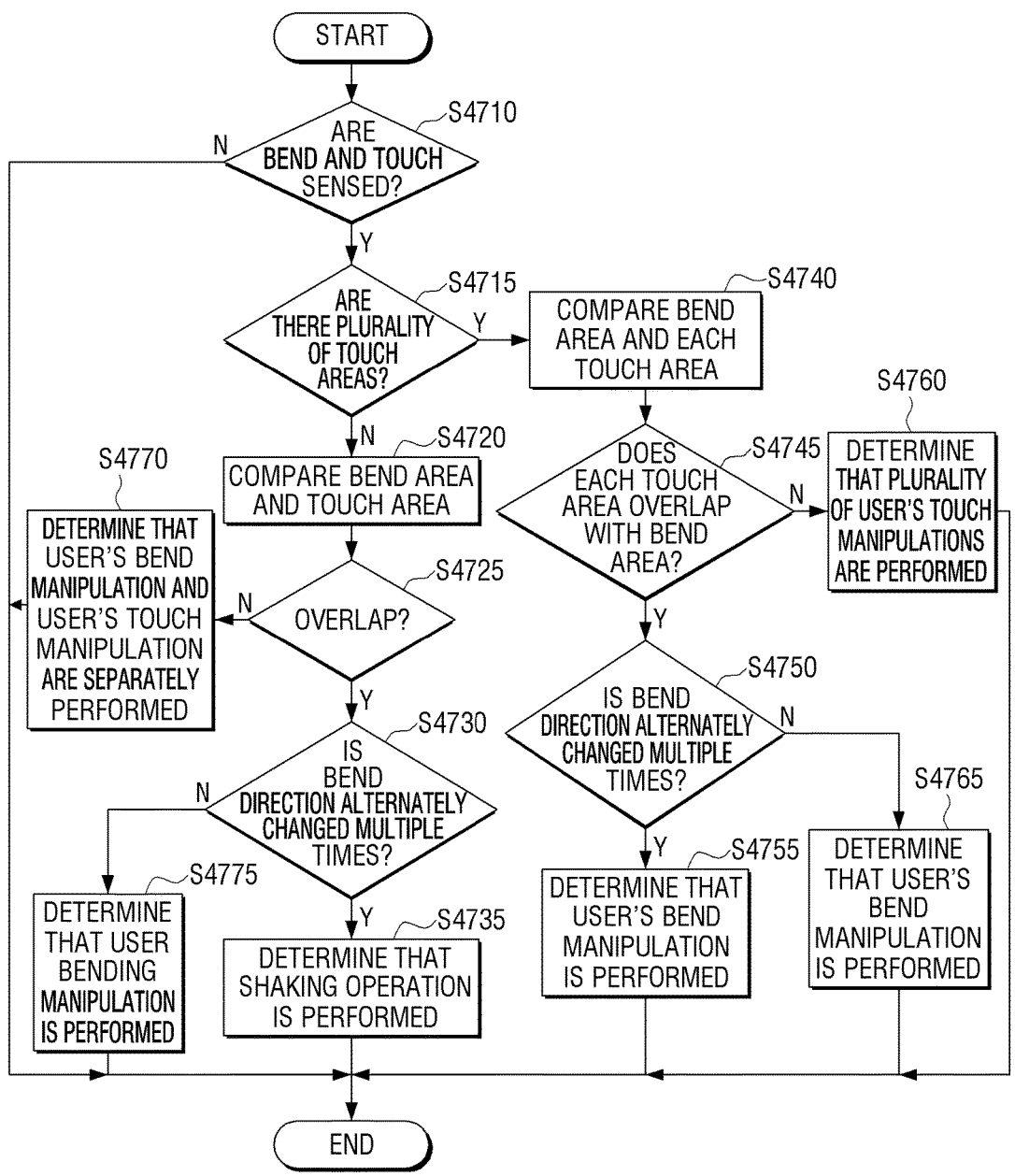
FIG. 47 is a flowchart to explain an example of a method for selecting an intended input and a bend type using various bend characteristics.

FIG. 47 is a flowchart to explain a method for determining a variety of user's manipulations considering a characteristic of a user's manipulation.

Referring to 47, if a bend and a touch are sensed (S4710), it is determined whether there are a plurality of touch areas (S4715). If it is determined that there are not a plurality of touch areas (S4715: N), a bend area and a touch area are compared and it is determined whether they overlap with each other (S4720 and S4725).

If they do not overlap with each other, it is determined that the user's bend manipulation and the user's touch manipulation are separately performed (S4770), and operations corresponding to the manipulations are performed separately.

On the other hand, if the bend area and the touch area overlap with each other, it is determined whether a bend direction is alternately changed multiple times (S4730). Specifically, it may be determined whether a bend in the Z+ direction and a bend in the Z− direction are alternately performed multiple times. The method for sensing a bend direction has been described above, and thus a redundant explanation is omitted.

If it is determined that the bend direction is alternately changed multiple times, the flexible display apparatus 100 determines that shaking is performed (S4735).

On the other hand, if it is determined that the bend direction is not alternately changed multiple times, it is determined that the bend is a user's bend manipulation intended by the user (S4775).

If there are a plurality of touch areas (S4715: Y), the bend area and each of the touch areas are compared (S4740).

If each of the touch areas does not overlap with the bend area as a result of the comparing (S4745: N), it is determined that a plurality of a user's touch manipulations are performed (S4760).

On the other hand, if each of the touch areas overlaps with the bend area (S4745: Y), it is determined whether the bend direction is alternately changed multiple times (S4750).

Accordingly, if it is determined that the bend direction is alternately changed multiple times, it is determined that swinging is performed (S4755). But if it is determined that the bend direction is not alternately changed multiple times, it is determined that the bend is a user's bend manipulation intended by the user (S4765). In this case, it is determined that the plurality of touch areas are unintended touches and the touch is disregarded.

As described above, it can be determined whether a variety of a user's manipulations are intended or unintended considering various user's manipulation characteristics such as a relationship between a touch area, a bend area and a bend direction.

In particular, according to whether at least one of various bend characteristics such as a touched point, a bend area, a bend speed, a number of times that bend is performed, and a bend angle satisfies a predetermined condition or not, it may be determined whether a user's manipulation of a special type such as shaking or swinging is performed or not.

Also, if a user's manipulation is sensed, the controller 130 may determine whether the user's manipulation is intended by the user or not considering a type of the user's manipulation and a function or an application which is being executed when the user's manipulation is sensed. Since a navigation application in motion may cause an unintended bend or touch, bend or touch that is sensed while such an application or function is being executed may be regarded as a user's manipulation that is unintended by the user and may be disregard.

Also, when such an application or function is executed, the flexible display apparatus 100 may react only to folding or rolling which is rarely performed unless the user intends to do, and may disregard the other normal bend.

Figure 48:
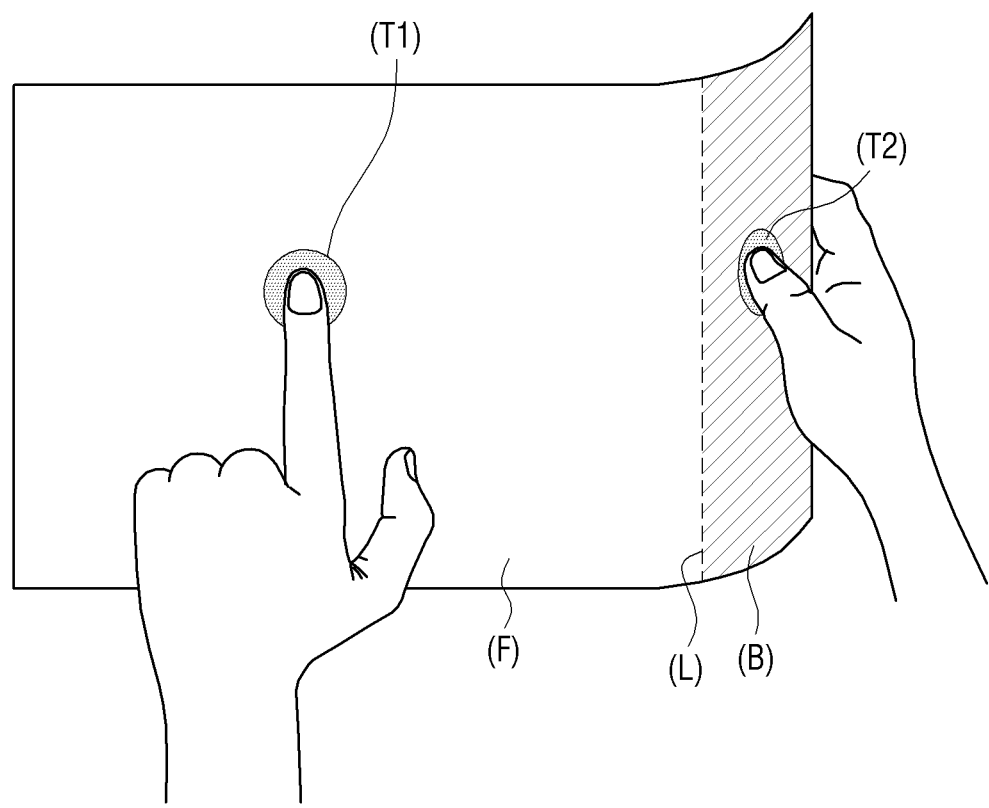
FIG. 48 is a view illustrating a case in which bend manipulation and touch manipulation are performed simultaneously.

FIG. 48 illustrates a state in which a user's bend manipulation and a user's touch manipulation are separately performed. As shown in FIG. 48, a plurality of touch areas (T1 and T2) are sensed in the entire area of the display 110, and, if there is a touch area (T1) that does not overlap with a bend area (B), it is determined that user's touch manipulation on the touch area (T1) and user's bend manipulation on the area (B) are performed.

Accordingly, an operation corresponding to the user's bend manipulation and an operation corresponding to the user's touch manipulation are simultaneously performed.

Figure 49:
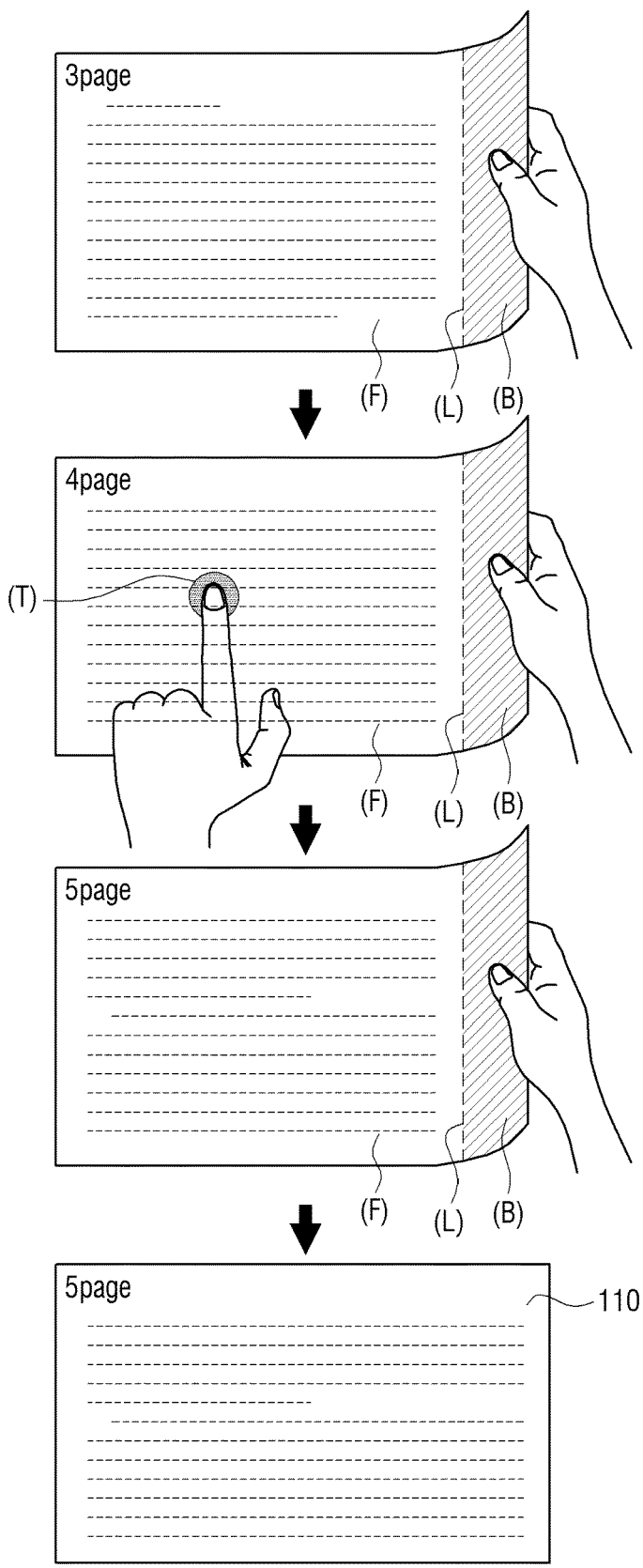
FIG. 49 is a view illustrating an example of an operation which is performed in the case of FIG. 48.

FIG. 49 illustrates an example of an operation if a user's bend manipulation and a user's touch manipulation are simultaneously performed. In FIG. 49, the flexible display apparatus 100 is executing an e-book application.

Referring to FIG. 49, if the user holds the right edge of the display 110 and bends it in the Z+ direction, the next page (page 4) of a current page (page 3) is displayed on the display 110.

If the user continues to bend the right edge in the Z+ direction, the next page (page 5) is displayed on the display 110.

If the user touches the screen of the display 110 in this process, a bookmark is set on the corresponding page.

If the user terminates bend when page 5 is being displayed and the entire area of the display 110 becomes flat, page 5 is continuously displayed on the display 110.

Figure 50:
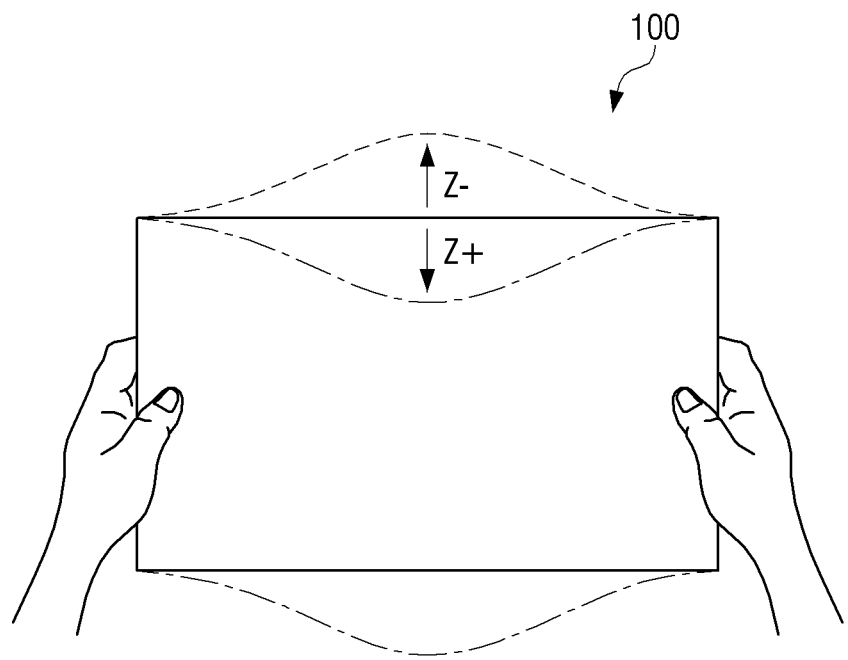
FIG. 50 is a view to illustrate a swinging operation.

FIG. 50 is a view to explain a swinging operation.

Referring to FIG. 50, if the user holds the flexible display apparatus with both hands and moves it repeatedly up and down, a bend in the Z+ direction and a bend in the Z− direction are alternately performed. The method for determining a swinging operation has been described above and thus a redundant explanation is omitted.

If the swinging operation is performed, the flexible display apparatus 100 performs an operation corresponding to the swinging operation. For example, if a swinging operation is performed while various objects such as an icon, an image, text, and a photo, etc. are being displayed on the display 110, the flexible display apparatus 100 may delete the objects one by one.

Figure 51:
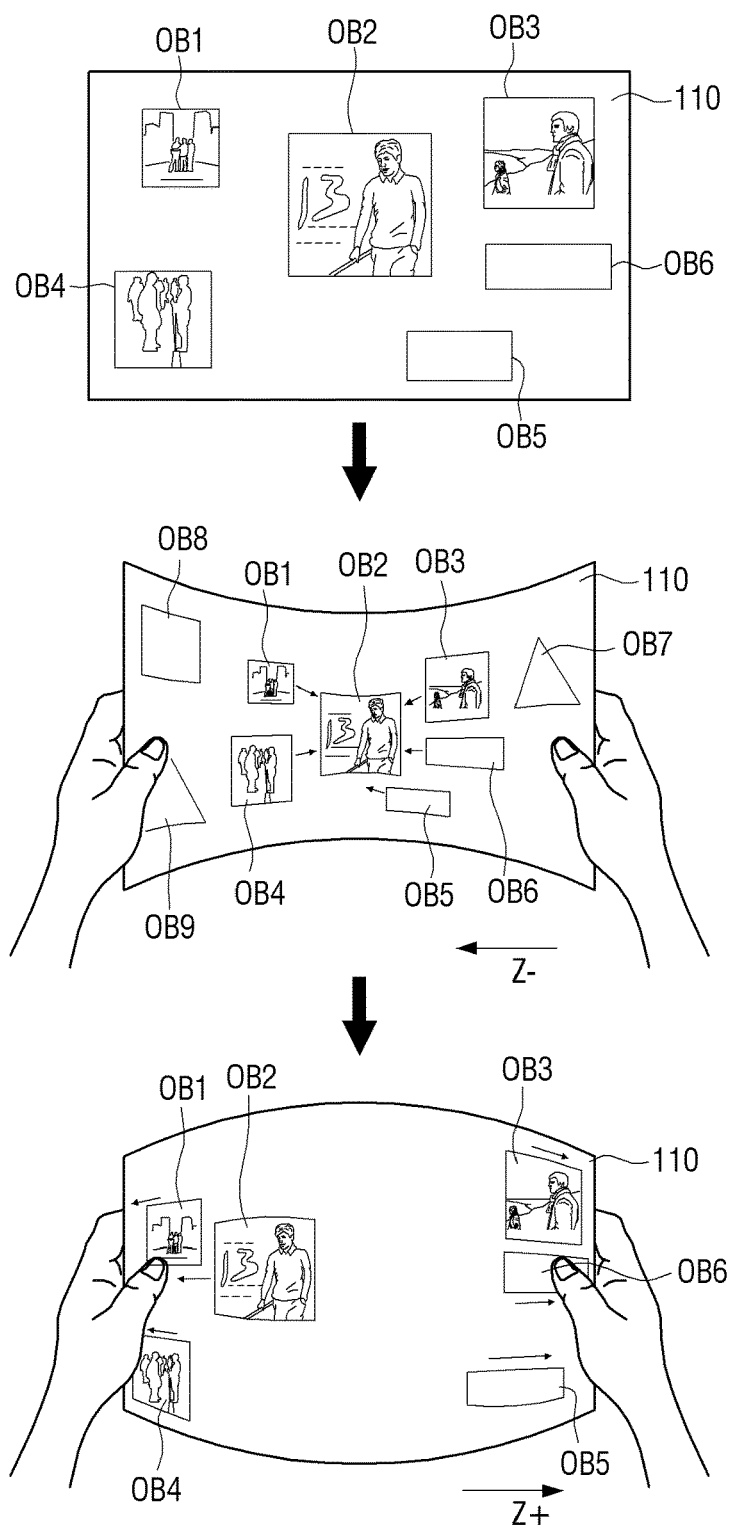
FIG. 51 is a view illustrating an example of an operation which is performed according to a swinging operation.

FIG. 51 is a view to explain an example of an operation which is performed if the user holds the flexible display apparatus 100 with both hands and bends it.

Referring to FIG. 51, if a bend is performed in the Z− direction while a plurality of objects OB1 to OB6 are displayed on the display, the objects OB1 to OB6 displayed on the screen are moved toward a bend line. Also, objects OB7 to OB9 that are not displayed in a flat state are newly displayed and are moved toward the bend line.

On the other hand, if a bend is performed in the Z+ direction, the objects are moved toward opposite edges with reference to the bend line. Accordingly, the objects that are moved to the opposite edges disappear from the screen.

In FIG. 51, if a bend in the Z− direction and bend in the Z+ direction are alternately repeated at a high speed, the flexible display apparatus 100 determines that a swinging operation is performed. Accordingly, the objects displayed on the screen disappear one by one as if they are shaken off from the screen.

Figure 52:
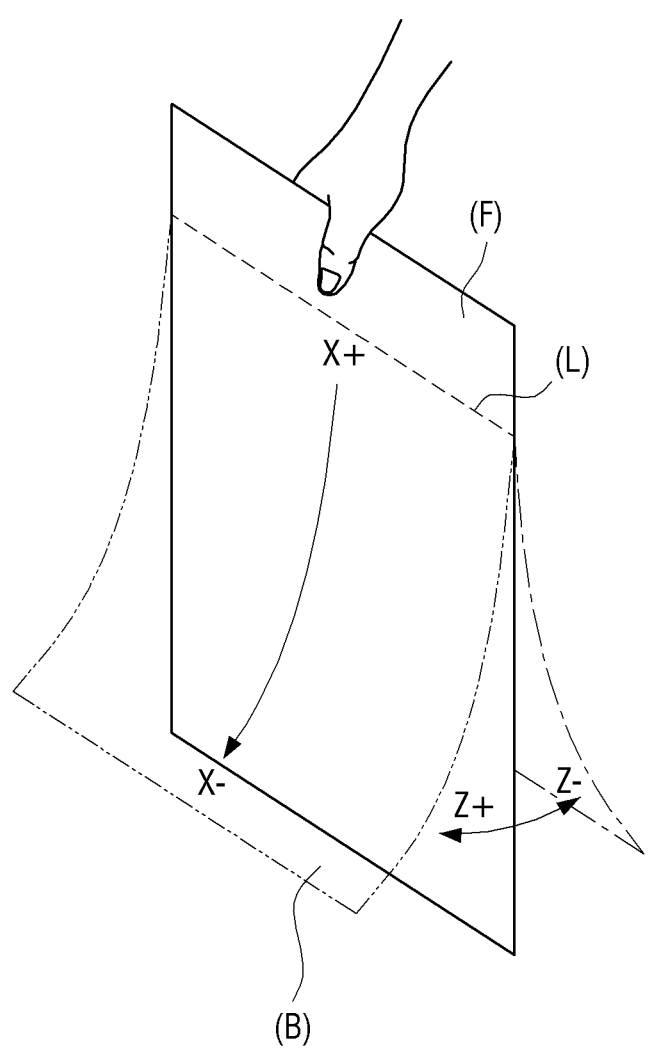
FIG. 52 is a view to illustrate a shaking operation.

FIG. 52 is a view to explain a shaking operation.

Referring to FIG. 52, if the user holds one edge of the flexible display apparatus 100 and shakes it, the flexible display apparatus 100 is alternately bent in the Z+ direction and the Z− direction. One part which is held by the user is maintained in a flat state (F) and the other part is bent with reference to a boundary line (L) so that a bend area (B) is formed. As shown in FIG. 52, a direction in which the user holds the flexible display apparatus 100 is defined as an X+ direction and the opposite direction is defined as an X-direction.

Figure 53:
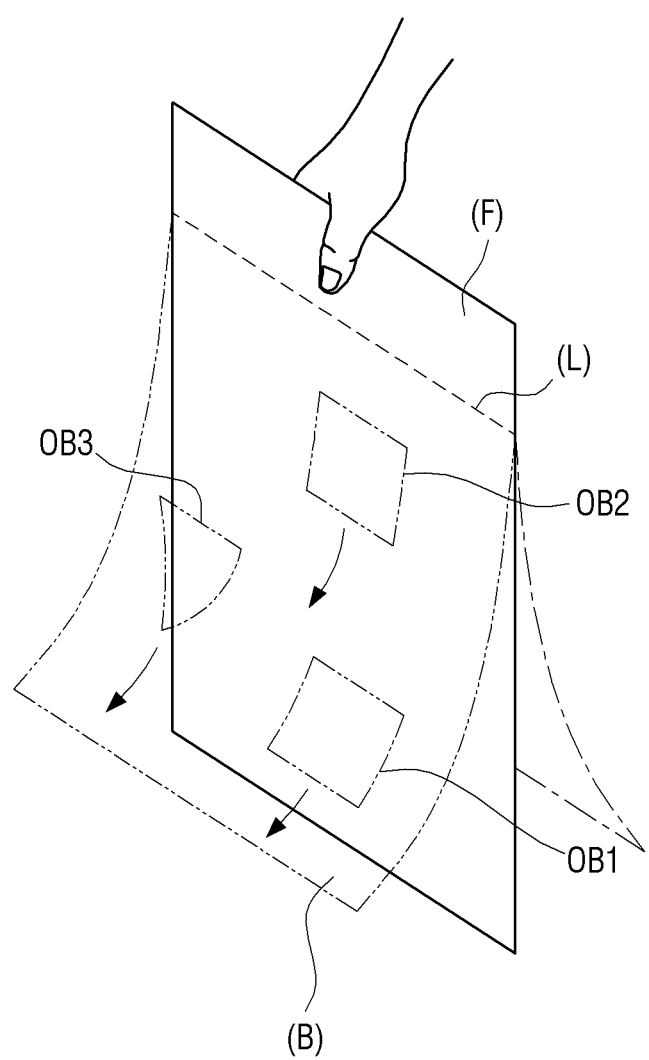
FIG. 53 is a view illustrating an example of an operation which is performed according to a shaking operation.

FIG. 53 is a view illustrating an example of an operation which is performed according to a shaking operation.

Referring to FIG. 53, if a shaking operation is performed while a plurality of objects OB1 to OB3 are being displayed on the screen of the display 110, the objects are moved in the X− direction and displayed. If the objects OB1, OB2, and OB3 are moved to the edge of the X− direction, they are deleted.

Although the examples of the operations corresponding to the user's manipulation are illustrated in the above, the flexible display apparatus 100 may perform a different operation according to a characteristic of the user's manipulation or an application or a function which is executed when the user's manipulation is performed.

The method for determining and processing a user intention or intended input based on various results of sensing according to various exemplary embodiments has been described. However, according to an exemplary embodiment, the flexible display apparatus may react to a user's manipulation selectively according to a selected mode, without determining whether the user's manipulation is intended by the user or not.

Figure 54:
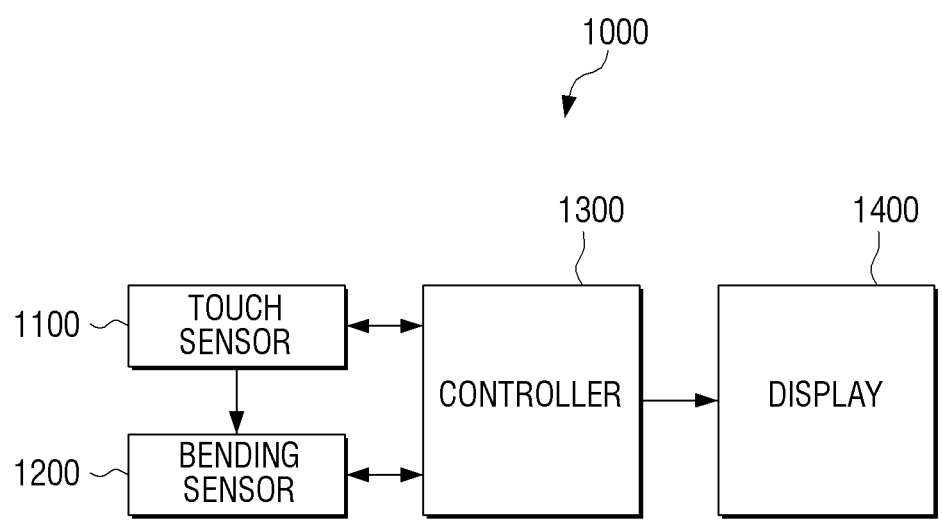
FIG. 54 is a block diagram illustrating a flexible display apparatus according to an exemplary embodiment.

FIG. 54 is a block diagram illustrating a flexible display apparatus according to an exemplary embodiment.

Referring to FIG. 54, a flexible display apparatus 1000 includes a touch sensor 1100, a bending sensor 1200 (e.g., a deformation sensor), a controller 1300, and a display 1400.

The display 1400 is bendable. The configuration of the display 1400 has been described above in detail and thus a redundant explanation is omitted.

The touch sensor 1100 senses touch on the display 1400 using a sensor which senses touch.

The bending sensor 1200 senses bend of the display 1400 using a sensor which senses bend.

The method for sensing touch and the method for sensing bend have been described above in detail and thus a redundant explanation is omitted.

The controller 1300 is operated in one of a plurality of operation modes. The operation modes may include a touch manipulation mode and a bend manipulation mode.

The controller 1300 performs an operation corresponding to touch sensed by the touch sensor 1100 in the touch manipulation mode. On the other hand, the controller 1300 performs an operation corresponding to bend sensed by the deformation sensor 1200 in the bend manipulation mode.

The controller 1300 disregards bend sensed by the deformation sensor 1200 in the touch manipulation mode, and disregards touch sensed by the touch sensor 1100 in the bend manipulation mode.

The controller 1300 is operated in one of the touch manipulation mode and the bend manipulation selectively according to a user's mode selection. The mode may be selected in various ways. For example, the mode selection may be an event in which a menu displayed on the screen of the flexible display apparatus 1000 is selected.

Figure 55:
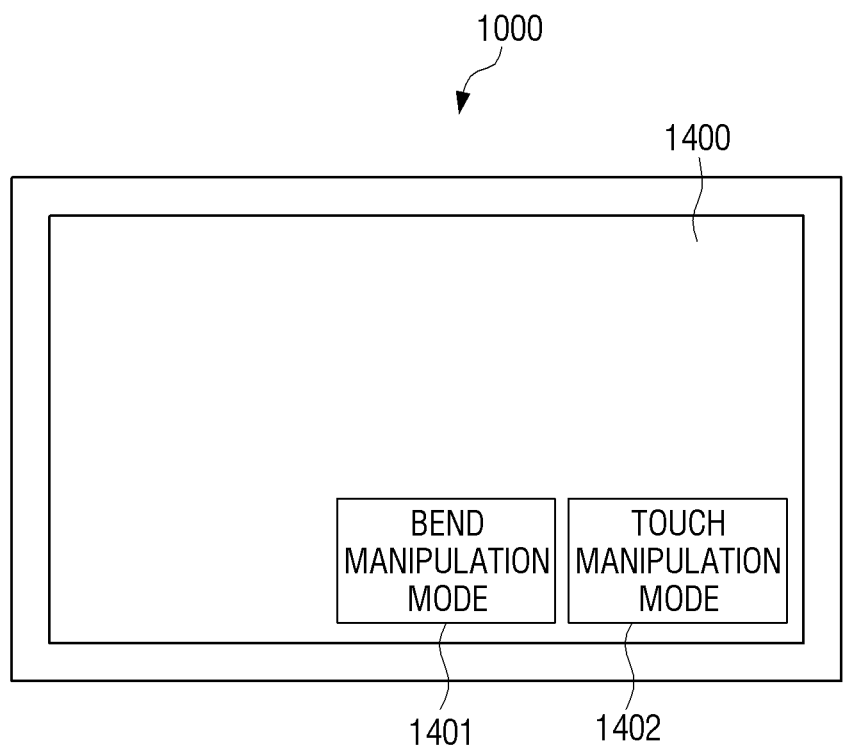
FIG. 55 is a view illustrating an example of a method for selecting an operation mode in the flexible display apparatus of FIG. 54.

FIG. 55 illustrates the flexible display apparatus 1000 which displays a screen including a mode selection menu.

Referring to FIG. 55, a menu item 1401 for selecting the bend manipulation mode and a menu item 1402 for selecting the touch manipulation mode may be displayed on the screen. The user may select one of the menus 1401 and 1402 to select a mode that the user desires. The two menu items 1401 and 1402 may be displayed on the screen and may be displayed if the user touches or bends the screen. Also, the two menu items 1401 and 1402 may not be simultaneously displayed and only the menu for selecting the other manipulation mode may be displayed. For example, in the touch manipulation mode, only the menu item 1401 for selecting the bend manipulation mode may be displayed, and, in the bend manipulation mode, only the menu item 1402 for selecting the touch manipulation mode may be displayed.

Although FIG. 55 illustrates the two mode selection menu items, a number of items for selecting a mode, a shape of the items, and a location of the item may be changed in various ways.

The controller 1300 may inactivate the bending sensor 1200 in the touch manipulation mode, and may inactivate the touch sensor 1100 in the bend manipulation mode. The operation of inactivating may be cutting off the power supply or may be ignoring or disregarding the input received by the sensor. As described above, if the power supply to the unused sensor is cut off, unnecessary power consumption can be reduced.

Also, if neither of the touch manipulation mode and the bend manipulation is selected, the controller 1300 may perform no operation even if a bend or a touch is performed. If a certain button provided on a body of the flexible display apparatus 1000 is selected, the controller 1300 may display menus on the screen as shown in FIG. 55. If one menu item is selected, the controller 1300 starts an operation mode corresponding to the menu. If the flexible display apparatus is not used for a predetermined time and thus enters a locking state, and then returns back to a unlocking state, or is tuned on after having been turned off, the flexible display apparatus 10 may be initialized to be in a state in which neither of the touch manipulation mode and the bend manipulation mode is selected. Accordingly, an operation which may be caused by unintended touch or bend can be prevented.

Although not shown in FIG. 54, the flexible display apparatus 1000 may further include a pressure sensor.

The pressure sensor (not shown) may sense an intensity of pressure applied to the display by a user grip. If pressure greater than or equal to a predetermined value is sensed by the pressure sensor for a predetermined time, the controller 1300 may determine that a event of changing mode is generated and may change the mode as described above. For example, if pressure is sensed in the touch manipulation mode, the touch manipulation mode is changed to the bend manipulation mode, and, if pressure is sensed in the bend manipulation mode, the bend manipulation mode is changed to the touch manipulation mode.

Figure 56:
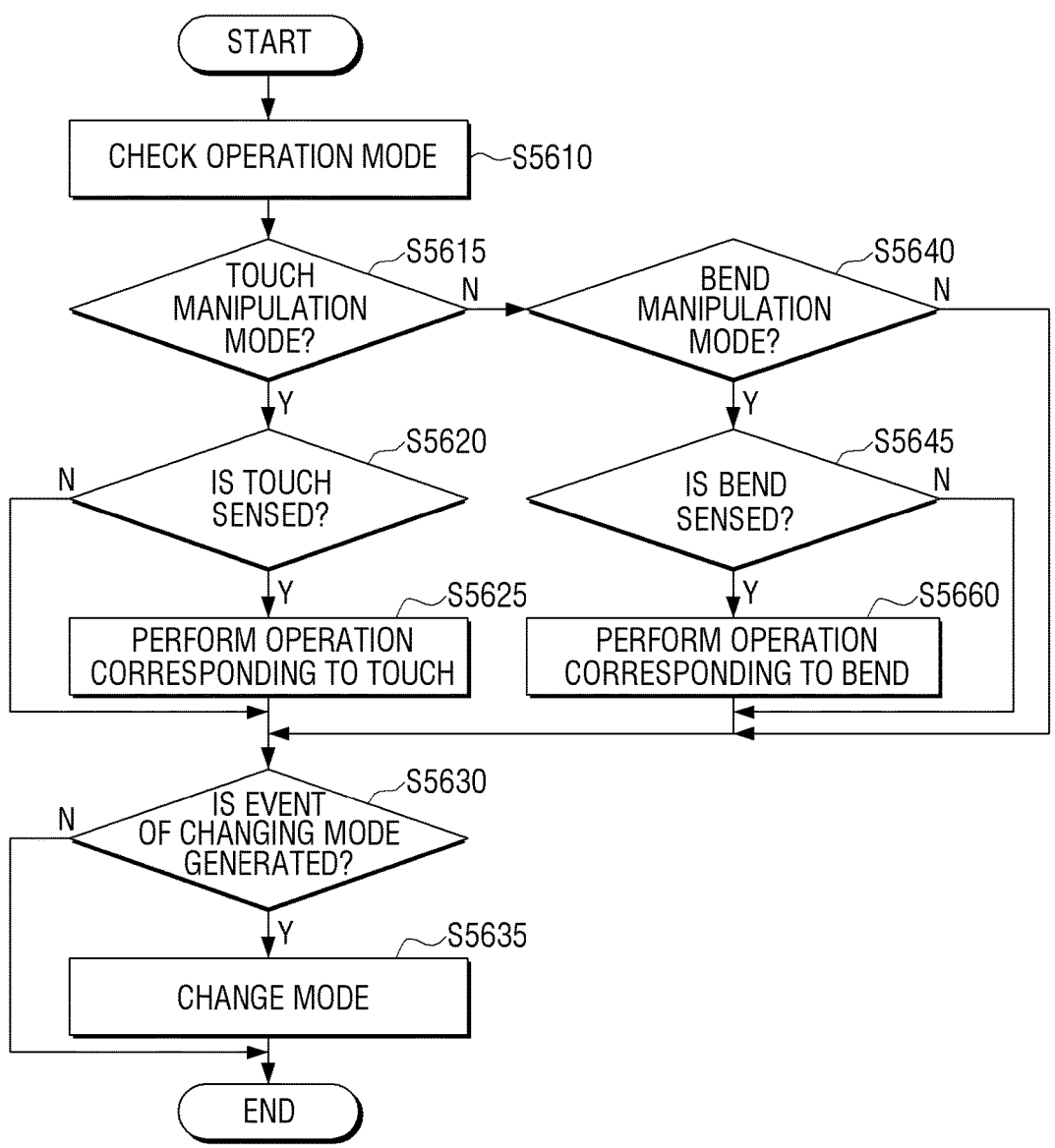
FIG. 56 is a flowchart to explain an operating method of a flexible display apparatus according to an exemplary embodiment.

FIG. 56 is a flowchart to explain an operating method of the flexible display apparatus of FIG. 54 according to an exemplary embodiment.

Referring to FIG. 56, the flexible display apparatus checks a currently set operation mode (S5610) and determines whether the operation mode is a touch manipulation mode (S5615) or a bend manipulation mode (S5640).

If the current operation mode is the touch manipulation mode (S5615: Y) and if user's touch manipulation is sensed (S5620: Y), the flexible display apparatus performs an operation corresponding to the touch (S5625).

On the other hand, if the current operation mode is the bend manipulation mode (S5640: Y) and if a bend is sensed (S5645: Y), the flexible display apparatus performs an operation corresponding to the bend (S5650).

If an event of changing mode is generated in the touch manipulation mode or the bend manipulation mode (S5630), the flexible display apparatus changes the current operation mode to the other operation mode (S5635).

If the mode is selected in advance as in the exemplary embodiment of FIGS. 54 to 56, an unintended or unwanted operation of the flexible display apparatus can be prevented.

Also, although the flexible display apparatus 100 is a flat type in the above-described exemplary embodiments, the flexible display apparatus 100 may be implemented in various types. For example, the flexible display apparatus 100 may be embedded in a body that is formed of an inflexible material.

Figure 57:
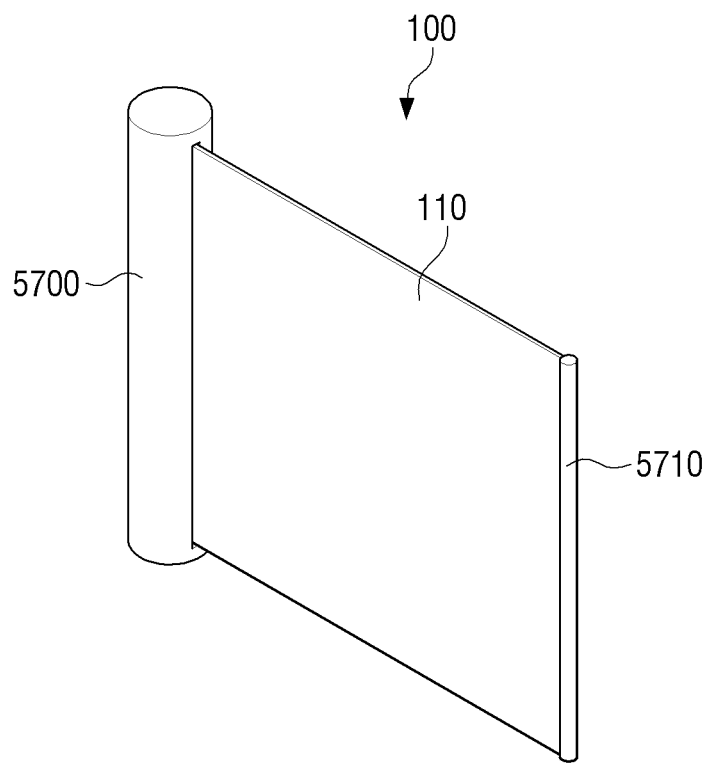
FIG. 57 is a view illustrating another example of an exterior of a flexible display apparatus.

FIG. 57 is a view illustrating an example of a flexible display apparatus which is embedded in a body.

Referring to FIG. 57, the flexible display apparatus 100 includes a body 5700, a display 110, and a grip unit 5710.

The body 5700 may serve as a kind of a case containing the display 110. If the flexible display apparatus 100 includes various elements as shown in FIG. 26, elements other than the display 110 and some sensors may be mounted in the body 5700. The body 5700 includes a rotary roller for rolling the display 110. Accordingly, when not in use, the display 110 is rolled about the rotary roller and embedded in the body 5700.

If the user holds the grip unit 5710 and pulls the display 110, the rotary roller is rotated in the opposite direction to that of the rolling and rolling is released, so that the display 110 comes out to the outside of the body 5700. A stopper may be provided on the rotary roller. Accordingly, if the user pulls the grip unit 5710 by more than a predetermined distance, the rotation of the rotary roller is stopped by the stopper and the display 110 may be fixed. Accordingly, the user can execute various functions using the display 110 that is outside of the body 5700. If the user presses a button to release the stopper, the stopper is released and the rotary roller is rotated in a reverse direction. As a result, the display 110 is rolled in the body 5100. The stopper may have a switch shape to stop an operation of a gear to rotate the rotary roller. Since the rotary roller and the stopper may employ a general rolling structure as it is, detailed illustration and explanation thereof are omitted.

The body 5700 includes a power supply 500. The power supply 500 may be implemented by using a battery connector on which a disposable battery is mounted, a secondary cell which can be charged and used multiple times by the user, and a solar cell which generates electricity using solar heat. If the power supply is implemented by using the secondary cell, the user may connect the body 5700 to an external power source through a wire and may charge the power supply 500.

In FIG. 57, the body 5700 has a cylindrical shape. However, the shape of the body 5700 may be quadrangular or other polygonal shape. Also, the display 110 may be implemented in various forms such as enclosing the body 5700, rather than being embedded in the body 5700 and being exposed to the outside by being pulled.

Figure 58:
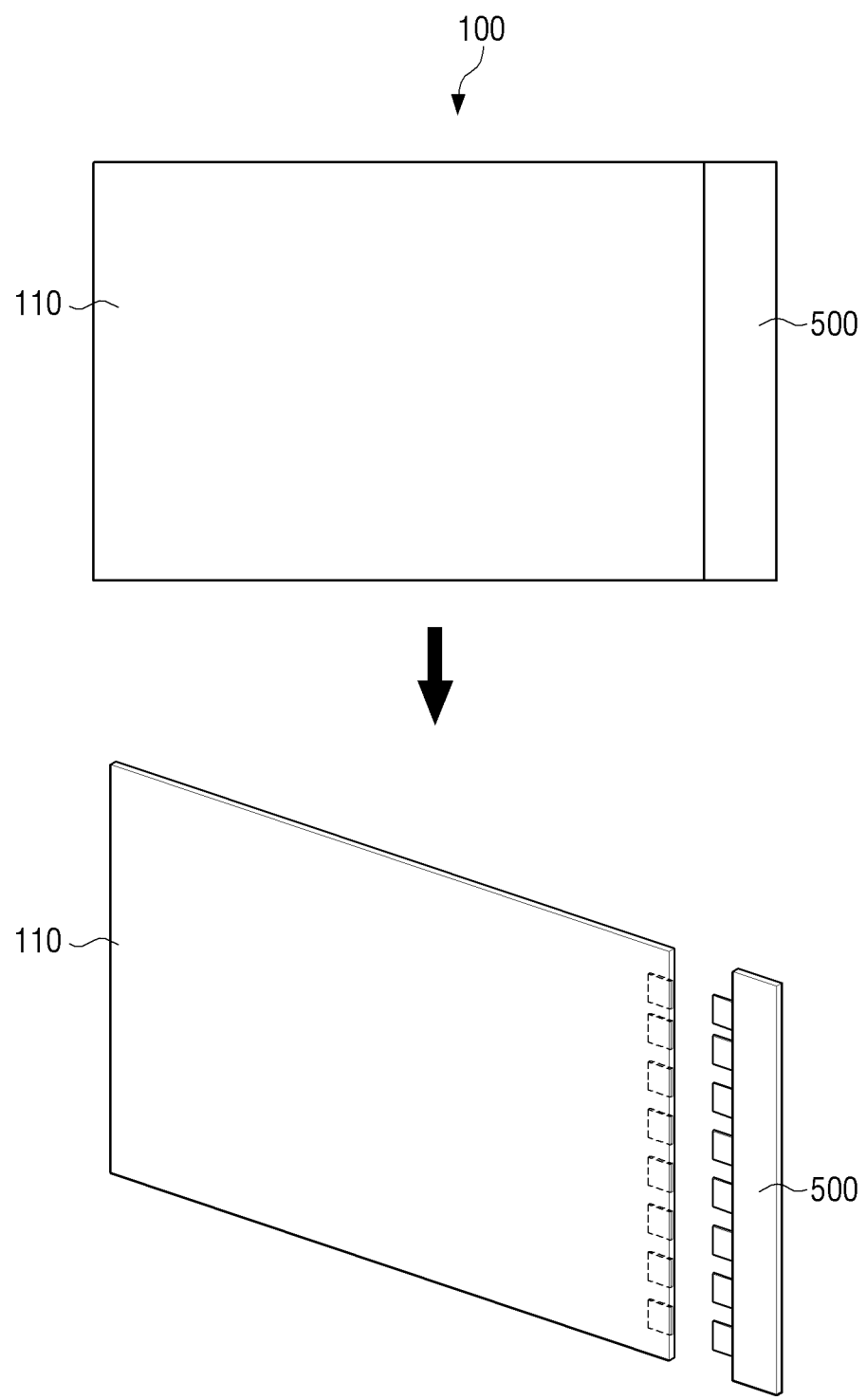
FIG. 58 is a view illustrating a flexible display apparatus including a battery which is attachable and detachable.

FIG. 58 is a view illustrating a flexible display apparatus in which a power supply 500 is attachable and detachable. Referring to FIG. 58, the power supply 500 is provided on one edge of the flexible display apparatus and is attachable and detachable.

The power supply 500 is made of a flexible material and can be bent along with the display 110. Specifically, the power supply 500 includes a cathode collector, a cathode electrode, an electrolyte, an anode electrode, an anode collector, and a sheath covering the aforementioned members.

For example, the collector may be implemented by using an alloy such as TiNi having good elasticity, metal such as copper and aluminum, etc., a conductive material such as metal coated with carbon, carbon, and a carbon fiber, or a conducting polymer, etc. such as polypyrrole.

The cathode electrode may be manufactured by a negative electrode material such as metal such as lithium, natrium, zinc, magnesium, cadmium, hydrogen storage alloy, and lead, etc., nonmetal such as carbon, and a high polymer electrode material such as organosulfur.

The anode electrode may be manufactured by a positive electrode material such as sulfur and metal sulfide, lithium transition metal oxide such as $LiCoO_2$, and a polymer electrode material such as $SOCl_2$, $MnO_2$, $Ag_2O$, $Cl_2$, $NiCl_2$, and NiOOH etc. The electrolyte may be implemented in a gel form using PEO, PVdF, PMMA, and PVAC.

The sheath may use a general polymer resin. For example, PVC, HDPE, or epoxy, etc. may be used. Besides these, any material that can prevent damage of a thread-type cell and is freely flexible or bendable may be used for the sheath.

Each of the anode electrode and the cathode electrode in the power supply 500 may include a connector to be electrically connected to an external source.

Referring to FIG. 58, the connector protrudes from the power supply 500 and a recess corresponding to a location, a size, and a shape of the connector is formed on the display 110. Accordingly, the power supply 500 is connected with the display 110 as the connector and the recess are connected to each other. The connector of the power supply 500 is connected to a power connection pad (not shown) of the flexible display apparatus 100 to supply power to the flexible display apparatus 100.

Although the power supply 500 is attached to or detached from one edge of the flexible display apparatus 100 in FIG. 58, this is merely an example. A location and a shape of the power supply 500 may be changed according to a product characteristic. For example, if the flexible display apparatus 100 has a predetermined thickness, the power supply 500 may be mounted on a rear surface of the flexible display apparatus 100.

In the above-described exemplary embodiments, after user's manipulation such as bend or touch has been performed, a corresponding operation is performed according to whether that manipulation is an exact manipulation or not.

However, the flexible display apparatus 100 in the above-described exemplary embodiments may suggest a guide for the user to perform appropriate bend prior to a user's manipulation being performed.

Figure 59:
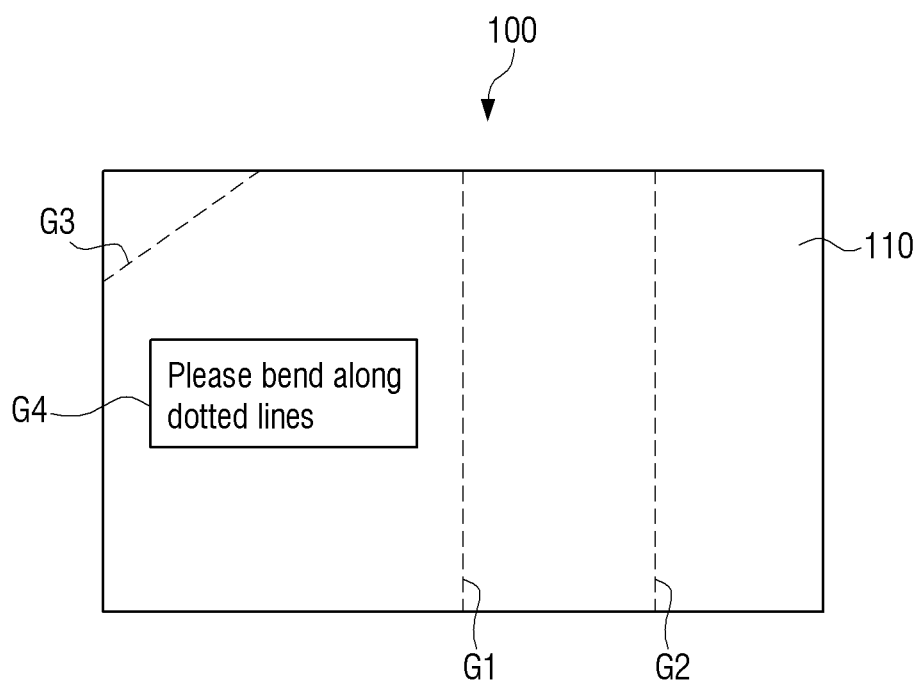
FIG. 59 is a view illustrating an operation of a flexible display apparatus which displays a guide.

FIG. 59 is a view illustrating the flexible display apparatus 100 which displays various guides. Referring to FIG. 59, the flexible display apparatus 100 may display guides such as dotted line guides G1 to G3 and a text guide G4 on the screen of the display 110. The dotted line guides G1, G2, and G3 are to inform a location of any possible bend line and the text guide G4 directly instructs the user to bend along the dotted lines.

The guide provided on the flexible display apparatus 100 may be implemented by using an image or a pop-up window besides the dotted line or the text described above. Also, the guide may be implemented in a form so that it can inform a number of times that bend is performed, a degree of bend, a bend angle, a bend direction, a bend order, and a bend shape, besides the bend location.

Such guides may be displayed when the flexible display apparatus 100 is turned on or a locking state is released. Also, the guides may be displayed when an application that allows bend input is executed. In this case, the guides may be displayed only if a guide display function is selected on an option menu.

In the case of the flexible display apparatus provided with a button, that is, a BEB as shown in FIG. 31, a light emitting diode (LED) is disposed on a button location and is flickered so that the user is led to touch the button. In this case, a voice guide rather than a visual guide may be provided. That is, a voice message saying "please bend" may be provided when the user touches the button to input bend. Also, the guide may be displayed when the button is touched. For example, if the button is touched, at least one of the various visual guides and voice guides shown in FIG. 59 may be provided.

Also, a guide for giving a notice or a guide for informing a use order may be provided. Accordingly, the guide may instruct a novice user on how to make appropriate gesture without having to learn or remember. Also, if a bend is performed according to the guide, it is directly determined that the bend is a user's bend manipulation intended by the user.

Also, the flexible display apparatus 100 which employs the above-described various inputting methods may provide feedback in response to a user's manipulation.

Such feedback may be provided using sight, hearing and touch.

For example, if the user incorrectly bends or touches the flexible display apparatus, a visual message to check a user's intention again may be provided.

Figure 60:
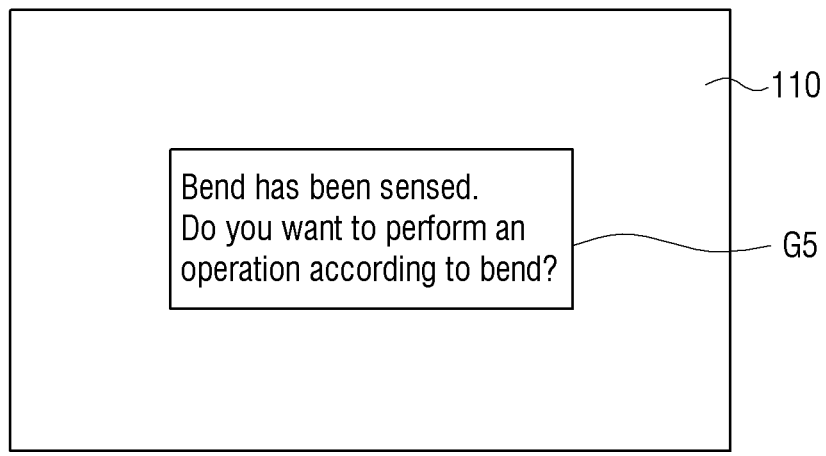
FIGS. 60 and 61 are views illustrating an operation of a flexible display apparatus which provides feedback according to a user's manipulation.

FIG. 60 illustrates an example of an inquiry message G5 when bend is sensed. According to the exemplary embodiments described above, the flexible display apparatus directly performs an operation corresponding to intended bend manipulation, but disregards unintended bend manipulation. However, without directly disregarding unintended bend, the flexible display apparatus 100 may display the message G5 as shown in FIG. 60 to check the user's intention once more.

The message G5 shown in FIG. 60 may be displayed along with a check menu (not shown). If the user selects the check menu, the flexible display apparatus 100 performs an operation corresponding to the previously input bend. Also, if the user who has checked the message G5 of FIG. 60 performs the bend that the user has performed previously once again, the flexible display apparatus may perform an operation corresponding to the bend.

The message may be provided to the user through voice feedback and haptic feedback besides the visual message. The voice feedback is outputting a voice asking the user about whether the bend is intended or not. The haptic feedback is informing the user by locally vibrating a part of the surface of the display 110, vibrating the whole flexible display apparatus 100, or deforming an area of a bend line where bend is sensed convexly. Even when such voice feedback or haptic feedback is provided to the user, the user may perform the same bend again or represent whether the bend is intended by the user or not in various ways. The flexible display apparatus 100 determines whether to perform an operation or not based on user input for such feedback.

In addition, the feedback may be provided if incorrect bend manipulation is performed. In this case, feedback of various types such as visual feedback, voice feed, and haptic feedback, etc. may be provided.

Figure 61:
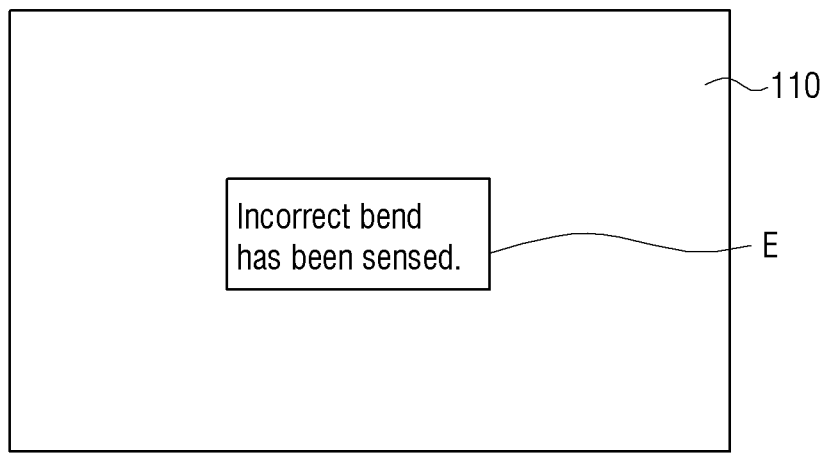

FIG. 61 illustrates an example of a visual feedback message (E) informing that incorrect bend is sensed. Although a message (E) of a text type is provided in a pop-up form in FIG. 61, an arrow informing a correct bend input location, a dotted line indicating an exact bend line, a solid line, or texts or exemplary guide images informing a correct bend input method may be provided. For example, a text message saying "right? Please bend a corner inwardly and then unbend it as shown in the picture" may be displayed along with an image showing that a right corner is deformed.

An example of voice feedback, which is provided when incorrect bend is sensed, may be a warning sound, a voice message informing of incorrect input, and a voice message explaining a correct bend input method.

An example of haptic feedback, which is provided when incorrect bend is sensed, may be vibrating of the whole flexible display apparatus 100, locally vibrating of a surface that a user's body touches, actuating to deform an incorrect bend line convexly, actuating to automatically deform the flexible display apparatus 100 in a correct bend form, informing of incorrect input by generating static electricity on a portion that the user's body touches, and informing of an incorrect input by generating heat on a portion that the user's body touches.

As described above, the user can directly check whether an unintended bend manipulation is performed or not or whether an incorrect bend manipulation is performed according to the feedback, and can take follow-up measures. Although the feedback for the unintended or incorrect bend manipulation has been described in the above exemplary embodiment, such feedback may be applied to an incorrect touch manipulation, an incorrect motion manipulation, and an incorrect voice manipulation in the same way. Also, positive feedback may be provided when it is determined that bend is intended and a corresponding operation is performed.

As described above, the flexible display apparatus 100 may be controlled according to various input methods. The input methods may be used in combination according to an exemplary embodiment. That is, multi-modal input is supported.

In the above-described exemplary embodiments, the flexible display apparatus 100 to which touch manipulation and bend manipulation are applied has been described. However, besides these, various manipulation modes such as a voice manipulation mode, a motion manipulation mode, or an image recognition mode may be used altogether.

That is, the flexible display apparatus 100 is controllable by voice and bend manipulation, motion and bend manipulation, or image recognition and bend, besides touch and bend manipulation. The touch manipulation may be commonly combined with the other manipulations.

Information on an operation that is controllable according to each input method may be stored in the storage 140. In this case, the same operation may be controlled using a plurality of different input methods, but an operation may be divided according to an input method.

For example, if an operation is controllable by touch and bend manipulations, menus controllable by touch manipulation and bend manipulation may be separately set with reference to a menu hierarchy. That is, the menus executable by the flexible display apparatus may be divided into an upper menu and a lower menu corresponding to the upper menu. For example, a function of executing an application may be classified into the upper menu and various functions supported by the application when the application is executed may be classified into the lower menu. In this case, the upper menu may be selected and executed by bend input, and the lower menu may be selected and executed by touch input.

Also, a different input method may be set according to a type of a function rather than the menu hierarchy. For example, in the case of an e-book application, a function of turning over a page may be performed by bend, and a function of selecting e-book content from an e-book list may be performed by touch.

Also, a different input method may be set according to a type of an application. For example, in the case of an e-book application, an operation is controlled by a bend method, and, in the case of a DMB application, an operation is controlled by a touch method.

Also, priority may be given to a plurality of input methods and the input method are selectively used according to the priority. For example, if a touch method is the first method and a bend method is the second method, an operation is performed according to touch in a normal state and an operation is performed according to a bend while buttons 3110, 3120, 3130, and 3140 are selected or within a predetermined time after and before buttons are selected. This priority may be changed. For example, in the above exemplary embodiment, the buttons 3110, 3120, 3130, and 3140 are implemented to activate bend manipulation, but may be implemented to activate touch manipulation. In a normal state, an operation is performed according to a bend, and an operation is performed according to a touch while a button is selected or within a predetermined time after or before the button is selected.

The priority may be changed according to a user's settings.

An input method may be determined according to a user mode as in the above-described exemplary embodiments. In the above exemplary embodiment, bend and touch input methods are combined with each other, but each input method may be selectively applied in any other input method combination. As described above, the controller 130 may identify information on an operation which is executable according to each input method and user's manipulation which is matched with the operation from the storage 140 and, performs the operation.

Accordingly, the method for user to manipulate the various types of flexible display apparatus 100 in various ways can be provided. In particular, as described in the exemplary embodiments, if user bend or touch manipulation is performed, it can be determined whether the manipulation is intended by the user or not. As a result, an unwanted operation of the flexible display apparatus 100 can be prevented. Accordingly, user's satisfaction increases and battery consumption can be reduced.

The above-described various methods may be implemented by using an application.

Specifically, a non-transitory computer readable medium, which stores a program that performs sensing a touch on a screen of a flexible display apparatus and performing an operation corresponding to the touch if an operation mode is a touch manipulation mode and sensing a bend of the flexible display apparatus and performing an operation corresponding to the bend if the operation mode is a bend manipulation mode, and changing the operation mode of the flexible display apparatus to the other operation mode if an event of changing mode is generated.

According to an exemplary embodiment, a non-transitory computer readable medium, which stores a program performing sensing a user's manipulation including a touch on a screen of a flexible display apparatus and bend of the flexible display apparatus, determining whether the user's manipulation is intended by the user or not based on a state in which the user's manipulation is performed if a user's manipulation is sensed, and performing an operation corresponding to the user's manipulation if it is determined that the user's manipulation is intended.

A non-transitory computer readable medium, which stores a program for performing a method for determining a user intention according to various exemplary embodiments, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB), memory stick, a memory card, and a read only memory (ROM), and may be provided.

Accordingly, if flexible display apparatus has a bend sensing structure, the above-described program is installed in the flexible display apparatus so that a user's intention or the intended input can be determined in various ways as described above, and malfunction can be prevented.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A flexible display apparatus comprising:
a touch display which is bendable and senses touch on the touch display;
a bending sensor which senses bending of the touch display; and
a controller which, when the touch is detected while the bending is detected, determines whether or not the touch is an effective user input and whether or not the bending is the effective user input according to a pressure of the touch,
wherein when the pressure of the touch is within a first range of pressure, the controller performs a first operation corresponding to the touch and does not perform a second operation corresponding to the bending, and
wherein when the pressure of the touch is within a second range of pressure different from the first range of pressure, the controller performs the second operation corresponding to the bending and does not perform the first operation corresponding to the touch.

2. The flexible display apparatus as claimed in claim 1, wherein when the touch and the bending are determined to be rejected as the effective user input, the controller rejects both the touch and the bending as the effective user input.

3. The flexible display apparatus as claimed in claim 1, wherein the touch and the bending are performed concurrently.

4. A method for operating a flexible display apparatus comprising:
sensing a touch and a bending of a display of the flexible display apparatus;
when the touch is detected while the bending is detected, determining whether or not the touch is an effective user input and whether or not the bending is the effective user input according to a pressure of the touch;
when the pressure of the touch is within a first range of pressure, performing a first operation corresponding to the touch and not performing a second operation corresponding to the bending; and
when the pressure of the touch is within a second range of pressure different from the first range of pressure, performing the second operation corresponding to the bending and not performing the first operation corresponding to the touch.

5. The method as claimed in claim 4, further comprising:
when the touch and the bending are determined to be rejected as the effective user input, rejecting both the touch and the bending as the effective user input.

6. A non-transitory computer readable medium having recorded thereon instructions which are executed by a computer to perform the method of claim 4.

* * * * *